US008762290B2

(12) United States Patent
Williams et al.

(10) Patent No.: US 8,762,290 B2
(45) Date of Patent: Jun. 24, 2014

(54) APPARATUS, SYSTEMS AND METHODS FOR ONLINE, MULTI-PARCEL, MULTI-CARRIER, MULTI-SERVICE ENTERPRISE PARCEL SHIPPING MANAGEMENT

(71) Applicants: Stamps.com Inc., El Segundo, CA (US); iShip Inc., Atlanta, GA (US)

(72) Inventors: Daniel F. Williams, Yarrow Point, WA (US); David Allison Bennett, Bothell, WA (US); Lynn Shaindell Goldhaber, Snohomish, WA (US); Dennis Glavin, Seattle, WA (US); Lory Elizabeth Krett, Kirkland, WA (US); Charles D. Mentzer, Redmond, WA (US); Stephen M. Teglovic, Redmond, WA (US); John M. Dietz, Bothell, WA (US); William W. Smith, III, Medina, WA (US); Paul Bilibin, Lynnwood, WA (US); Jinyue Liu, Redmond, WA (US); Paul R. McLaughlin, Redmond, WA (US); Scott Meyer, Woodinville, WA (US); Sean Hu, Bellevue, WA (US)

(73) Assignees: Stamps.com Inc., El Segundo, CA (US); iShip Inc., Altanta, GA (US)

( * ) Notice: Subject to any disclaimer, the term of this patent is extended or adjusted under 35 U.S.C. 154(b) by 0 days.

(21) Appl. No.: 13/710,302

(22) Filed: Dec. 10, 2012

(65) Prior Publication Data
US 2013/0179361 A1 Jul. 11, 2013

Related U.S. Application Data

(60) Continuation of application No. 13/093,551, filed on Apr. 25, 2011, now Pat. No. 8,374,970, which is a
(Continued)

(51) Int. Cl.
*G06Q 30/00* (2012.01)
*G06Q 10/00* (2012.01)

(52) U.S. Cl.
USPC ............. 705/334; 705/330; 705/337; 705/1.1

(58) Field of Classification Search
USPC ................. 705/1.1, 7.11–7.42, 28, 330–341, 705/400–418
See application file for complete search history.

(56) References Cited

U.S. PATENT DOCUMENTS

| 4,024,380 | A | 5/1977 | Gunn |
| 4,868,757 | A | 9/1989 | Gil |

(Continued)

FOREIGN PATENT DOCUMENTS

| WO | 0046718 A2 | 8/2000 |
| WO | 0046718 A3 | 8/2000 |

(Continued)

OTHER PUBLICATIONS

Decision on Request for Rehearing for U.S. Appl. No. 09/820,377, dated Oct. 30, 2009, pp. 1-8.
(Continued)

*Primary Examiner* — George Chen
(74) *Attorney, Agent, or Firm* — Khorsandi Patent Law Group, A Law Corporation; Marilyn R. Khorsandi

(57) ABSTRACT

The present invention provides a plurality of Enterprises with a single online user interface with which the Enterprise can provide Enterprise Shippers, shipping origination users and shipping intermediary users with an automated parcel management system for a plurality of supported Carriers for a plurality of services. The present invention provides for the hierarchical definition of users, including the hierarchical definition of organizational units within each Enterprise. The present invention further provides for a distinct definition of policies, privileges, and other types of specifications for each user level, each user, and each organizational unit. The present invention applies the user and organizational policies, privileges and other specifications as they apply to each particular user to drive the interactive interface with each particular user and to provide among other things, shipping options, shipping services, shipping rates, traveler and/or shipping label preparation, and shipment tracking.

10 Claims, 61 Drawing Sheets

Related U.S. Application Data continuation of application No. 11/510,801, filed on Aug. 24, 2006, which is a division of application No. 09/820,377, filed on Mar. 27, 2001, now Pat. No. 7,774,284.

(60) Provisional application No. 60/193,899, filed on Mar. 31, 2000, provisional application No. 60/192,723, filed on Mar. 27, 2000.

(56) References Cited

U.S. PATENT DOCUMENTS

| | | | |
|---|---|---|---|
| 5,072,397 A | 12/1991 | Barns-Slavin et al. | |
| 5,117,364 A | 5/1992 | Barns-Slavin et al. | |
| 5,233,532 A | 8/1993 | Ramsden | |
| 5,293,310 A | 3/1994 | Carroll et al. | |
| 5,315,508 A * | 5/1994 | Bain et al. | 705/28 |
| 5,337,246 A | 8/1994 | Carroll et al. | |
| 5,481,464 A | 1/1996 | Ramsden | |
| 5,485,369 A | 1/1996 | Nicholls et al. | |
| 5,513,112 A | 4/1996 | Herring et al. | |
| 5,586,037 A | 12/1996 | Gil et al. | |
| 5,615,120 A | 3/1997 | Schwartz et al. | |
| 5,631,827 A | 5/1997 | Nicholls et al. | |
| 5,675,493 A | 10/1997 | Schwartz et al. | |
| 5,699,258 A | 12/1997 | Thiel | |
| 5,710,887 A | 1/1998 | Chelliah et al. | |
| 5,778,348 A | 7/1998 | Manduley et al. | |
| 5,787,400 A | 7/1998 | Weber | |
| 5,869,819 A | 2/1999 | Knowles et al. | |
| 5,971,587 A | 10/1999 | Kato et al. | |
| 6,006,332 A | 12/1999 | Rabne et al. | |
| 6,012,048 A | 1/2000 | Gustin et al. | |
| 6,012,065 A | 1/2000 | Boucher et al. | |
| 6,015,167 A | 1/2000 | Savino et al. | |
| 6,018,725 A | 1/2000 | Boucher et al. | |
| 6,029,140 A | 2/2000 | Martin et al. | |
| 6,047,273 A | 4/2000 | Vaghi | |
| 6,064,981 A | 5/2000 | Barni et al. | |
| 6,078,889 A | 6/2000 | Boucher et al. | |
| 6,092,053 A | 7/2000 | Boesch et al. | |
| 6,134,561 A | 10/2000 | Brandien et al. | |
| 6,182,142 B1 | 1/2001 | Win et al. | |
| 6,219,653 B1 | 4/2001 | O'Neill | |
| 6,233,568 B1 | 5/2001 | Kara | |
| 6,285,916 B1 | 9/2001 | Kadaba et al. | |
| 6,298,337 B1 | 10/2001 | Kubatzki et al. | |
| 6,470,327 B1 | 10/2002 | Carroll et al. | |
| 6,484,150 B1 | 11/2002 | Blinn et al. | |
| 6,525,835 B1 * | 2/2003 | Gulati | 358/1.18 |
| 6,564,225 B1 | 5/2003 | Brogliatti et al. | |
| 6,697,702 B1 | 2/2004 | Hahn-Carlson | |
| 6,829,059 B1 | 12/2004 | Kimura | |
| 6,842,533 B1 | 1/2005 | Patton et al. | |
| 6,965,451 B1 | 11/2005 | Ogg et al. | |
| 6,982,808 B1 | 1/2006 | Ogg et al. | |
| 7,117,170 B1 | 10/2006 | Bennett et al. | |
| 7,197,465 B1 | 3/2007 | Hu | |
| 7,359,887 B1 | 4/2008 | Hu et al. | |
| 7,421,400 B2 | 9/2008 | Bilibin et al. | |
| 7,660,721 B2 | 2/2010 | Williams et al. | |
| 7,664,651 B1 | 2/2010 | Bennett et al. | |
| 7,774,284 B2 | 8/2010 | Williams et al. | |
| 7,774,285 B2 | 8/2010 | Hu et al. | |
| 7,818,267 B1 | 10/2010 | Bilibin et al. | |
| 7,827,118 B1 | 11/2010 | Smith et al. | |
| 8,073,723 B1 | 12/2011 | Bilibin et al. | |
| 8,131,651 B1 | 3/2012 | Bennett et al. | |
| 8,255,337 B1 | 8/2012 | Bennett et al. | |
| 8,341,003 B1 | 12/2012 | Bilibin et al. | |
| 8,346,676 B1 | 1/2013 | Bennett et al. | |
| 8,364,606 B1 | 1/2013 | Bennett et al. | |
| 8,374,970 B2 | 2/2013 | Williams et al. | |
| 8,380,641 B1 | 2/2013 | Bennett et al. | |
| 8,386,341 B2 | 2/2013 | Bennett et al. | |
| 8,489,519 B2 | 7/2013 | Williams et al. | |
| 2001/0034608 A1 | 10/2001 | Gendreau | |
| 2003/0115144 A1 | 6/2003 | Stefik et al. | |

FOREIGN PATENT DOCUMENTS

| | | |
|---|---|---|
| WO | 0046728 A2 | 8/2000 |
| WO | 0046728 A3 | 8/2000 |
| WO | 0070519 A2 | 11/2000 |
| WO | 0070519 A3 | 11/2000 |
| WO | 0113261 A1 | 2/2001 |

OTHER PUBLICATIONS

Office Action for U.S. Appl. No. 11/510,801, dated Jan. 4, 2012, pp. 1-40.

Office Action for U.S. Appl. No. 13/093,551, dated Jan. 3, 2012, pp. 1-24.

Kewill Systems, Inc., "Kewill Systems PLC Acquires Leading U.S. Shipping and Receiving E-Commerce Software firm for $18 Million", Aristo Computers Press Releases and Product Developments, Jul. 27, 1999, pp. 1-3 of 13, Marlborough, Mass.

Kewill Systems, Inc., "USPS Delivery Confirmation Support Now Availbe in Aristo's Economical APSS® Lite Shipping System", Aristo Computers Press Releases and Product Developments, Jun. 23, 1999, p. 3 of 13, Beaverton, Oregon.

Kewill Systems, Inc., "Aristo Parcel Shipping System® Certified by USPS to Support New Express Mail Manifesting", Aristo Computers Press Releases and Product Developments, Jun. 21, 1999, p. 3 and 4 of 13, Beaverton, Oregon.

Kewill Systems, Inc., "Aristo Parcel Shipping Systems® Certifed by USPS Online® Compatible to Support UPS International Shipping", Aristo Computers Press Releases and Products Developments, May 12, 1999, pp. 4 of 5 of 13, Beaverton, Oregon.

Kewill Systems, Inc., "Aristo Parcel Shipping System® Certified to Fully Support FedEd PowerShip® Server", Aristo Computers Press Releases and Products Developments, May 10, 1999, pp. 5 and 6 of 13, Beaverton, Oregon.

Kewill System, Inc., "Aristo Computers Names AllPoints Systems Strategic Partner", AllPoints Systems to Integrate Aristo shipping functionality into its Demand Chain Software, Aristo Computer Press Releases and Product Developments, Apr. 13, 1999, pp. 6 and 7 of 13, Beaverton, Oregon, and Dedham, Massatuchutes.

Kewill Systems, Inc., "Midgard Information Systems and Aristo-Integrated Shipping Solutions for Today's Marketplace", Aristo Computers Press Release and Product Developments, Jan. 19, 1999, pp. 7-9 of 13, Beaverton, Oregon.

Kewill Systems, Inc., "Aristo's OLE Server Provides Shipping & Manifesting Engine for Third Party Developers", Aristo Computers Press Releases and Product Developments, Jul. 28, 1998, pp. 9 and 10 of 13, Beaverton, Oregon.

Kewill Systems, Inc., "Aristo Computers Adds New Economical Shipping Solution to Its Product Line", Aristo Computers Press Releases and Product Developments, Apr. 30, 1998, p. 10 of 13, Beaverton, Oregon.

Kewill Systems, Inc., "Aristo announces latest APSS® developments!", Aristo Computers Press Releases and Product Developments, Jun. 9, 1997, pp. 10 and 11 of 13, Beaverton, Oregon.

Kewill Systems, Inc., "Aristo launches APSS® for Windows", Aristo Computers Press Releases and Product Developments, Oct. 20, 1996, pp. 11-13 of 13, Beaverton, Oregon.

"Netscape and FDX Unveil Plans for Next Generation Internet Package Delivery Center", Netscape Press Release, Apr. 7, 1999, 3 pages, Mt.View, California and Memphis, Tennessee.

"TanData Announces Release of ChainLink® Applications Suite" TanData Press Releases, Dec. 8, 1999, 2 pages, Tulsa, Oklahoma.

UPS Extends Capability of iCat Electronic Commerce Software, TanData Press Releases, Oct. 26, 1998, 2 pages, Atlanta.

Andy Wang, "FedEx and Netscape Build Shipping Portal", E-Commerce Times, Apr. 8, 1999, 2 pages.

Mary Hillebrand, "From2.Com Gives International E-Commerce A Hand", E-Commerce Times, Jul. 9, 1999, 3 pages.

(56) References Cited

OTHER PUBLICATIONS

Tim Wilson, "Shippers Repackaged As E-Providers", InformationWeek, Issue: 758, Section: Transportation Transformation: A Special Report From Internetweek, Oct. 25, 1999, 6 pages.
James Hollander, UPS Boosts E-Commerce Strategy with New Web Tools, E-Commerce Times, Apr. 6, 1999, 3 pages.
Collection of Screen Printouts (copyright © 2000) from "anythingovernight.com" referring to shipping product Shiplet, entitled "Shiplet", 4 pages, "About Us", 1 page, "Shipping", 1 page, "Reporting", 1 page, "User Profile" 1 page, "Shipments to Me", 1 page, and "API", 1 page, 10 pages total.
Lisa Corbin, "Electronic Commerce Strategies", Government Executive Magazine, Aug. 30, 1999, 5 pages.
Computer Support, Inc. (CSI), p. 10 of 117 listed in "Electronic Data Interchange (EDI): Software Profiles" Datapro, Jul., 1998).
TradePoint Systems LLC, International Trade and Transportion, and Transportation Concepts and Services, Inc. (TCS), p. 19 of 177 listed in "Electronic Data Interchange (EDI): Software Profiles" Datapro, Jul., 1998).
Carrier Quality Performance Software, p. 39 of 177 listed in "Electronic Data Interchange (EDI): Software Profiles" Datapro, Jul., 1998).
Late Delivery Quality Monitor Software (for Federal Exress Shipments), p. 97 of 177 listed in "Electronic Data Interchange (EDI): Software Profiles" Datapro, Jul., 1998).
Scheme Software Order Entry/Billing 5.0, p. 156 of 177 listed in "Electronic Data Interchange (EDI): Software Profiles" Datapro, Jul., 1998).
Software for International Trade, p. 157 of 177 listed in "Electronic Data Interchange (EDI): Software Profiles" Datapro, Jul., 1998).
Brandon Fleming, "Hot List for Electronic Data Interchange (EDI)", http://www.usatrade.gov/us/annarbor/hot_list$_{for}$_EDI.htm, 9 pages., Copyright © 1999; Revised Feb. 1, 2000.
Microsoft Corporation, "Microsoft Internet Commerce Strategy: A Foundation for Doing Business on the Internet", May 1997, 27 pages.
Survey of E-Commerce Companies & Products: Business Logistics, Customer Service, Supply Chain Management, http://pages.hotbot.com/biz/jayml/BP9.html, 28 pages, Richard Karpinski, Appendix II Feb. 9, 1999 on p. 26.
FedEx Standardizes on Netscape, News Source: Mountain View, Calif., Jun. 11/PRNewswire; News Date Jun. 12, 1996 12:55 pm; Keywords: Federal Express, Electronic Commerce; 3 pages.
Email Message; From SmartShip Online Support, to: smartshippers@smartship.com; Subject: You can ship online now! Sent: Tuesday, Dec. 15, 1998 11:53 AM; 1 page.
"Smartship.com Announces Multi-Carrier Shipping and Tracking Function for E-Commerce", SmartShip.com Press Release, Apr. 3, 2000, 2 pages, Irvine, California.
"New Web site offers quick shipping-rate comparisons", SmartShip.com, Philadelphia Inquirer Jan. 13, 2000, Henry J. Holcomb, 3 pages.
Material Logistics System, (NN86091526) IBM Technical Disclosure Bulletin, Sep. 1986, US, Volumn 26, !Isue 4, page Nos. 1526-1530.
Declaration by John Dietz entitled "Verified Statement (Declaration) No. 1 in Support of Information Disclosure Statement in U.S. Appl. No. 09/684,0110, U.S. Appl. No. 09/684,871, U.S. Appl. No. 09/684,870, U.S. Appl. No. 09/684,808, U.S. Appl. No. 09/684,869, U.S. Appl. No. 09/685,078, U.S. Appl. No. 09/680,649, U.S. Appl. No. 09/680,654, U.S. Appl. No.09/684,865, U.S. Appl. No. 09/685,077, U.S. Appl. No. 09/684,014, U.S. Appl. No. 09/684,861, U.S. Appl. No. 09/684,152, U.S. Appl. No. 09/684,866, U.S. Appl. No. 09/820,377, and U.S. Appl. No. 09/820,292", executed Jul. 20, 2001, pp. 1-8 (with Exhibits A-J attached).
Declaration by John Dietz entitled "Verified Statement (Declaration) No. 2 in Support of Information Disclosure Statement in U.S. Appl. No. 09/684,010, U.S. Appl. No. 09/684,871, U.S. Appl. No. 09/684,870, U.S. Appl. No. 09/684,808, U.S. Appl. No. 09/684,869, U.S. Appl. No. 09/685,078, U.S. Appl. No. 09/680,649, U.S. Appl. No. 09/680,654, U.S. Appl. No.09/684,865, U.S. Appl. No. 09/685,077, U.S. Appl. No. 09/684,014, U.S. Appl. No. 09/684,861, U.S. Appl. No. 09/684,152, U.S. Appl. No. 09/684,866, U.S. Appl. No. 09/820,377, and U.S. Appl. No. 09/820,292", executed Jul. 20, 2001, pp. 1-6 (with Exhibits A and B attached).

\* cited by examiner

FIG. 19 iShip.com

○ Preferences - *Package Options* | My iShip | Price It | Ship It | Track It | Sell It | Help This page needs an overall explanation about what is going on with it. Click this, click that and things will behave differently in different parts of the app.

My iShip Home
Address Book
Saved Packages
Setup Wizard
○ Preferences
  Account Info
  Change Password
  Carrier Info
  • Package Options
  Shipment Options ←— 123
  Drop Off/Pickup
  Applications
  Payment
Log Off The value of the contents is:
I want to protect my package from carrier loss or damage.

$ [ ] ~170
Most services automatically protect your package up to $100. However, USPS Priority Mail and Parcel Post do not have automatic protection. Some USPS services have no available Loss Protection. [ Help ]

Package Reference Number:
[ ] ~171
Give each package a reference number for your records. [ Help ]

Service Options:

172 — ☐ Verbal Confirmation
This option can only be used with UPS Next Day Early AM. This confirmation call will be made to the phone number you enter in phone number field in your return address. [ Help ]

173 — ☐ E-mail Notification
E-mail notification of delivery requires an e-mail address on the return address page. [ Help ]

174 — ☐ Delivery Confirmation
This option can only be used with USPS services. [ Help ]

175 — ☐ Proof of Delivery
This option can only be used with UPS services. Proof of Delivery responses are sent automatically after delivery. You may also require the recipient's signature to be included in response. [ Help ] —181

176 — ☐ Adult Signature Required

177 — ☐ Call Tag
This option can only be used with UPS Ground service. [ Help ]

Merchandise Description:
178 — [                              ]

179 — ☐ Certified Mail
This option can only be used with USPS Priority Mail or Parcel Post. [ Help ]

180 — ☐ Return Receipt
This option can only be used with USPS Express Mail, Certified Mail, COD, and mail insured for more than $50.00. [ Help ]

Having trouble?
Questions or comments ( Save ) ( X Cancel )

*FIG. 20* iShip.com

| My iShip | Price It | Ship It | Track It | Sell It | Help |

○ Preferences - *Shipment Options*

This page needs an overall explanation about what is going on with it. Click this, click that and things will behave differently in different parts of the app.

Sidebar:
- My iShip Home
- Address Book
- Saved Packages
- Setup Wizard
- ○ Preferences
  - Account Info
  - Change Password
  - Carrier Info
  - Package Options
  - • Shipment Options
  - Drop Off/Pickup
  - Applications
  - Payment
- Log Off

Destination Address: ⊙ Business —190    ○ Residence —191

Shipment Reference Number: _____ —192
Give your shipment a reference number for your records. [ Help ]

Package Reference Number: —193
____ % of shipping charges and/or
$ ____ fixed amount.

Service Options: 194
You will see the total of carrier shipping charges plus your handling charges. [ Help ]

195 — ☐ Delivery Deadline
If your shipment has to be delivered on a certain date, select the date below and the rate grid will reflect only that day. [ Help ]

196 — [Next Day ▼]

197 — ☐ Guaranteed Delivery
When Guaranteed Delivery is selected, only services with guaranteed delivery options will be displayed on the rate grid. [ Help ]

198 — ☐ Deliver Without Signature
Checking this box authorizes FedEx to deliver your shipment without obtaining a signature. [ Help ]

199 — ☐ Set Earliest Delivery Time
This option can only be used with UPS Next Day Air Early AM. Time must be before 12:00pm (noon). Use of this option will void the delivery guarantee. [ Help ]

200 — [9:30am ▼]

201 — ☐ Documents Only
This option is only applicable for shipments sent to international destinations. [ Help ]

202 — ☐ Non-Dutiable
This option is only applicable for shipments sent to international destinations. [ Help ]

Freight Pickup:

Stairs
Please indicate the number of flights of stairs. [ Help ]
203 — [2]

204 — ☐ Loading Dock
Select this if there is a loading dock at the pickup location.

205 — ☐ Appointment Required
Select this if an appointment is required for pickup.

Freight Delivery:

Stairs
Please indicate the number of flights of stairs. [ Help ]
206 — [2]

207 — ☐ Loading Dock
Select this if there is a loading dock at the delivery location.

208 — ☐ Appointment Required
Select this if an appointment is required for delivery.

209

Having trouble?
Questions or comments

○ Save   ⊗ Cancel

FIG. 21 iShip.com

| | My iShip | Price It | Ship It | Track It | Sell It | Help |

○ Preferences - *Applications*

This page needs an overall explanation about what is going on with it. Click this, click that and things will behave differently in different parts of the app.

Application Start Pages:  ☑ Show Application Start Pages  [ Help ]
- 220
- 221 ☑ Ship It
- 222 ☑ Price It
- 223 ☑ Sell It
- 224 ☑ Preferences Package Options:  ☑ Show Advanced Package Options  [ Help ]
225  Explanation about Advanced Package Options.

Log Off Message:  ☑ Show Log Off Message  [ Help ]
226  Explanation about Log Off Message.

Track It Options:  Display this page first in Track It.
227  [Track a Package ▼]

(Save) (X) Cancel

Side menu: My iShip Home, Address Book, Saved Packages, Setup Wizard, ○ Preferences, Account Info, Change Password, Carrier Info, Package Options, Shipment Options, Drop Off/Pickup, • Applications, Payment, Log Off, Having trouble?, Questions or comments

*FIG. 22*

--- iShip.com

| | My iShip | Price It | Ship It | Track It | Sell It | Help |

○ Preferences - *Payment Information*

Default payment type:  Short explanation about different payment types.  [ Help ]
[Credit Card ▼] — 230

Credit card info and billing address:  You may choose to store your credit card data here.  [ Help ]
- Card Number: [1234 5678 9101 2345] — 231
- 232  Expires: [02▼] [2002▼] — 233
- First Name: [Lory] — 234
- Last Name: [Krett] — 235 — 236
- E-mail Address: [lory@iship.com]
- Company: [iShip.com] — 237
- Street: [3535 Factoria Blvd. SE] — 238
- City: [Bellevue]
- State: [WA - Washington ▼] — 239
- ZIP Code: [98006] — 240
- Telephone: [(425) 602-4848] — 241
— 242

[DISCOVER] [MASTERCARD] [VISA]

By shipping your package with iShip.com you agree to all Terms of Service specified by iShip.com or the carriers on any applicable bill of lading or service guide.

(Save) (X) Cancel

Side menu: My iShip Home, Address Book, Saved Packages, Setup Wizard, ○ Preferences, Account Info, Change Password, Carrier Info, Package Options, Shipment Options, Drop Off/Pickup, Applications, • Payment, Log Off, Having trouble?, Questions or comments

FIG. 25 iShip.com

| O 1 \| Shipping Addresses | ⊙ ⊕ ⊗ | My iShip | Price It | Ship It | Track It | Sell It | Help |

Return address: [Change] — 292

Lory Krett
IShip.com
3535 Factoria Blvd. SE
Floor 5
Bellevue, WA 98006
(425) 602-4848
lory@iship.com

Destination address:

293 {
- Nickname: BEster  [Help]
- Contact Name: Boris Ester  Address Book
- Company: Walking Rain
- Street: 12020 122nd Ave. NE
- Floor/Room: Suite 200
- Department:
- Country: United States
- City: Ellensburg
- State/Province: WA - Washington  Look up ZIP
- ZIP/Postal Code: 98926-9988  Look up City, State
- Telephone: (425) 555-1133
- Fax: (425) 555-1100  — 293-1
- E-mail Address: bester@walkingrain.com
- Address Type: ⊙ Business  ○ Residence
- 293-2 — ☐ Add this address to my Address Book.

Price It
1. Shipment Info
2. Package Info
3. Shipping Options
4. Rates and Times
5. Payment
6. Print Log Off

E-mail notification:

If you provide an E-mail Address, we will notify the recipient and up to two others that a package has been sent. You can include a brief message to be sent with the E-mail.  [Help]

294 {
| | Name: | E-mail address: |
| #1 | John Jadwin | johnj025@this_email.com |
| #2 | Sarah Lewis | sarah01@email.com |

295 — Message:

Package Information:

Description: 296    Browse — 297  [Help]

Reference No.: ———— 298

Having trouble?
Questions or comments ($) Show Rates   (✓) Save   (<) Back   (>) Next   (✗) Cancel

FIG. 27 iShip.com

| O Payment | | My iShip | Price It | Ship It | Track It | Sell It | Help |
|---|---|---|---|---|---|---|---|

Confirm your shipment:

| Service | UPS Ground | $ 6.30 | Shipment: | 2lb 3oz |
|---|---|---|---|---|
| Service Options: | | $ .35 | | 10" x 12" x 8" |
| Total | | $ 7.32 | | Loss protection, $150 |

Return Address: Jim Ship
iShip.com
3535 Factoria Blvd. SE
Floor 5
Bellevue WA 98006
jims@iship.com
(425) 602-4848

Return Address: Diane Moon
Milno Fruit
12020 101st Ave NE
Ellensburg WA 98928
United States
(509) 555-9728

Destination address:

Note: To modify your shipment, click the Back button or the corresponding link in the navigation bar.

Payment type: 299-1
Bill Third Party — 299-2

Third Party billing address: 299-3

- Carrier Account No.: 1234 5678 9101 2345
- Contact Name: Lory E. Krett
- Company: iShip.com
- Address: 3535 Factoria Blvd SE
- Room/Floor: Floor 5
- Department:
- City: Bellevue
- State/Province: WA - Washington
- Zip/Postal Code: 98006
- Telephone: (425) 602-4848

By shipping your package with iShip.com you agree to all Terms of Service specified by iShip.com and UPS.

When you click finish, the above UPS account will be charged $7.32.

○ Ship It
1 Shipping Addresses
2 Package Info
3 Shipping Options
4 Rates and Times
5 Payment
6 Print
Log Off Having trouble?
Questions or comments (Back) (Finish) (Cancel)

FIG. 28

4380 — Merchant Logo    4382
              Merchant Main Menu Choices

Your Order History
4381
              Click on an order to view the order summary.
Merchant
SubMenu        ┌─ 4400
              Shipped Orders:
Selections
              ─────────────────────────────────────────────
              Order #              Order Date          Status 4401-1 — 002-0152586-5576810    July 19, 1999       All items shipped
4401-2 — 002-2212571-6739814    March 28, 1999      All items shipped
4401-3 — 002-9739895-6708638    January 30, 1999    All items shipped
4401-4 — 002-1894644-6936263    January 14, 1999    All items shipped
4401-5 — 002-7643906-5558259    December 14, 1998   All items shipped
4401-6 — 002-6790950-3739847    October 29, 1998    All items shipped
4401-7 — 002-3632396-2353407    April 13, 1998      All items shipped Return to Account Maintenance Main Page

FIG. 29

Merchant Logo

Merchant Main Menu Choices

Order Summary  *4401-1*  Return to Your Order History

| | |
|---|---|
| Order #: | 002-0152586-5576810 |
| Date: | July 19, 1999 at 09:58 AM PDT — *4407* |
| Status: | All Items shipped |

Shipping Address:
Scott J. Bean
iShip.com
2515 - 140th Ave NE Suite E-110   *4408*    *4402*
Bellevue, WA 98005 USA
425.602.5022

Returns? Click Here:
Return services by iShip.com iShip.com
Your Internet Package Shipper

Merchant

SubMenu

Selections

| Ship Method: | Number of Shipments: | Payment Method: |
|---|---|---|
| Standard Shipping | One shipment when complete order is ready | VISA Last 5 digits: 26781 |

*4403*

Items Ordered:

*4404-1* — 1 of: Permission Marketing: Turning Strangers Into Friends and Friends Into Customers [Audio Cassette]
By: Seth Godin(Reader)
1 shipped on Jul. 19, 1999 via US Priority.  — $14.40

*4404-2* — 1 of: Yeah, It's That Easy [ECD] [Audio CD]
By: G. Love & Special Sauce
1 shipped on Jul. 20, 1999 via US First Class  — $12.99

*4404-3* — 1 of: For Those About To Rock We Salute You [ORIGINAL RECORDING REMASTERED] [Audio CD]
By: AC.DC
1 shipped on Jul. 19, 1999 via US Priority.  — $11.49

*4404-4* — 1 of: Odelay [Audio CD]
By: Beck
1 shipped on Jul. 19, 1999 via US Priority  — $12.99

*4404-5* — 1 of: Natty Dread [Audio CD]
By: Charlie Hunter Quartet
1 shipped on Jul. 19, 1999 via US Priority  — $12.99

*4404-6* — 1 of: Duo [Audio CD]
By: Charlie Hunter, Leon Parker
1 shipped on Jul. 19, 1999 via US Priority  — $12.99

*4404-7* — 1 of: RCA WSP150 900MHz Wireless Speakers [Electronics]
By: RCA
1 shipped on Jul. 20, 1999 via UPS Ground  — $149.95
Track your package with iShip.com

*4405*

| | |
|---|---|
| Item(s) Subtotal: | $227.80 |
| Shipping & Handling: | $19.56 |
| Total Before Tax: | $247.36 |
| Tax: | $21.29 |
| TOTAL: | $268.65 |

*4406*
Return to Your Order History

Top of Page

FIG. 31

Merchant Logo

Merchant Main Menu Choices

Returns Service            Return to <u>Your Order History</u>

4420 {
- Within 30 days of receipt of your shipment, you may return:
  - Any book in original condition.
  - Any unopened CD, DVD, VHS tape, or software.
  - Any electronics merchandise or toy in new condition with its original packaging and accessories.
- We will issue a full refund for the price of any item that meets these conditions. We only refund shipping costs if the item is a result of our error.

Merchant SubMenu Selections

| | | |
|---|---|---|
| Order #: | 002-0152586-5576810 — *4401-1* | |
| Date: | July 19,1999 at 09:58 AM PDT | |
| Status: | All items shipped | |

Select the items you would like to return:     Price:

*4421-1* ☐   1 of: <u>Permission Marketing: Turning Strangers Into Friends and Friends Into Customers</u> [Audio Cassette]   } *4404-1*   $14.40
           By: Seth Godin(Reader)
           1 shipped on Jul. 19, 1999 via US Priority.

*4421-2* ☐   1 of: <u>Yeah, It's That Easy [ECD]</u> [Audio CD]   } *4404-2*   $12.99
           By: G. Love & Special Sauce
           1 shipped on Jul. 20, 1999 via US First Class

*4421-3* ☐   1 of: <u>For Those About To Rock We Salute You [ORIGINAL RECORDING REMASTERED]</u> [Audio CD]   } *4404-3*   $11.49
           By: AC.DC
           1 shipped on Jul. 19, 1999 via US Priority.

*4421-4* ☐   1 of: <u>Odelay</u> [Audio CD]   } *4404-4*   $12.99
           By: Beck
           1 shipped on Jul. 19, 1999 via US Priority

*4421-5* ☐   1 of: <u>Natty Dread</u> [Audio CD]   } *4404-5*   $12.99
           By: Charlie Hunter Quartet
           1 shipped on Jul. 19, 1999 via US Priority

*4421-6* ☐   1 of: <u>Duo</u> [Audio CD]   } *4404-6*   $12.99
           By: Charlie Hunter, Leon Parker
           1 shipped on Jul. 19, 1999 via US Priority

*4421-7* ☑   1 of: <u>RCA WSP150 900MHz Wireless Speakers</u> [Electronics]   } *4404-7*   $149.95
           By: RCA
           1 shipped on Jul. 20, 1999 via UPS Ground
           <u>Track your package</u> with iShip.com

*4405*

| | |
|---|---|
| Item(s) Subtotal: | $227.80 |
| Shipping & Handling: | $19.56 |
| Total Before Tax: | $247.36 |
| Tax: | $21.29 |
| TOTAL: | $268.65 |

*4406*     [ Next Step >> ] *4422*

Return to <u>Your Order History</u>

<u>Top of Page</u>

FIG. 32

Merchant Logo

Merchant Main Menu Choices

Returns Service            Return to Your Order History

| | |
|---|---|
| Order #: | 002-0152586-5576810 — *4401-1* |
| Date: | July 19, 1999 at 09:58 AM PDT |
| Status: | All items shipped |

Items to Return:            Price: *4173*

Merchant SubMenu Selections

*4421-7* ☑ 1 of: RCA WSP150 900MHz Wireless Speakers [Electronics]
By: RCA
1 shipped on Jul. 20, 1999 via UPS Ground
Track your package with IShip.com    *4404-7*    $149.95

*4405*

Item(s) Subtotal Before Tax:   $149.95
Refunded Tax:   $12.90
*4174* TOTAL:   $162.85

*4172*

Reason for Return: *4206*

- *4427-1* ☐ Customer Choice — *4216*
- *4427-2* ☐ Incorrect Item Received — *4207*
- *4427-3* ☑ Arrived Damaged/Defective — *4212*
- *4427-4* ☐ Other (please specify below): — *4220*

*4425*    *4426-1*

```
Right speaker does not receive signal.
```

*4426-2*

*4406*
Return to Your Order History

[ Next Step >> ] *4422*

Top of Page

*FIG. 37*

Merchant Logo

Merchant Main Menu Choices

Returns Service          Return to Your Order History

Returning Your Package:          Price:

4213-1 { We apologize for the problem with your order. To process your refund, make sure your item(s) are in the original packaging and prepared for safe shipment.

4173

4404-7 { 1 of: RCA WSP150 900MHz Wireless Speakers [Electronics]          $149.95
By: RCA
Reason for return: Arrived Damaged or Defective — 4212
Comments: Right speaker does not receive signal. — 4425

TOTAL REFUND:   $162.85

Merchant          4172

*Through our partnership with iShip.com, you can print a return label directly from your computer or take your package to a Mail Boxes Etc. To print a shipping label, you must have a printer that prints 300 dpi or better.*

SubMenu

4430

Selections

How would you like to return the package? (Select One)

4431 — ◉ UPS  4187-1   ○ US Postal Service 4188-1   ○ Mail Boxes Etc. 4190   ○ Retail Store 4184

4432 — Is your item packaged in the original shipping box?

4433 — ◉ YES   ○ NO 4434

4406

[ Next Step >> ]   4422

Return to Your Order History

Top of Page

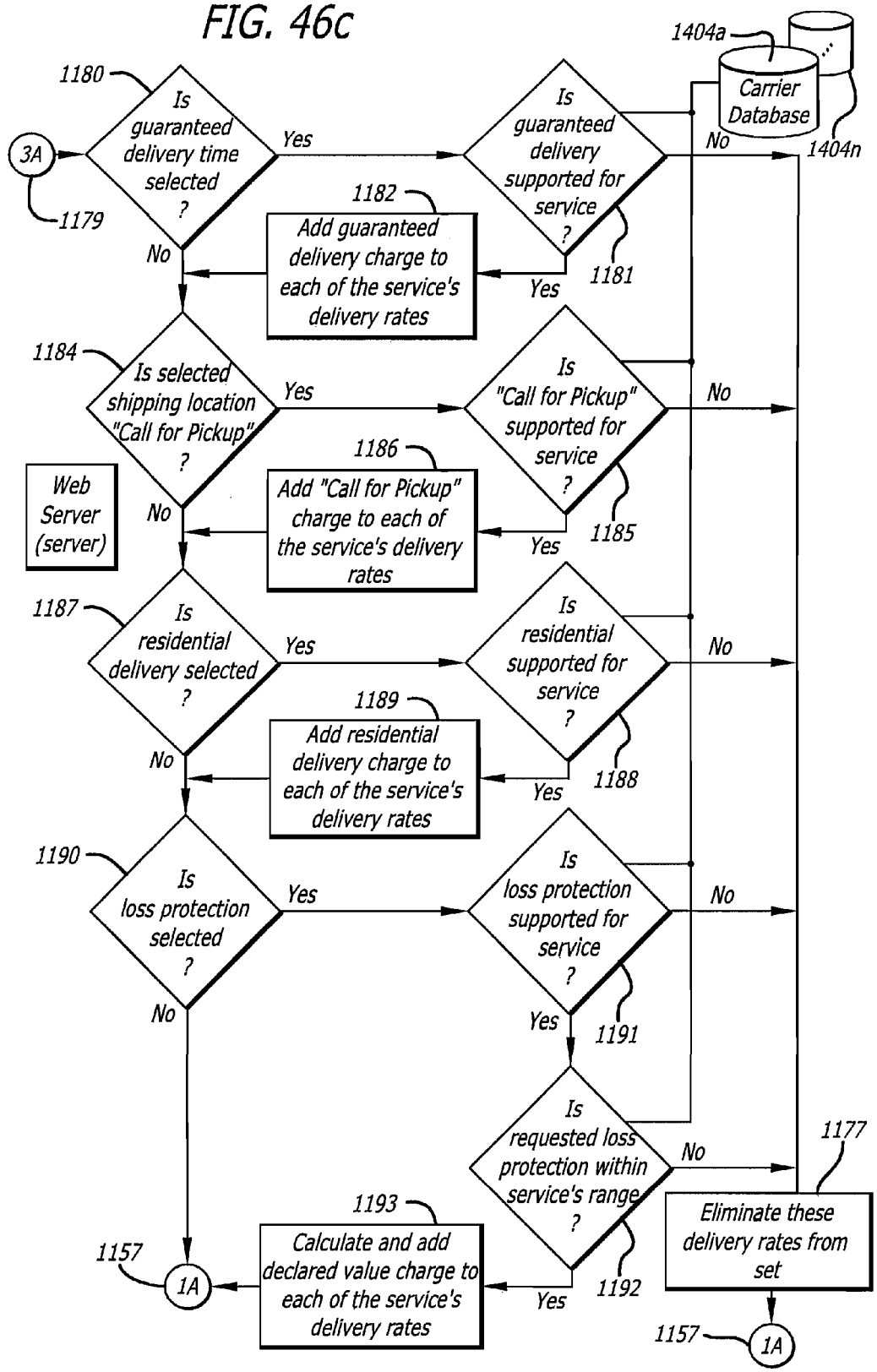

```
<a target="_new"
                                        2210
href="http://iship.com/commerce/default.asp?K=A6V1XZ
                        2210-1
                                        2210-2
&W=10&V=0&H=0">View Tour Shipping Costs!</a>
 2211  2212  2213       2214
```

FIG. 50

```
<a href="http://iship.com/Sellit/buyer.asp?

pid=f429b0d0abc411d39f8000902789280b"
                        2220
>Click here to use iShip.com to view your shipping charges.</a>
                        2214
```

```
<iship.com.request xmins="x-schema:http://iship.com/api/schema/trackrequest.xmi"
transactionid="3855BD2185E111d3984400A0C9D6C226">
        <header mode="interactive">
                <version major="0" minor="1"/>
                <batch id="AE5E54F08E2311d3984900A0C9D6C226"
                url="http://shasta/api/track/trackresponse.asp" email="bob@iship.com"/>
        </header>
        <sigon sessionid="" userid="test" password="7777777"/>
        <trackit>
                <package sequencenumber="1">
                        <trackingnumber carrier="ups">
                                1Z1812530202075466
                        </trackingnumber>
                </package>
        </trackit>
        <logoff/>
</iship.com.request>
```

FIG. 66

```
<iship.com.response transactionid="3855BD2185E111d3984400A0C9D6C226">
        <status ishiprcode="0" signonrcode="0" trackitrcode="0" parsercode="0"
        systemrcode="0"/>
        <trackit>
                <package sequencenumber="1" packagercode="0">
                        <deliveredto></deliveredto>
                        <deliverylocation>LEFT AT 3S</deliverylocation>
                        <signedby>HOWARD</signby>
                        <lastscan>9/1/99 1:50:00 PM DELIVERY </lastscan>
                        <status>Delivered</status>
                        <deliverytime>9/1/99 1:50:00 PM</deliverytime>
                        <carrier>UPS</carrier>
                        <service>2ND DAY AIR</service>
                        <shipdate>8/28/99 </shipdate>
                        <trackingnumber>1Z1812530202075466</trackingnumber>
                        <scanlocation>FORT HAMILTON, NY US</scanlocation>
                        <weight>400</weight>
                </package>
        </trackit>
<iship.com.response>
```

FIG. 67

APPARATUS, SYSTEMS AND METHODS FOR ONLINE, MULTI-PARCEL, MULTI-CARRIER, MULTI-SERVICE ENTERPRISE PARCEL SHIPPING MANAGEMENT

CROSS REFERENCE TO RELATED APPLICATIONS

This is a continuation application of, and priority is claimed to: U.S. patent application Ser. No. 13/093,551, filed Apr. 25, 2011, the disclosure of which is incorporated for all purposes herein by reference as if fully stated here, which is a continuation application of, and which claimed priority to, and priority is claimed to, U.S. patent application Ser. No. 11/510,801, filed on Aug. 24, 2006, the disclosure of which is incorporated for all purposes herein by reference as if fully stated here, which claimed priority to, and priority is claimed to, and which is a divisional application of U.S. patent application Ser. No. 09/820,377, which was filed Mar. 27, 2001, the disclosure of which is incorporated for all purposes herein by reference as if fully stated here, and which claimed priority to, and priority is claimed to, U.S. Provisional Patent Application Ser. No. 60/192,723, filed on Mar. 27, 2000, and U.S. Provisional Patent Application Ser. No. 60/193,899, filed on Mar. 31, 2000, the disclosures of all of which are incorporated for all purposes herein by reference as if fully stated here.

Reference is further made to U.S. patent application Ser. Nos. 09/684,010 (Online, Multi-Carrier, Multi-Service Parcel Shipping Management Functional Alignment of Computer Devices), 09/684,871 (Apparatus, Systems and Methods for Online, Multi-Carrier, Multi-Service Parcel Shipping Management Featuring Shipping Location Comparison Across Multiple Carriers), 09/684,870 (Apparatus, Systems and Methods for Online, Multi-Carrier, Multi-Service Parcel Shipping Management Featuring Parcel Handling Rules Comparison Across Multi-le Carriers), 09/684,808 (Apparatus, Systems and Methods for Interfacing with Digital Scales Configured with Remote Client Computer Devices), 09/684,869 (Reporting Shipping Rates and Delivery Schedules for Multiple Service and Multiple Carriers), 09/685,078 (Apparatus, Systems and Methods for Online, Multi-Carrier, Multi-Service Parcel Shipping Management Featuring Notification Service Option Comparison for Multiple Carriers), 09/680,649 (Apparatus, Systems and Methods for Online, Multi-Carrier, Multi-Service Parcel Shipping Management Featuring Delivery Service Option Comparison for Multiple Carriers), 09/680,654 (Apparatus, Systems and Methods for Online, Multi-Carrier, Multi-Service Parcel Shipping Management featuring Shipping Rate and Delivery Schedule Comparison for Multiple Carriers), 09/684,865 (Apparatus, Systems and Methods for Applying Billing Options for Multiple Carriers for Online, Multi-Carrier, Multi-Service Parcel Shipping Management), 09/685,077 (Apparatus, Systems and Methods for Online, Multi-Carrier, Multi-Service Parcel Shipping Management Determination of Ratable Weight for Multiple Carriers), 09/684,014 (Apparatus, Systems and Methods for Zone Level Rating for each of Multiple Carriers), 09/684,861 (Apparatus, Systems and Methods for Determining Delivery Time Schedules for each of Multiple Carriers), 09/684,152 (Apparatus, Systems and Methods for Printing Dimensionally Accurate Symbologies on Laser Printers Configured with Remote Client Computer Devices), 09/684,866 (Apparatus, Systems and Methods for Online, Multi-Carrier, Multi-Service Parcel Shipping Management), all of which were filed Oct. 6, 2000 the disclosures of all of which are incorporated for all purposes herein by reference as if fully stated here, U.S. patent application Ser. No. 09/651,390 (Virtualized Printing of Indicia, Logos and Graphics) filed Aug. 29, 2000, U.S. patent application Ser. No. 09/651,389 (Method and Apparatus for Printing Indicia Logos and Graphics Onto Print Media) filed Aug. 29, 2000, and U.S. patent application Ser. No. 09/820,292 Apparatus, Systems and Methods for Online, Multi-Parcel, Multi-Carrier, Multi-Service Parcel Returns Shipping Management) filed on Mar. 27, 2001, the disclosure of which is incorporated for all purposes herein by reference as if fully stated here.

FIELD OF THE INVENTION

The field of the present invention is computer systems for shipping management, and specifically online computer systems for enterprise parcel shipping management.

BACKGROUND OF THE INVENTION

Major corporations, small businesses and individuals (the "Shipper(s)") ship billions of parcels every year. Each parcel carrier (the "Carrier(s)") has its own unique rating schedule, delivery and pickup rules and schedules, and certification requirements.

Within an enterprise, such as a corporation or governmental entity, a parcel to be shipped may pass through a number of different individuals and departments within the organization before shipment is accomplished. In a paper-based or non-integrated shipping system environment, the enterprise suffers lower productivity due to several employees within the enterprise repeatedly writing or entering the same or similar information. Consider the following illustrative example.

A customer service employee in the customer service department of a corporation is contacted by one of the corporation's customers. The customer orders a replacement part for a product previously purchased from the corporation. In a telephone conversation, the customer service employee records in writing shipping and payment information about the customer and the customer's order for the particular replacement part. The customer agrees to pay for shipping as well as for the replacement part. The customer service employee forwards the order and the shipping and payment information to the parts department. An employee in the parts department receives the order and the shipping and payment information. The parts department employee locates the replacement part, forwards the replacement part and shipping instructions to the shipping department and forwards the payment information to the accounting department for processing. The shipping department employee writes, or enters into a computer, much of the same information that was previously recorded by other employees of the same corporation, and analyzes any specific shipping requirements specified by the customer, to complete paperwork to ship the package in accordance with the corporation's shipping policies. The shipping department employee notifies the accounting department of the amount to be charged for shipping. An accounting department employee enters the payment information into a computer accounting system, processes the payment for the part and for the shipping, and sends a notification to the shipping department that payment for the part and for shipping the part has been processed.

In the illustrative example above and as is the case in many enterprises, the shipping origination employee, the customer service employee, is not a shipping professional. Nor are the shipping intermediaries, such as the parts department and accounting department employees. Such shipping origination and shipping intermediary employees may arrange for only a single shipment a day, or may need to ship many packages at once. Such shipping origination or shipping intermediary employees are often unfamiliar with shipping industry terms, and require that shipping options be described explained in plain English. They do not know or may often not remember corporate shipping policies such as which carrier to use under certain circumstances, what account number should be used, whether to enter charge-back codes, whether to fill in the declared value, etc. They may record the improper information on shipping requests.

Mailroom and shipping dock personnel, such as the shipping department employee described above, are, more than likely, professional shippers. They will be trained on the shipping policies and procedures for the organization, and part of their job may entail enforcing such policies and procedures. They may be familiar with the shipping system of at least one carrier. They spend significant amounts of time transcribing information from paper-based shipping requests onto Carrier airbills or into Carrier systems and often correcting, if they catch them, mistakes made by shipping origination or intermediary employees in recording shipping request information.

Shipping Managers set shipping policies for the enterprise. They are in charge of cost centers. Because they run cost centers and do not generate revenue for their company, they are sometimes rewarded on their ability to save money. Their job revolves around reducing costs and assigning costs to the appropriate department. Because their job is to reduce costs, Shipping Managers are not typically receptive to purchasing system solutions that have high system Total Cost of Ownership.

Shipping Management may work at different levels or locations within their organization. Some shipping management personnel may only need to review reports, while others may be responsible for coordinating with carriers, monitoring rates and establishing employee-user shipping privileges for each of possibly several corporate locations. Shipping Management Support Staff are responsible for routine administrative tasks.

Many enterprise shipping departments ("Enterprise Shippers") manually refer to a mixture of separate, individual paper-based and online systems (a "non-integrated multiple standalone Carrier system environment") to determine the rate for shipping a particular parcel and to determine the optimal carrier with which to ship that particular parcel according to the constraints and requirements involved. With regard to shipping a particular parcel, Enterprise Shippers must consider a combination of factors, including but not limited to parcel dimensions, parcel weight, origin/destination specifications, parcel value, parcel value loss protection, budgetary, timing, pickup, delivery, delivery notification, delivery service, and other service option constraints and requirements.

In a non-integrated multiple standalone Carrier system environment, effective comparison shopping across multiple carriers is generally difficult and time-consuming. Many enterprise shipping departments rely instead on one or two familiar Carriers rather than comparison shopping each parcel across multiple Carriers.

Once an enterprise shipping department employee (also "Enterprise Shipper") selects a particular Carrier, the Enterprise Shipper must label the parcel with the information appropriate for the selected Carrier. In a non-integrated multiple standalone Carrier system environment, the Enterprise Shipper must interpret and apply a particular Carrier's rules and requirements in order to prepare the necessary manifest documents to ship a particular parcel.

An Enterprise Shipper that deals with a particular Carrier on a recurring basis may set up an account with the particular Carrier ("Enterprise Account-Holder Shippers"). Some Carriers provide Enterprise Account-Holder Shippers with a copy of that Carrier's software system if one exists. Each individual Carrier's software system has its own unique look and feel.

Rather than learn multiple standalone Carrier systems, some Enterprise Shippers choose instead to rely on a manual system, including the manual preparation of parcel labels; some develop a dependency on a single Carrier-provided system even though such a policy often results in non-optimal shipping costs.

An Enterprise Shipping Management solution is needed that increases shipping origination, shipping intermediary, and shipping user productivity and that reduces shipping costs, improves shipping management, and has a low system Total Cost of Ownership.

SUMMARY OF THE INVENTION

The present invention provides a computer system (the "System", or the "Enterprise Shipping System") that is configured and programmed to provide enterprises, such as, for example, large corporations, governmental entities, and retail shipping entities, with online, multi-parcel, multi-carrier, multi-service enterprise parcel shipping management. The present invention provides a plurality of Enterprises with a single online user interface with which the Enterprise can provide Enterprise Shippers, shipping origination users and shipping intermediary users with an automated parcel management system for a plurality of supported Carriers for a plurality of services. The present invention provides for the hierarchical definition of users, including the establishment of at least one user for each Enterprise as a Super-Administrator with the highest level of privileges and authority for the Enterprise, and the identification of other users as Sub-Administrators, Desktop Users and Shipping Station Users. The present invention also provides for the hierarchical definition of organizational units within each Enterprise, including the definition of sites, groups within a site, and users within a group. The present invention further provides for a distinct definition of policies, privileges, and other types of specifications for each user level, each user, and each organizational unit. The present invention applies the user and organizational policies, privileges and other specifications as they apply to each particular user to drive the interactive interface with each particular user and to provide among other things, shipping options, shipping services, shipping rates, traveler and/or shipping label preparation, and shipment tracking.

The System prompts a user, authorized by a particular enterprise as an administrator, to input a set of shipping policy rules. The System collects the shipping policy rules and stores them in System databases. Shipping policy rules, shipping privileges, and related options established by an administrator are sometimes collectively referred to herein as shipping parameter specifications.

The System prompts each user to input user preferences for shipping. Each user can accept as defaults the preference settings established by the administrator. In the alternative, the user can set personal preferences. However, the System only allows users to set preferences that are a subset of the shipping policy rules set by the administrator.

The System prompts each user to input information about a package to be shipped and to input information about how the user wants the package to be shipped. Each parcel to be shipped is characterized by a set of package criteria. Each shipping request is characterized by a set of parcel shipping criteria. The System only allows the user to ship packages according to the shipping policy rules set by the administrator.

The System provides Enterprise Shippers with an online display comparison of multiple services offered by multiple carriers for a particular parcel from which the lowest cost or fastest delivery Carrier and Service can be selected by, or dictated to, origination and/or intermediary shippers. In one embodiment of the invention, the online display comparison is in the form of an expandable and contractible array. The user places a shipping order by selecting an entry from the comparison array (also referred to herein as the "Grid").

The System generates an internal system tracking number for the shipping order, and saves the internal system tracking number for the shipping order in a database.

The System generates a graphic representation of a shipping label corresponding to a particular shipping order and displays the graphic representation of the shipping label on a display monitor connected to a computer accessible by the user.

The System generates a set of printable shipping label data in response to a shipping label print request by a user and sends the set of printable shipping label data to a printer connected to the computer accessible by the user.

Each shipping order with a tracking number is characterized by a shipping status. The System generates a tracking report record depicting the shipping status of a shipping order in response to a user tracking report request for the shipping order.

The System increases user productivity with an easy to understand, wizard-like, browser-based interface featuring, among other things, personal, department, and corporate address books, shipping history with integrated tracking, common User Interface across multiple carriers, desktop label printing, shipment pre-processing, and in some embodiments, completion of international shipment documentation requirements.

Centralized reports provide Shipping Managers with the information required to negotiate the most favorable rates with Carriers and to audit Carrier performance. Centralized policy enforcement and reports improve chargebacks and cost reporting by more effectively implementing and enforcing shipping policies and procedures.

The total cost of ownership is low in that the preferred embodiment of the invention uses an ASP (Application Service Provider) model that provides inexpensive centralized maintenance of Carriers and standard rates, and centralized administration of users and shipping policy logic.

The System provides Enterprise Administrative features with which Shipping Management, among other things, defines an enterprise's policies, authorizes certain user privileges at various levels, and identifies reporting requirements.

The System also provides Enterprise Desktop features which facilitate desktop rating, shipping, and tracking by shipping origination and intermediary users and by Enterprise Shippers, in accordance with enterprise policies and procedures.

DESCRIPTION OF THE DRAWINGS

These and other features of the present invention are more fully set forth in the following description of exemplary embodiments of the invention. The description is presented with reference to the accompanying drawings in which:

FIG. 12 is a graphic representation of an exemplary home page for an exemplary embodiment of the invention once an Enterprise User has successfully Logged On;

FIG. 14 is a graphic representation of an exemplary Address Book Edit View Screen in an exemplary embodiment of the invention;

FIG. 15 is a graphic representation of an exemplary Locations List View Screen in an exemplary embodiment of the invention;

FIG. 18 is a graphic representation of an exemplary Carrier Preferences Screen in an exemplary embodiment of the invention;

FIG. 19 is a graphic representation of an exemplary Drop Off/Pickup Preferences Screen in an exemplary embodiment of the invention;

FIG. 20 is a graphic representation of an exemplary Package Options Preferences Screen in an exemplary embodiment of the invention;

FIG. 21 is a graphic representation of an exemplary Shipment Options Preferences Screen in an exemplary embodiment of the invention;

FIG. 22 is a graphic representation of an exemplary Applications Preferences Screen in an exemplary embodiment of the invention;

FIG. 23 is a graphic representation of an exemplary Payment Information Preferences Screen in an exemplary embodiment of the invention;

FIG. 24 is a graphic representation of an exemplary Price It Start Page in an exemplary embodiment of the invention;

FIG. 25 is a graphic representation of an exemplary Price It Shipping Estimate Screen in an exemplary embodiment of the invention;

FIG. 27 is a graphic representation of an exemplary Shipping Addresses Screen in an exemplary embodiment of the invention;

FIG. 28 is a graphic representation of an exemplary Shipping Payment Screen in an exemplary embodiment of the invention;

FIG. 29 is a graphic representation of an exemplary Order History display for a particular Customer in a particular Merchant's Online store;

FIG. 31 is a graphic representation of an exemplary Order Summary Screen for a particular Order Number for a particular Consumer from within a particular Merchant's Online store in an exemplary embodiment of the invention;

FIG. 32 is a graphic representation depicting an exemplary Returns Service Screen in an exemplary Merchant's Online store in an exemplary embodiment of the invention;

FIG. 37 is a graphic representation of an exemplary Returns Service Return Reason Screen in an exemplary embodiment of the invention;

FIG. 38 is a graphic representation of an exemplary Return Summary Screen in an exemplary embodiment of the invention;

FIG. 40 is a graphic representation of an exemplary multi-carrier, multi-service shipping rates comparison Preview Rates Screen Graphic Array in an exemplary embodiment of the invention;

Figure 42:
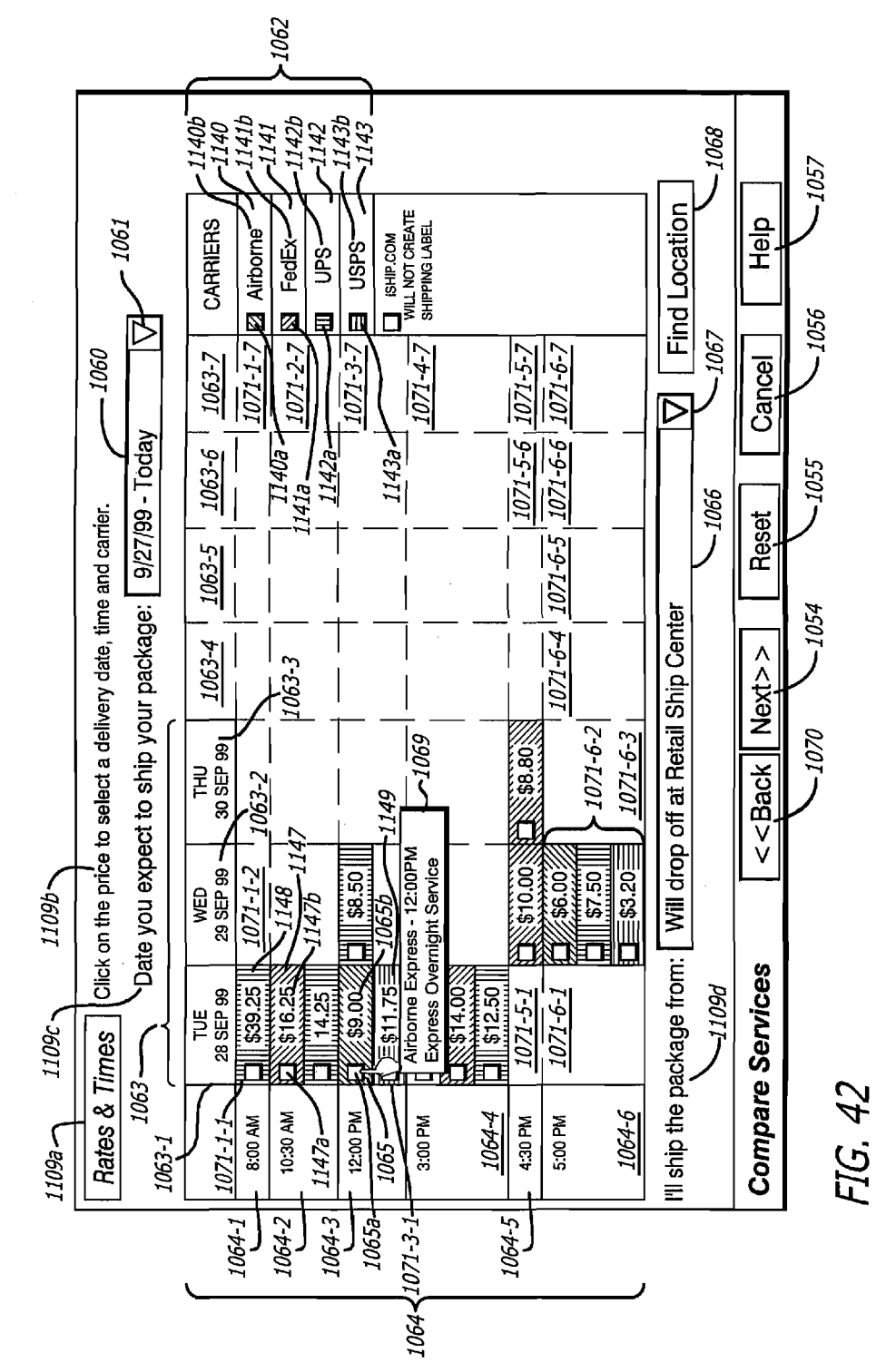

FIG. 42 is a graphic representation depicting an alternative exemplary embodiment of a dynamically dimensioned, multi-carrier, multi-service shipping rates comparison Graphic Array in an exemplary embodiment of the invention;

FIGS. 46a through 46c are high level flow diagrams depicting the initial timing and rating logic to develop a dynamically dimensioned, multi-carrier, multi-service shipping rates comparison Graphic Array in an exemplary embodiment of the System in an Internet environment;

FIG. 50 depicts the text of an exemplary hypertext link such as is created by an exemplary embodiment of the "Create Link" feature in an exemplary embodiment of the invention;

FIG. 51 is a graphic representation depicting an alternative embodiment of a hyperlink generated by the System in an exemplary embodiment of the invention;

FIG. 57 is a graphic representation depicting an exemplary Shipping Request Confirmation Screen in an exemplary embodiment of the invention;

FIG. 58 is a graphic representation of an exemplary Track It application Track a Shipment Screen in an exemplary embodiment of the invention;

FIGS. 59 and 60 are graphic representations of an exemplary Tracking Results Screen in an exemplary embodiment of the invention;

FIG. 63 is a graphic representation of an exemplary Shipping History Screen in an exemplary embodiment of the invention;

FIG. 66 depicts an exemplary XML formatted request for submitting a tracking request to a Carrier in an exemplary embodiment of the invention; and FIG. 67 depicts an exemplary successful tracking response, also in XML format, returned by the Carrier in an exemplary embodiment of the invention.

DETAILED DESCRIPTION OF THE INVENTION

A portion of the disclosure of this patent document, including but not limited to the renderings of graphic user interface displays in the FIGURES, contains material which is subject to copyright protection by Stamps.com, Inc. Stamps.com, Inc. has no objection to the facsimile reproduction by anyone of the patent document or the patent disclosure, as it appears in the Patent and Trademark Office patent file or records, but otherwise reserves all copyright rights whatsoever.

"iShip.com™" (sometimes also referred to herein as "ISHIP.COM" or simply as "iShip.com"), "iShip™" (sometimes also referred to herein as "ISHIP" or simply as "iShip"), "The Internet Package Shipper™" (sometimes also referred to herein as "THE INTERNET PACKAGE SHIPPER" or simply as "The Internet Package Shipper"), "Price It™" (sometimes also referred to herein as "PRICE IT" or simply as "Price It"), "Sell It™" (sometimes also referred to herein as "SELL IT" or simply as "Sell It"), "Track It™" (sometimes also referred to herein as "TRACK IT" or simply as "Track It"), "Ship It™" (sometimes referred to herein as "SHIP IT" or simply as "Ship It"), "Shipping Tools™" (sometimes referred to herein as "SHIPPING TOOLS" or simply as "Shipping Tools"), "My iShip™" (sometimes referred to herein as "MY ISHIP" of simply as "My iShip") and associated logos are trademarks of Stamps.com, Inc. The names of actual companies and products mentioned herein may be the trademarks of their respective owners.

The computer System of the present invention provides a plurality of Enterprises with a single online user interface with which the Enterprise can provide Enterprise Shippers, shipping origination users and shipping intermediary users ("Enterprise Users", or simply "Users") with an automated parcel management system for a plurality of supported Carriers for a plurality of services.

Figure 1:
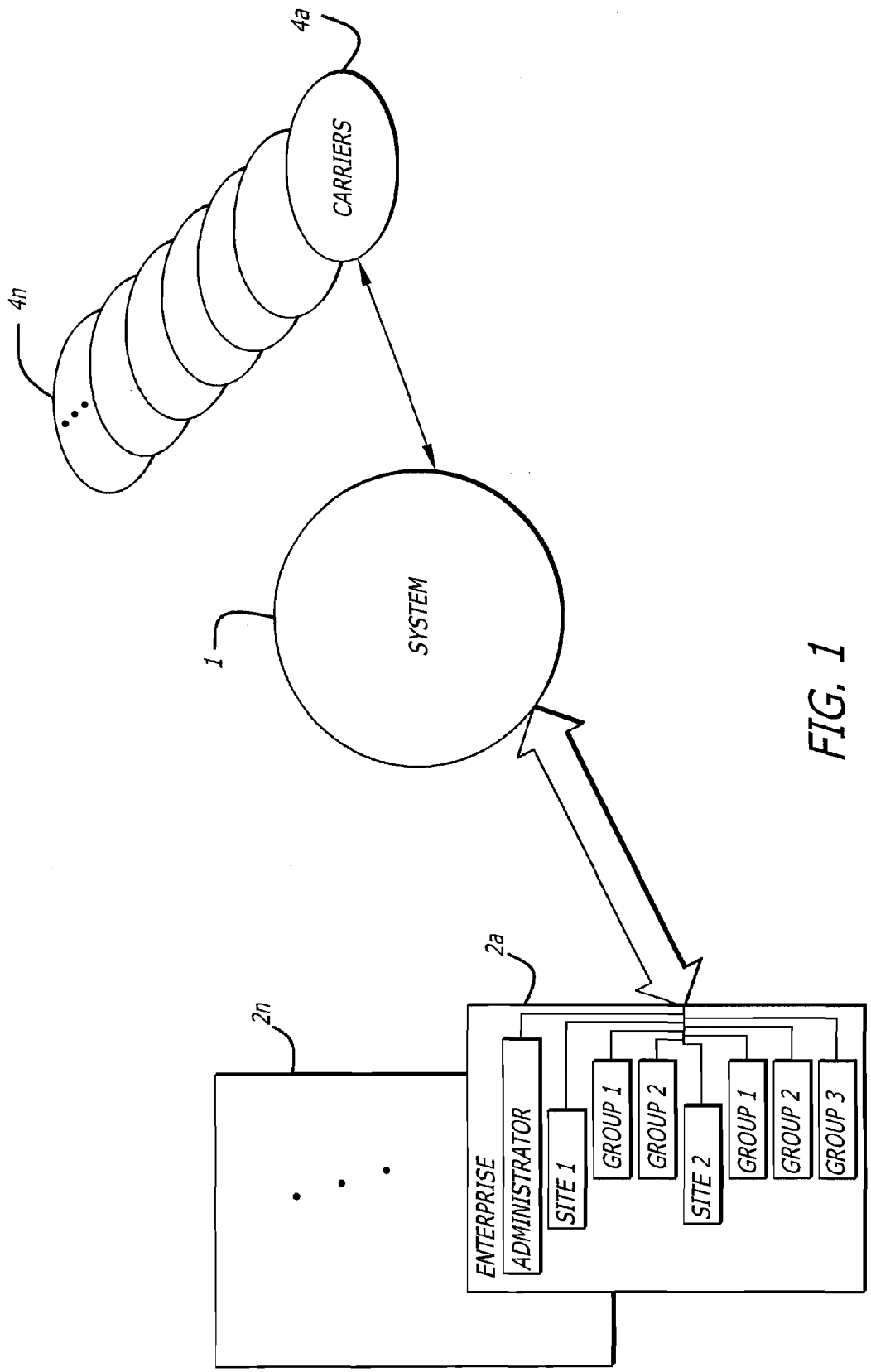
FIG. 1 is a graphic representation depicting the interface relationships provided by the System of the present invention between origination shippers, intermediary shippers, Enterprise Shippers and Carriers.

FIG. 1 is a graphic representation depicting the interface relationships provided by the System 1 of the present invention between a plurality of Enterprises 2a-2n, and Carriers 4a-4n. It should be noted that the use of suffixes such as "a" through "n" in connection with numbered elements of the FIGURES herein are exemplary and are not a limitation of the invention. Rather, the suffixes "a" through "n" are used to represent a plurality, but unknown number, of similar elements.

Carriers 4a-4n supported by the System include Carriers such as Airborne® (sometimes referred to herein as "AIRBORNE" or simply as "Airborne"), FedEx®, (sometimes referred to herein as "FEDEX" or simply as "FedEx"), United Parcel Service®, (sometimes referred to herein as "UNITED PARCEL SERVICE" or simply as "UPS"), USPS®, (sometimes referred to herein as "USPS"), and Yellow Freight® (sometimes referred to herein as "YELLOW FRIEGHT" or simply as "Yellow Freight"). The System 1 is completely expandable and scalable to include additional Carriers 4a-4n and additional Enterprises 2a-2n.

Figure 2:
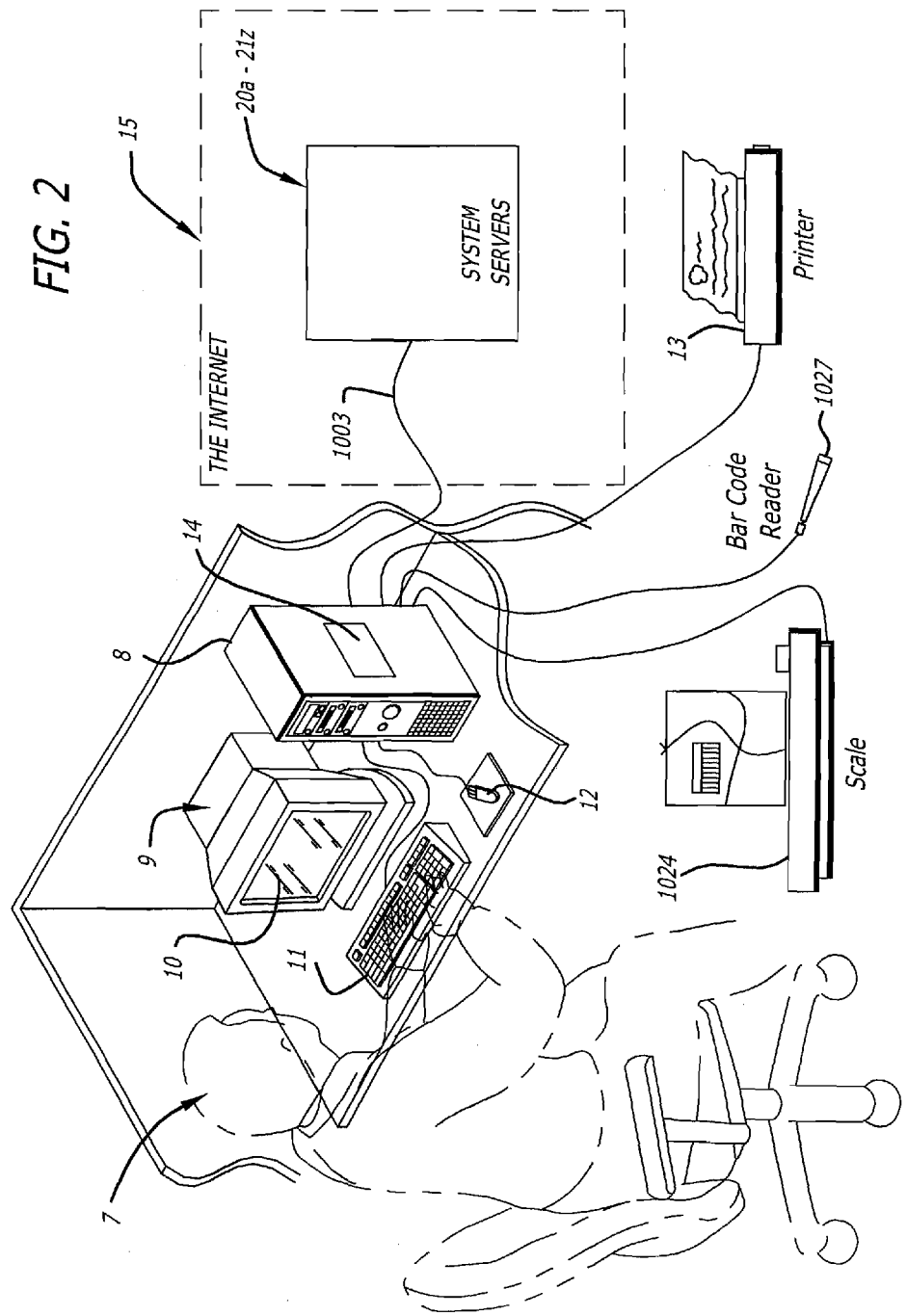
FIG. 2 is a graphic representation depicting an exemplary user computer configuration and the computer's interfaces with the System.

As depicted in FIG. 2, each Enterprise User 7 (which may be a Shipping Manager, an Enterprise Shipper, a shipping origination user, or a shipping intermediary user) has access to a computer 8, for instance a personal computer ("PC"). The computer 8 is configured with a display device 9 that provides a display screen 10. The computer 8 is further configured with one or more user input devices, such as, for example, a keyboard 11 and a mouse 12. The computer 8 is also configured with a printing device 13, such as a laser printer. If the computer device 8 serves as a Shipping Station, the computer 8 may be further configured with a weighing device such as a scale 1024 and a bar code reader 1027.

Enterprise Users access and browse the Internet 15 using a web browser 14 that generally resides and is executed on the user's PC 8 (with Windows 95, 98, NT 4.0, or 2000 Professional). The web browser 14 (such as Internet Explorer™ 4.0+, or Netscape Navigator™ 4.0+) allows the Enterprise User 7 to retrieve and render hyper-media content from one or more System Server computers, e.g., 20a-21z.

Figure 3:
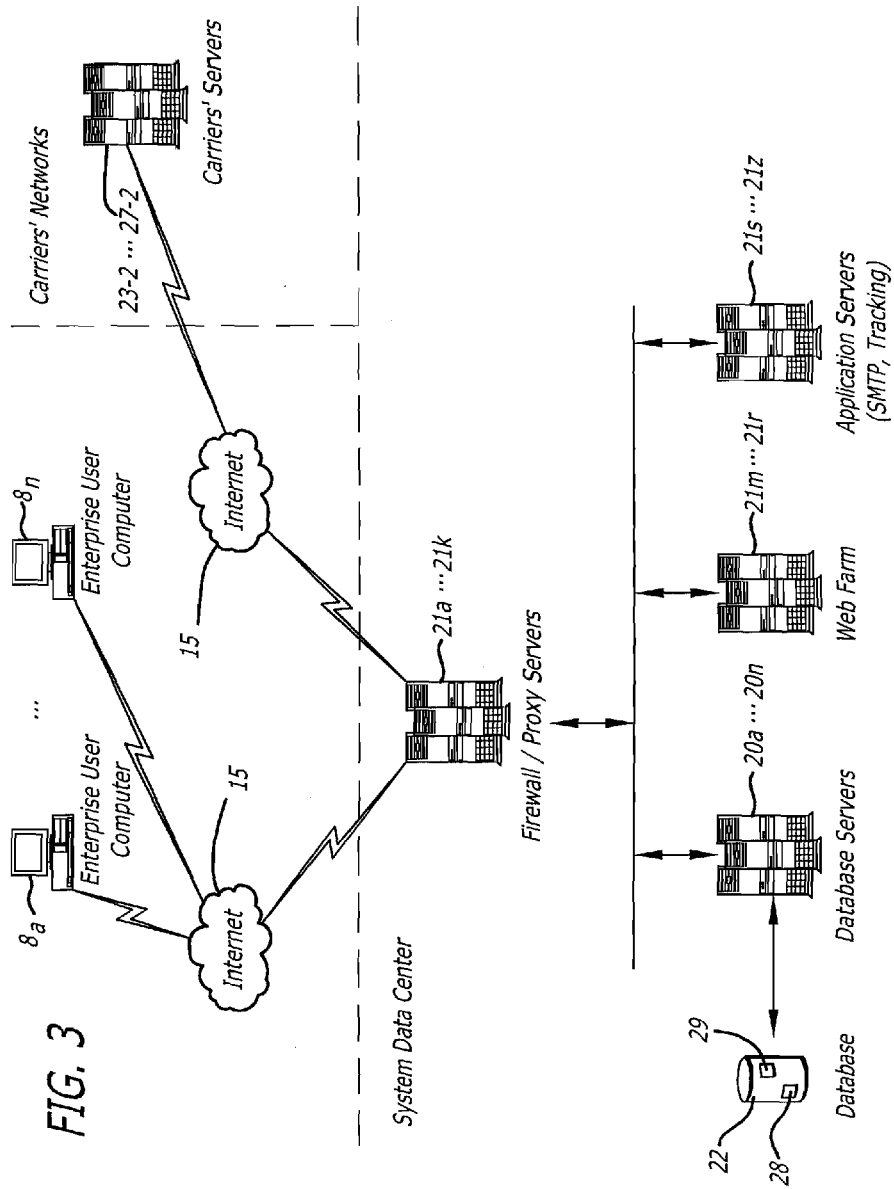
FIG. 3 is a graphic representation of an exemplary configuration of the System, and relationships with Carriers and Enterprise users.

FIG. 3 is a graphic representation depicting an exemplary view of the System Data Center and its interfaces with Enterprise computers 8a-8n, and Carrier Server computers 23-2 through 27-2, via the Internet 15.

As depicted in FIG. 3, the System provides a plurality of server computers 20a-21z ("servers" or "server computers"). Some of the server computers are configured as Web servers, e.g., 21m-21r. The Web servers 21m-21r are configured to perform multi-parcel, multi-carrier, multi-service parcel shipping management functions. The Web servers 21m-21r are sometimes referred to herein as "shipping servers" or "shipping Web servers".

Other servers are configured as Database Servers. In an exemplary embodiment of the invention, the Database Servers are SQL Servers. Some of the Database Servers are configured to access Rating Database Data. The Database Servers that are configured to access Rating Database Data are referred to as the Rating Servers.

The Web server computers communicate through the Internet with client computers. The client computers are used by shippers to interact with a user interface provided by the system.

In the exemplary embodiment of the invention, the system further provides at least one server computer that acts as a scheduler or "Load Balancer". The Load Balancer selects one of the plurality of shipping Web servers 21m-21r based on the load of work performed by that selected shipping Web server as compared to the other shipping Web servers. The Load Balancer directs incoming data to the selected shipping Web server for processing.

Figure 4:
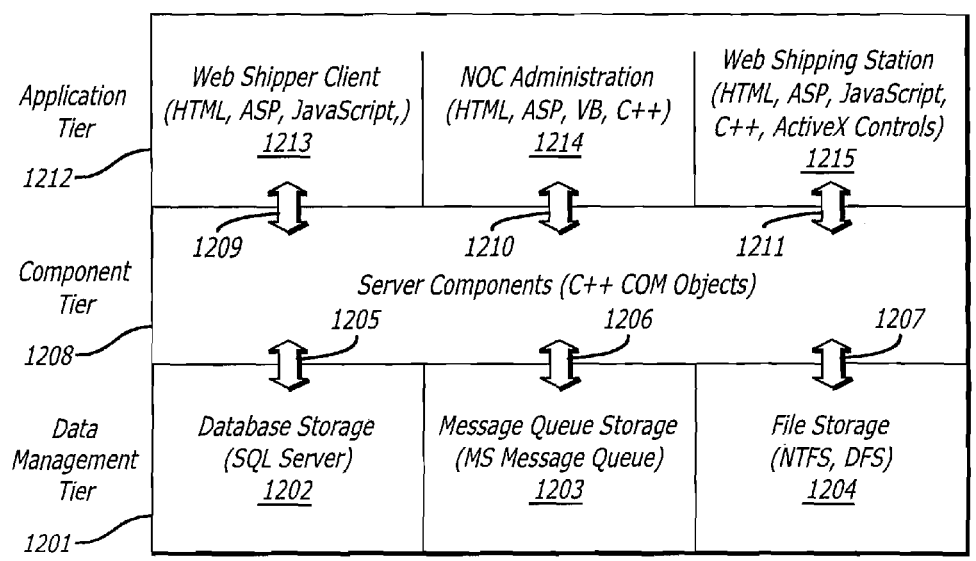
FIG. 4 is a high level System component diagram depicting an exemplary System Architecture in an exemplary embodiment of the System in an Internet environment.

An overview of an exemplary System architecture is depicted in FIG. 4. The overview depicted is exemplary and meant to be illustrative; it is not a limitation of the invention. As depicted in FIG. 4, one embodiment of the invention uses a three-tiered architecture.

The Data Management Tier 1201 is comprised of a Database Storage component 1202 that in the embodiment depicted uses an SQL Server; a Message Queue Storage component 1203 that in the embodiment depicted uses MS Message Queue; and a File Storage component 1204 that in the embodiment depicted uses NTFS, and DFS. Each of the Database Storage component 1202, the Message Queue Storage component 1203, and the File Storage component 1204, communicate with the Component Tier 1208 of the System architecture, communications by each component with the Component Tier 1208 represented by elements 1205, 1206 and 1207 respectively. According to the embodiment depicted in FIG. 4, the Server Components of the Component Tier 1208 use C++ programming language and COM Objects.

The Application Tier 1212 of the System Architecture is comprised of a Web Shipper Client component 1213 (which uses HTML (HyperText Markup Language), ASP and JavaScript), the NOC Administration component 1214 (which uses HTML, ASP, VB, and C++), and the Web Shipping Station component 1215 (which uses HTML, ASP, JavaScript, C++, and ActiveX Controls). Each of the Web Shipper Client component 1213, the NOC Administration component 1214, and the Web Shipping Station component 1215 communicate with the Server Components of the Component Tier 1208 as represented by the communication elements 1209, 1210 and 1211 respectively.

In one embodiment, the System is implemented in an NT environment. The description of the System as being implemented in an NT environment is exemplary and is not a limitation of the invention.

Continuing with FIG. 3, when an Enterprise User uses the System 1 to ship a package, one or more of the System's Servers, e.g., 21a-21n create a new System tracking number. When a new System tracking number is created, one of the System's Database Servers, e.g., 20a-20n, adds a new package record with the newly created System tracking number to a Package Table 28 that resides in the System database 22 and contains package records for System processed packages. An exemplary embodiment of the Package Table contains the following information: 1) Package Tracking State ID; 2) Package Shipping State ID; 3) Actual Delivery Time; 4) Delivered To information; 5) Shipping Date; 6) Carrier Tracking Number; 7) System Tracking Number; 8) Carrier ID; 9) Actual Package Weight; 10) Service Description; and 11) Package OID. The content of these fields are described further below.

In the exemplary embodiment of the invention, tracking is performed whenever possible using carrier-specific Tracking API's (Application Program Interface). For a Tracking API, a Carrier predefines a layout for tracking requests and predefines a layout for tracking request responses. The System 1 then provides tracking request data according to the layout predefined by the particular carrier. When the System 1 receives tracking request response data from the particular Carrier, the System 1 parses the response data according to the tracking request response layout predefined by the particular Carrier. In order to communicate with each Carrier's system, the System 1 uses the particular Carrier's Internet URL for the particular Carrier's web server system with which to make an HTTP connection to the Carrier's web server, e.g., 23-2, Depending upon the Carrier, the System's 1 tracking request and response interface with the Carrier's web server may be formatted and programmed using Hyper-Text Markup Language ("HTML"), Extensible Markup Language ("XML"), both HTML and XML, or any requirement specified by a Carrier.

In the exemplary embodiment of the invention, in cases in which a particular Carrier does not support an API, the System performs tracking using an alternative approach sometimes referred to as "web scraping". In order to track using the web scraping approach, the System 1 communicates with a Carrier by formatting HTML queries to the Carrier's Internet Website. The System 1 is programmed to receive and parse HTML responses from that Carrier's Website. The web scraping process simulates the presence and interactivity of a user at the particular Carrier's Website.

It will be understood by someone with ordinary skill in the art that the invention can be installed on an Intranet for an individual enterprise without departing from the spirit of the invention.

A. Enterprise Administration

As described in more detail below, the System provides for the hierarchical definition of users. The System provides for the establishment of at least one user for each Enterprise as a Super-Administrator with the highest level of privileges and authority for the Enterprise. The Super-Administrator can identify other users as Sub-Administrators. With this understanding in mind, general reference is sometimes made below to Super-Administrators and Sub-Administrators collectively as "administrators".

As described in more detail below, the System also provides for the hierarchical definition of organizational units within the Enterprise. For example, the System provides for the definition of sites, groups within a site, and users within a group. The System provides each Enterprise with the flexibility to determine the manner in which the Enterprise defines such organizational units, and the manner in which the Enterprise defines shipping policies and privileges for users in its organization. For example, a large company with many offices may decide to define each address as a distinct site. Another large company with thousands of people in a particular location may decide to define different departments as distinct sites.

As further described in more detail below, the System also provides for a distinct definition of policies, privileges, and other types of specifications for each user level, each user, and each organizational unit.

Figure 5:
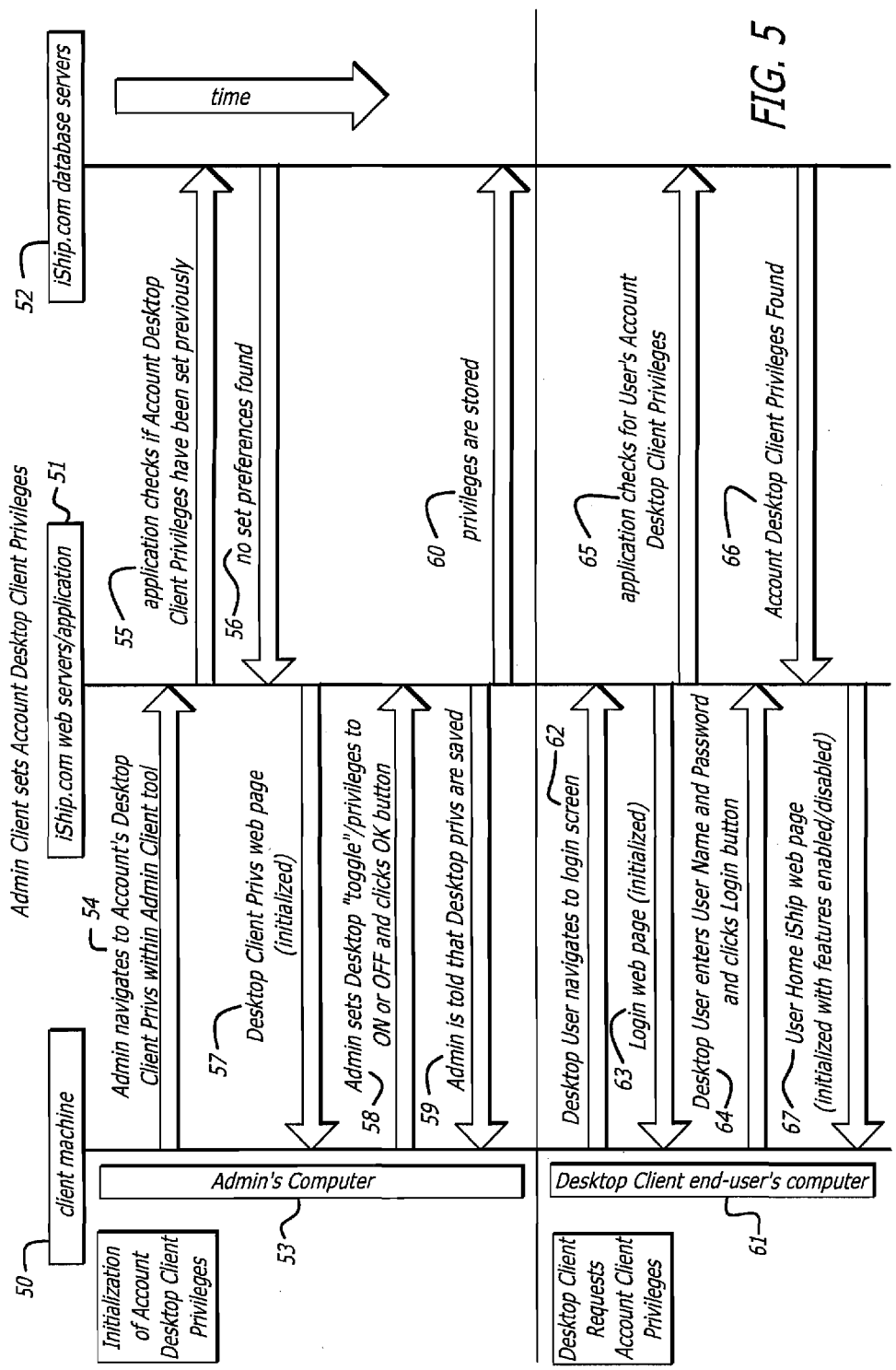
FIG. 5 is a high level System interactivity data and logic flow diagram depicting an exemplary embodiment of the process by which the System establishes shipping policies set by an Administrator and then enables features for Desktop Users according to the pre-established shipping policies.

FIG. 5 is a high level System interactivity data and logic flow diagram depicting an exemplary embodiment of the process by which the System establishes shipping policies set by an Administrator and then enables features for Desktop Users according to the pre-established shipping policies. As depicted in FIG. 5, the System provides Enterprise Administrative features (sometimes referred to herein as the "Administrative Client") with which Shipping Management, among other things, defines an enterprise's policies, authorizes certain user privileges at various levels, and identifies reporting requirements.

As depicted in FIG. 5, Administrative user interface features are accessible through the Administrator's computer 53 client machine 50. The Administrator selects the Account's Desktop Client Privileges within the Administrative Client tool 54. The Administrative application, running on the System servers 51 checks the System databases 52 to determine whether the Account Desktop Client Privileges have been previously set 55. If no set preferences are found 56, the Administrative client notifies the System servers to display the Desktop client privileges web page 57. The Administrator sets ("toggles") Desktop privileges by indicating whether each privilege is On or Off and clicks an "OK" button when complete 58. The System saves the privilege settings 60 and notifies the Administrator that the privilege settings have been saved 59.

As depicted in FIG. 5, a Desktop User 61 for which privileges have been set, subsequently attempts to log in to the System 62. The System initializes the Log In web page 63. The Desktop User enters a User Name and Password and clicks the Log in button 64. The System checks the System databases 52 for the User's Account and Desktop Client Privileges 65. If the User's Account and Desktop Client Privileges are found 66, the System displays the System Home Page and initializes the features available for the Desktop User as previously enabled or disabled by the Administrator 67.

Each Enterprise has a Super-Administrator who is given the highest level of privileges and authority to define sites, groups, and other administrators (Sub-Administrators). Sub-Administrators can perform the same functions as Super-Administrators for the hierarchical level (e.g., site, or group) for which the Sub-Administrator is defined unless the Super-Administrator, or some higher-level Sub-Administrator has restricted their level to do so.

The System enables an administrator to define a plurality of shipping locations, also referred to as sites. Each site is a distinct shipping location that may have individual carrier accounts and customized rates, as well as distinct users, associated with it. As part of the site definition, the administrator may specify such things as: origin address information; available Carriers available for all users of that site, including carrier account and rate information; available drop-off locations, including corporate drop-off locations, if any, and/or carrier drop-boxes, offices, call-for-carrier-pick-up, MBE locations, etc.; instructions to be provided on the bottom half of the shipping/traveler label; and the traveler label format to be used.

The System is scalable from an administrative standpoint in that it provides for the definition of any number of sites, groups and users. In one embodiment of the invention, site creation privileges are limited to the Super-Administrator; site editing and maintenance tasks can be performed by other administrators.

The site definition for the site with which each particular User is associated, and the particular User's privileges as established by the User's administrator, drive the options displayed on the Desktop shipping screens for the particular User.

For each site, the administrator can define different pick-up and drop-off options available for getting shipments to the carrier, including the cutoff time for each option. For each site, the administrator can define distinct methods by which a package may be provided to each Carrier, including: corporate drop-off locations (such as a mailroom, a receptionist's desk, etc.); call for Carrier pick-up; Carrier drop-box; staffed Carrier service center; or retail shipping locations such as Mail Boxes Etc.

For each Carrier delivery method, the System provides the administrator with the ability to define an associated cutoff time, the relevant Carrier or Carriers, and descriptive information about the option, such as, for instance, text providing the location, such as address information, or phone numbers in the case of call for pick-up. The drop-off location that a particular User chooses drives the instructional text provided on the shipping or traveler label that the particular User chooses to print.

As will be described in more detail below, a "traveler" label is not an actual shipping label. Rather, a traveler label is a pre-processing label that the User chooses to print and then provides with the package to an Enterprise Shipper; the receiving Enterprise Shipper uses the traveler label to complete the processing necessary to print a shipping label.

Figure 6:
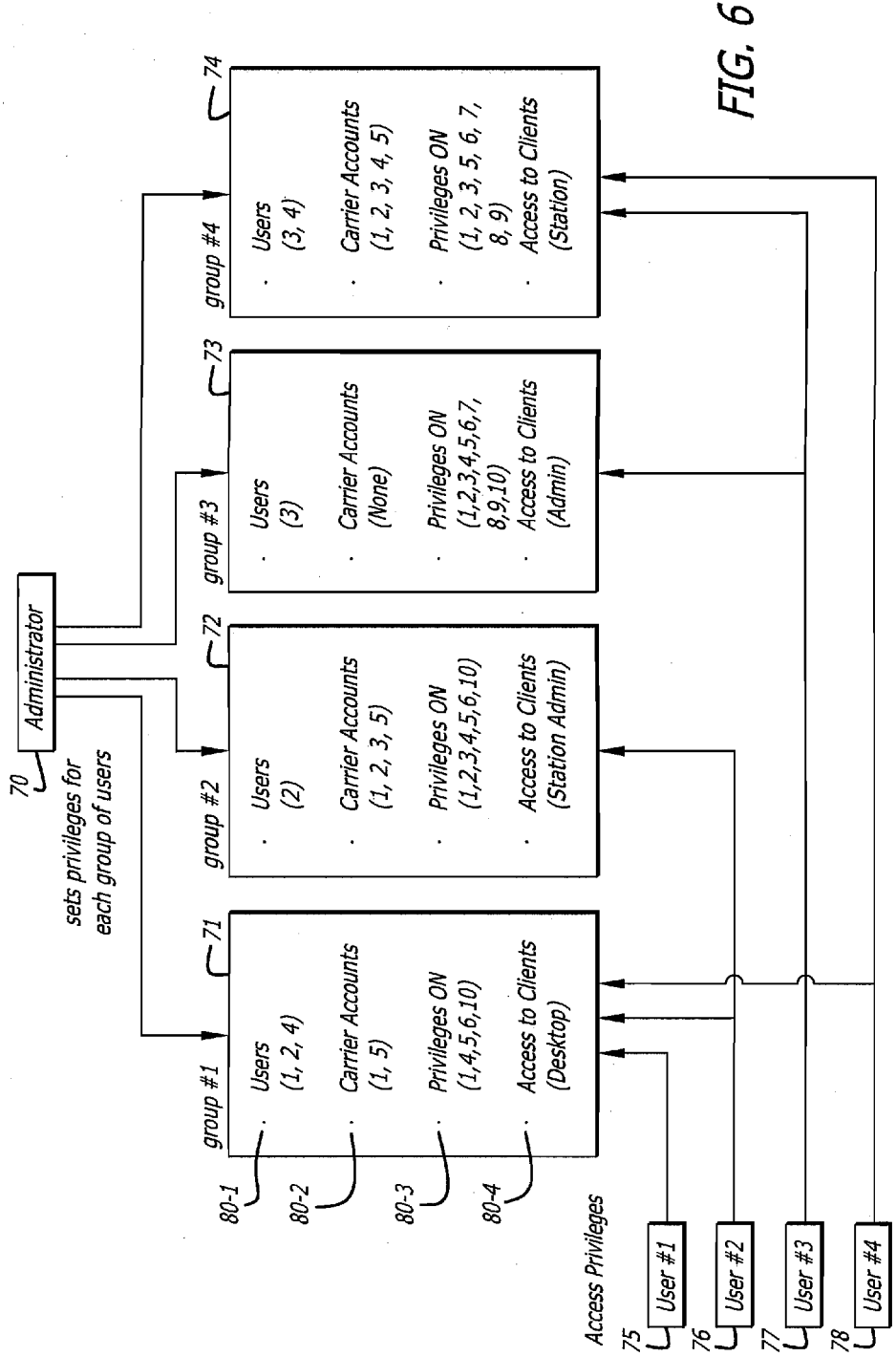
FIG. 6 is a graphic representation depicting an illustrative example of an Administrator establishing privileges for a number of groups of users.

For each site, the administrator can create a plurality of groups; each group can be defined to contain a distinct list of individual Users. FIG. 6 is a graphic representation depicting an illustrative example of an Administrator 70 establishing multiple groups 71-74. Each of the groups 71-74 is accessible by certain Users 75-78. For example, as depicted in FIG. 6, the first group 71 is accessible by the first User 75, the second User 76, and the fourth User 78. For the first group 71, the Administrator has enabled Carrier Accounts for the first and fifth Carriers 80-2, certain specified privileges 80-3, and access to only the Desktop Client 80-4 (possible clients include Administrator, Desktop, and Shipping Station).

The System provides the administrator with the capability to add, edit and delete groups, to specify a group's site, identify (add or delete) the Users contained within each site, and maintain (add, change or delete) User privileges and User defaults assigned to each group. The System provides the administrator with the capability to extract a list of all User e-mail addresses for the Users within a particular group.

Within each group, the administrator can manage User accounts, including creating and deleting User accounts, User security information, and User preference information. The System provides the administrator with the ability to move Users between groups, and to maintain User security information and User information such as return addresses, e-mail addresses, and User preferences. The System provides the administrator with the ability to maintain User security information through such options as resetting a User's password, requiring that a User's or a group of User's passwords be changed on next use, and suspending or reactivating a User's account or password. In one embodiment of the invention, the System will provide the administrator with the capability to define password aging intervals, password length, password content rules, and other types of User security settings.

The System further provides the administrator with the ability to bulk load users into a group. When bulk loading users, the System provides the administrator with the capability to upload a file containing User IDs. The administrator can commit an uploaded file of User IDs to a particular group with a common password; the System will then require each User in the group to change the common password to an individual password upon first use.

For each group, the administrator can assign different User privileges. Administrator-established privileges for each particular User controls the functionality available to the particular User. On a Group basis, the System provides the administrator the ability to assign User privileges such as:

1) Availability of defined Carriers (including carrier accounts), Carrier services, and Carrier service options in the Ship It and Price It functions of the Shipping System;

2) Availability of Price It and Ship It functional areas;

3) Availability of defined drop-off locations;

4) Ability to print shipping labels vs. traveler labels, by Carrier or by service;

5) Availability of different payment methods;

6) The rate set(s) to use;

7) Ability to use the Desktop function, the Shipping Station function, or both (in one embodiment, the Shipping Station function is shipping-label-print-capable and the Desktop function is not);

8) Ability to run End of Day processing.

For each group, the administrator can delegate administrative tasks and can assign different administrative privileges to control the administrative tasks performed by group administrators. In one embodiment of the invention, assignable administrative privileges include the ability to: create/delete corporate sites; edit corporate site information; create/delete/edit carrier accounts; create/delete groups; edit group information, including assigning user privileges to groups; create/delete/edit user information; create users with administrative privileges; create/delete/edit shared address books; and define and run reports. Administrators can only create administrators and assign administrative privileges with privileges equal to or less than their own.

The End-of-Day processing privilege is picked up by the Desktop function to enable display of an End-of-Day processing link. Other administrative privileges picked up by the Desktop function enable the display of the appropriate Administrative link.

An administrator can specify default user preference information and specify whether or not the preference is editable by a User. An administrator can also edit individual User preferences. The System warns the administrator if editing a default preference for an existing group of Users would overwrite or override existing User preference settings. The Desk Top Shipping application uses the User preference settings established by the administrator.

The Super-Administrator can alter certain system settings that are to be applied on a company-wide basis.

Administrators with the proper privileges can modify settings that apply on a customer-wide, enterprise-wide basis, including: return e-mail address and "from" e-mail address for system generated e-mails; message text to use for different system generated e-mails, such as notifications, system welcome e-mails, and the like; header and footer HTML information; enable and disable "sticky" logins for the Desk Top Shipping application; allowable number of unsuccessful login attempts; configurable inactivity time before logout; enable and disable password recovery methods available through the Desk Top Shipping application, such as through the login page; logoff URL to which the System is directed at logoff; and toggle on/off address validation.

Administrators with the proper privileges can define status messages that will appear on the home page for the Desk Top Shipping Application User. There are several levels of messages, including: 1.) Desk Top wide status messages that are to be shown to one or more Desk Top customers; 2.) Customer-wide messages—defined by an administrator for a particular enterprise for circulation to all Users for that enterprise; 3.) Site-specific messages—defined by an administrator for a particular enterprise for circulation to all Users for a particular Site; and 4.) Client specific messages, e.g., to be circulated to all Desk Top Users for a particular enterprise, to all administrators for a particular enterprise, or to all Shipping Station Users (in an embodiment in which a Shipping Station application is provided separately from the Desk Top application).

The System provides the administrator with the capability to set a status message expiration date or validity period so that the administrator does not have to remember to "turn off" a message. The System supports multiple messages at any one time. The System uses the available screen size to determine the limit for messages based on the size of each message and the number of messages. The System supports prioritization of messages so that messages with the highest priority are displayed most prominently, e.g., at the top of the messages displayed.

The System provides administrators with limited maintenance capability for shipments entered by Users. For example, administrators can, among other things: 1.) view or void shipments with traveler labels printed but with no shipping label printed; and 2.) perform End of Day processing. Users with the proper privileges can run end-of-day processing through either the Administrator application or through the Desk Top Application.

Administrators with the proper privileges can create and manage (edit, delete, update individual address book entries) shared address books for use by Users. Administrators can create shared address books at enterprise, site and group levels and can import address data into the shared address books to load the addresses. Administrators with the proper privileges can upload a file containing addresses into the System and import the addresses into specific address books for which the administrator is authorized to create. In one embodiment, the import file is a text file formatted according to specific System requirements.

The System further provides a "live" interface with pre-existing address book systems so that maintenance to the pre-existing address book system(s) is automatically reflected in the System address books. In one embodiment, this "live" address book interface is limited to the enterprise level. In one embodiment, the "live" address book interface uses hierarchical levels in the pre-existing address book system(s) with which to update appropriate System address book levels. Individual Users can establish personal User address books. However, individual Users can only update enterprise, site, group or other shared address books if the User has User address book maintenance privileges and then only for address books "owned" by entities (enterprise, site, or group) for which the User has such privileges.

In order for Users to be able to ship with different Carriers, the administrator sets up each Carrier with which the enterprise will ship with account numbers, rates, etc. Administrators with the proper privileges can enable or disable particular Carriers for each site.

The System provides the administrator with the capability, for each site, to: 1.) select for use by a particular site Carriers from a plurality of all Carriers supported by the System; 2.) assign a Carrier account number for each Carrier for that site; 3.) assign the enterprise's custom rates to each Carrier; and 4.) subject to Carrier limitations and approval, commission each site, as appropriate, for electronic label printing. Administrators can define more than one Carrier for each site, and can assign more than one account for each Carrier for each site. Carrier account numbers must be set up with the Carriers as well as in the System. In one embodiment, the System provides electronic commissioning of Carrier accounts.

Administrators can maintain rate information, including custom rates from Carriers for the Enterprise, Site or Group, as appropriate. In one embodiment, custom rates are set by the System's administrator for each enterprise supported by the System. In an alternative embodiment, administrators with the proper privileges define the enterprise's custom rates to the System.

In an embodiment that supports administrator rate maintenance, administrators with the proper privileges can maintain the enterprise's rate information for each Carrier selected for use by that enterprise. The System provides the administrator with the capability to: 1.) upload the enterprise's rate information for import into the System; 2.) define any percentage markups and/or fixed handling charges to be added to the enterprise's custom rates for the Price It feature (described further below) of the Desk Top Shipping application; 3.) define any percentage markups and/or fixed handling charges to be added to enterprise's custom rates for the Ship It feature (described further below) of the Desk Top Shipping application; 4.) specify whether the System transactions fees should be added to the enterprise's custom rates for the Price It and/or the Ship It features of the Desk Top Shipping Application and specify the fees to be added; and 5.) create rate sets. When generated by the Desk Top Shipping Application (or the Shipping Station Application) of the System, the Graphic Array Comparison (described further below) will display prices that include any such appropriate percentage markups, handling charges, and/or transaction fees as established through the Administrator feature of the System. Accordingly, each enterprise can charge such items back to the appropriate cost centers in addition to charging the cost centers with the Carrier shipping charges.

The System provides administrators with the capability to obtain management summary reports according to various parameters, including among other things, for different dates, enterprise levels and types of shipping activity taking place within the enterprise's account. Management reports are available at the enterprise level, site level, group level, or User level. Such reporting is subject to privilege and accessibility levels. The administrator specifies the desired reporting parameters and select the report or reports from available types of reports.

In one embodiment of the invention, given a particular date range and reporting level, the System provides the administrator with the capability to select from a variety of types of reports, including, for example: 1.) piecharts for each Carrier showing service usage; 2.) histogram showing weight distribution; 3.) histogram showing destination distributions by state; 4.) table showing package totals and shipping charge totals by carrier, average weight, charge, and cost per pound, all broken down by sub-level.

The System further provides administrators with the capability to obtain detailed activity reports for different dates, levels and types of shipping activity taking place within the company's account. Activity Reports provide detailed listings of shipping activities and charges for use by groups, and cost centers to verify shipping activities and for use by management to charge back shipping activities.

Activity Reports are available at enterprise level, site level, group level and/or User level. Administrators can specify the date range and reporting level and can specify reporting breaks based on a variety of factors, including, for example: site, Carrier, group, Shipper's Reference Number, or User. For each break, itemized shipments are reported with a variety of fields, including, for example: date, sender (by User ID), rate destination (may be detailed, or summary), reference number(s), weight, Carrier, and Carrier/Service. Each break reports the total of shipments and shipping charges; the next break item begins a new page.

The System further provides the administrator with the ability to request activity reports in the form of data. In one embodiment, report data is provided in the form of a delimited text file for import and analysis into an analysis and reporting tool such as, for example Microsoft® Excel®. Reports for a given level, whether Activity or Management, are only accessible to Users or Administrators with reporting privileges at that level or higher.

B. Enterprise Desktop Shipping

In addition to the Administrative Client, the System also provides Enterprise Desktop features (sometimes referred to herein alternatively as the "Desktop Client", the "EED" (which stands for "Enterprise Edition Desktop"), or the "Enterprise Desktop Client") which facilitate desktop rating, shipping, and tracking by shipping origination and intermediary users and by Enterprise Shippers, in accordance with enterprise policies and procedures.

Attached hereto is Appendix A, which is incorporated here as if fully stated here and is a part hereof for all purposes. Appendix A hereto is a functional specification for one exemplary embodiment of the Enterprise Desktop Client. Appendix A contains exemplary screen renderings, field descriptions, field edits, and data relationship descriptions for many of the functions described below.

In one embodiment of the invention, a Shipping Station Client is provided by the System which is distinct from the Enterprise Desktop Client. In such an embodiment, the Shipping Station Client is used to finalize shipping documents for which data is originated in the Enterprise Desktop Client.

1. First-Time User Setup.

Enterprise Desktop Client Users ("Desktop Users", or simply "Users") are directed by the System though a special registration setup path when the User logs on to the System for the first time. The System is sometimes referred to herein as iShip, or the iShip system. The registration setup path enables Users to specify personal default parameters, including, for example, the User's:

e-mail address
return address and phone number
preferred drop-off location for their site
preferred carrier
Other preferences maintained by the system (as will be discussed in the User Preferences Section 2 below).

Not all of the personal default parameters (return address, for example) will be editable depending upon settings established by the Administrator. The Administrator can control via the Administrator client which User defaults are editable by non-administrator User's.

If so configured by the Administrator, the registration setup path will require the first-time User to change the first-time password established on their behalf by the Administrator.

Figure 7:
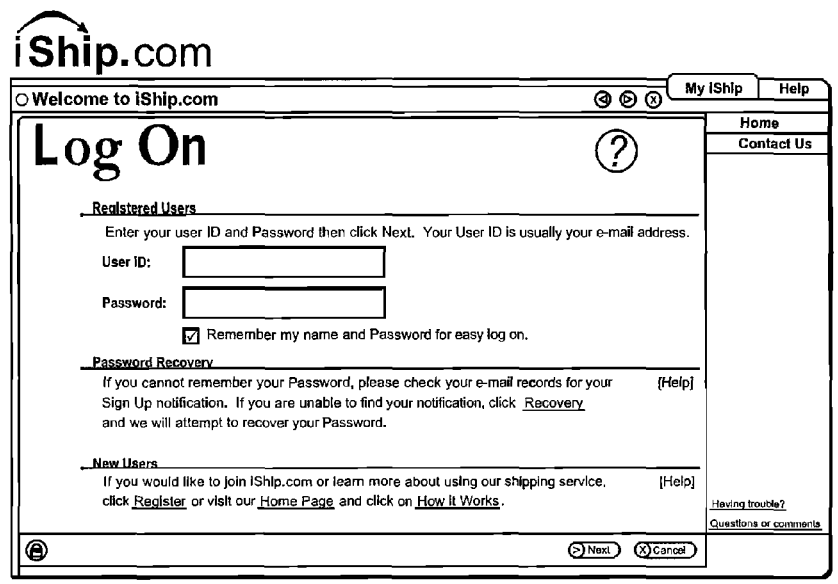
FIG. 7 is a graphic representation depicting an exemplary Log On System Screen in an exemplary embodiment of the invention.
Figure 8:
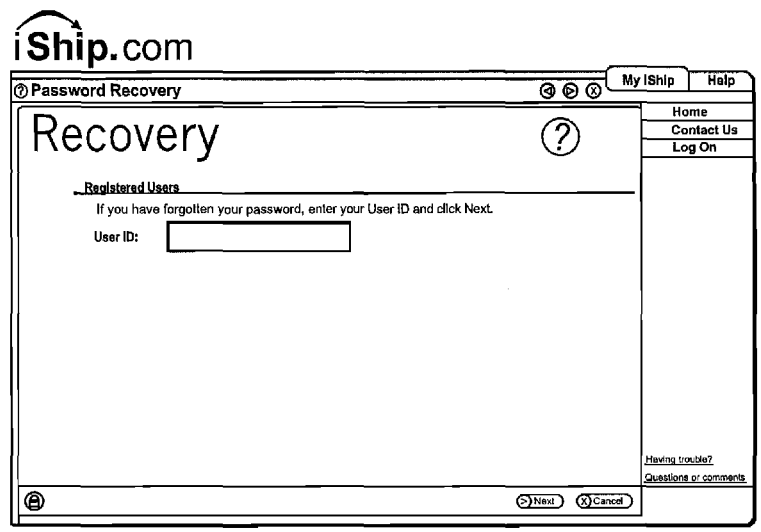
FIGS. 8 through 11 are graphic representations of exemplary Password Recovery Screens in an exemplary embodiment of the invention.
Figure 9:
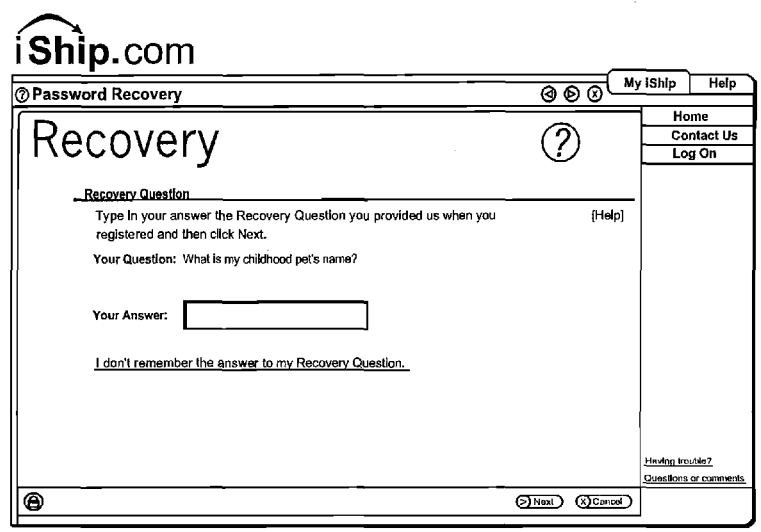
Figure 10:
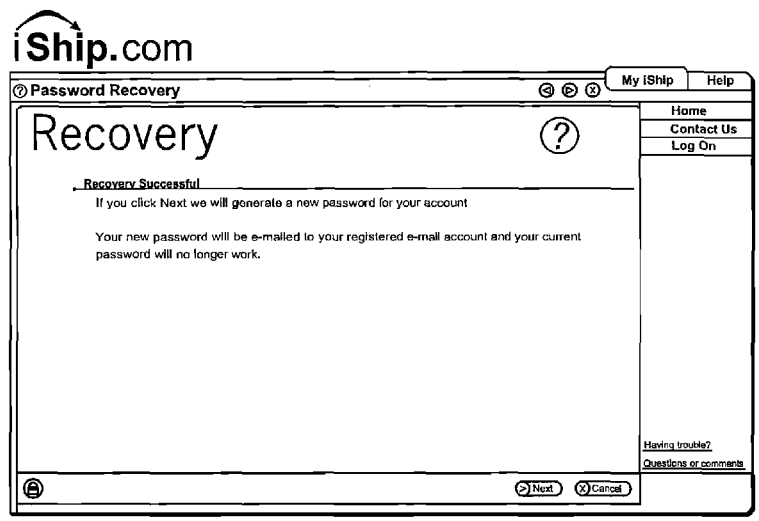
Figure 11:
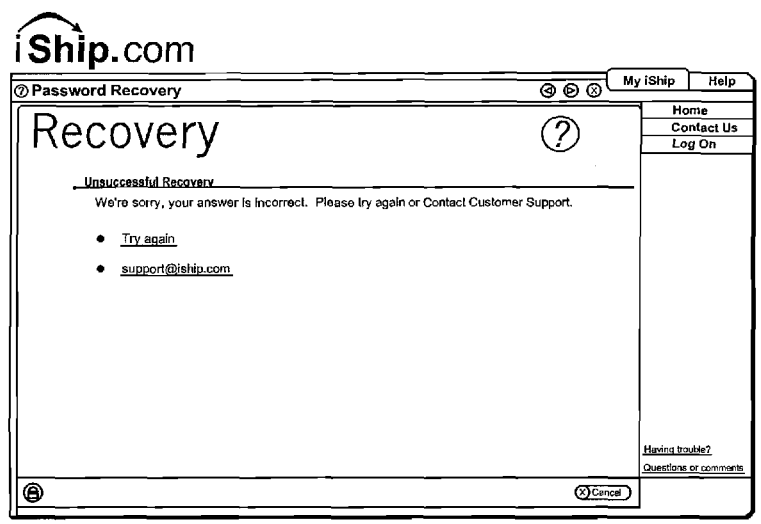

The user interface for User registration is customizable with the particular Enterprise's intranet style. The System provides the Administrator with the capability to customize the look and feel of the User registration interface by customizing the headers, footers, and color scheme used in the interface screens. The User registration interface identifies each User in the System databases as registered to a specific enterprise account. FIG. 7 is a graphic representation depicting an exemplary Log On System Screen in an exemplary embodiment of the invention.

Enterprise Desktop Client user registration is available to users accessing the System from the Internet and through most common corporate firewalls. In one embodiment, the System web site is optimized for Netscape Navigator 4.04 or higher, and Internet Explorer 4.0 or higher.

The Administrative Client, as described above, provides the Administrator with the capability to bulk load users for a given site, assigning them each a default password, and requiring the password to be changed after first use. The Administrative Client also provides the Administrator with the capability to specify status message to appear on the Enterprise Desktop Client main page ("My iShip"), and to obtain e-mail addresses for their corporate users.

2. User Preferences

The System provides each individual Desktop User with the capability to set preferences for how they prefer to do their shipping. Preference defaults may be set by the Administrator. The Administrator may specify some defaults as non-editable. Generally, Users may set preferences for various parameters, including, for example:

Return address, phone number, e-mail address
Password
Shipper's Reference 1 (such as a particular chargeback code)
Preferred carrier
E-mail notification (on or off)

The System provides a separate area of the user interface for setting and altering user preferences.

User preferences are only accessible by the User that owns them (the "owner User") and by the governing Administrator (the Administrator with the authorization to maintain that User's preferences). Certain preferences may be defined by the Administrator as not editable by the user.

Figure 16:
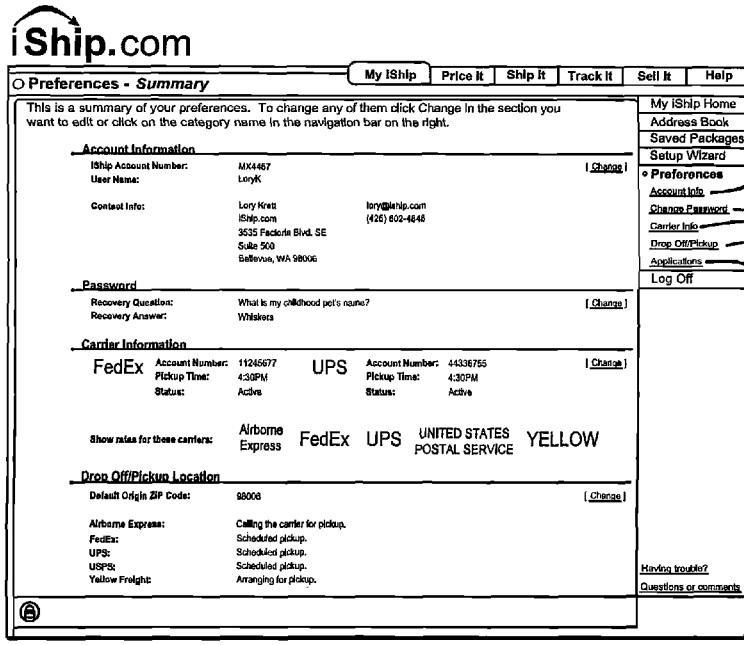
FIG. 16 is a graphic representation of an exemplary Preferences Summary Screen in an exemplary embodiment of the invention.

FIG. 16 is a graphic representation of an exemplary Preferences Summary Screen in an exemplary embodiment of the invention. From the Preferences Summary Screen, the User can select an Account Info Link 110, a Change Password Link 111, a Carrier Info Link 112, a Drop Off/Pickup Link 113, and an Applications Link 114.

Figure 17:
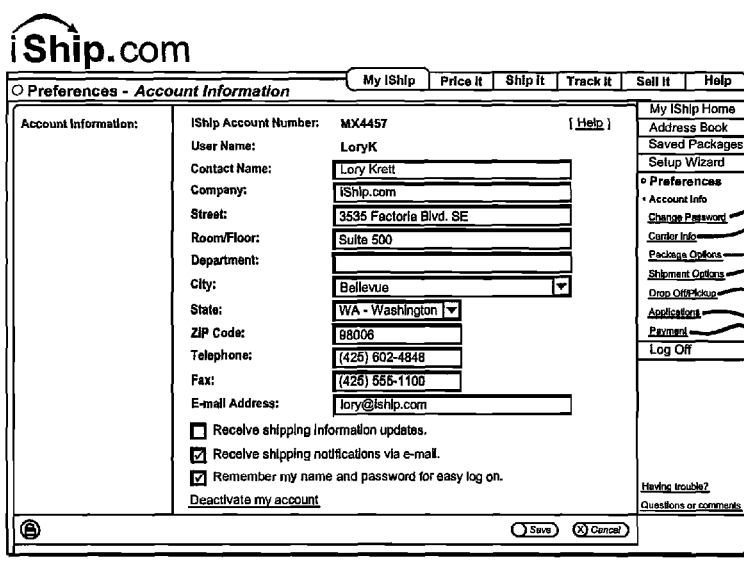
FIG. 17 is a graphic representation of an exemplary Account Information Preferences Screen in an exemplary embodiment of the invention.

If the User selects the Account Info link 110, the System displays an Account Information Preferences Screen in which the User can accept as defaults the Account Information Preference settings established by the Administrator and/or can, to the extent authorized by the Administrator, edit the Account Information Preference settings. FIG. 17 is a graphic representation of an exemplary Account Information Preferences Screen in an exemplary embodiment of the invention.

Figures 18, 19:
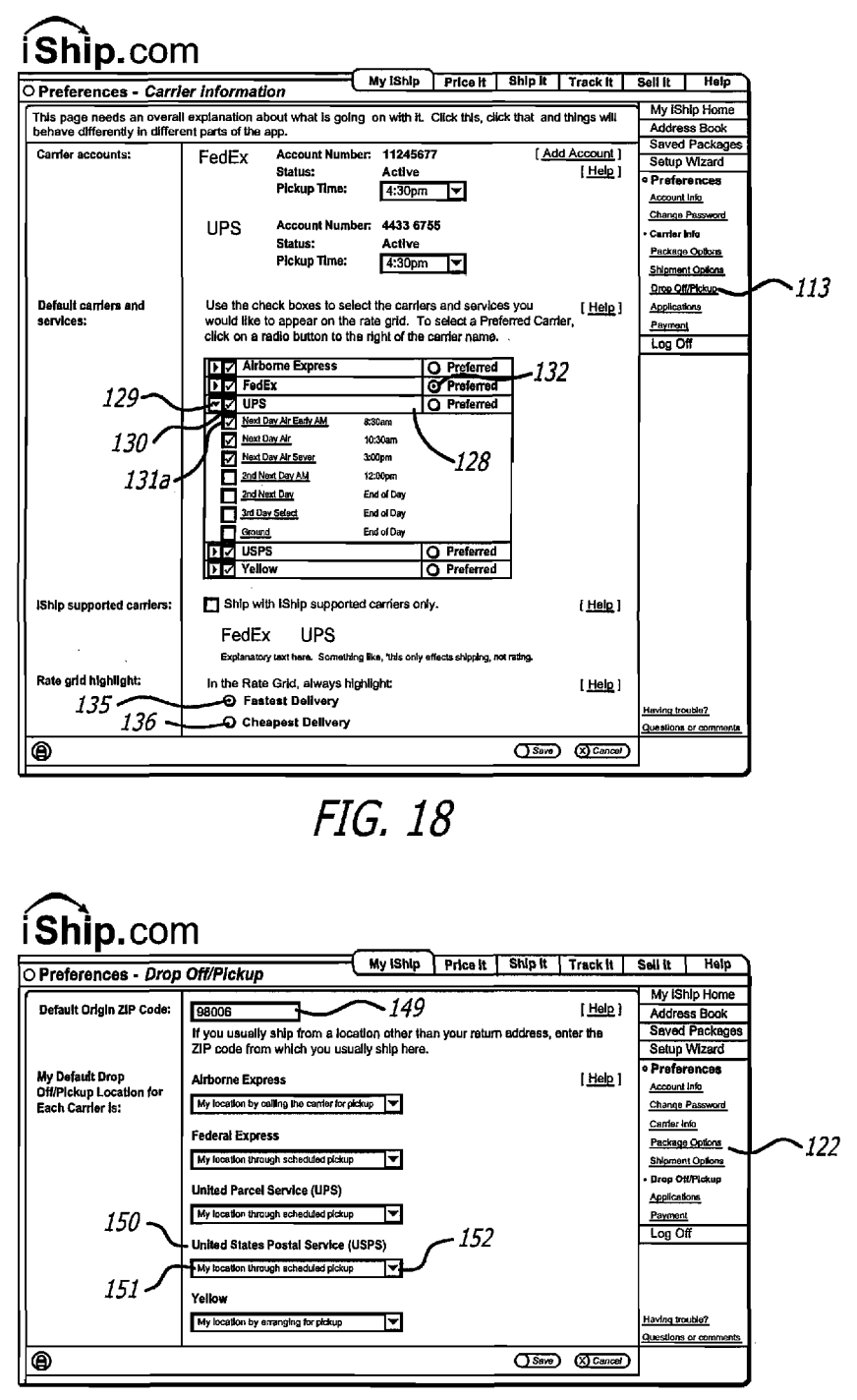

From the Account Information Preferences Screen as depicted in FIG. 17, the User can select a Change Password Link 111, a Carrier Info Link 112, a Drop Off/Pickup Link 113, an Applications Link 114, a Package Options Link 122, a Shipment Options Link 123 or a Payment Link 126. If the User selects the Carrier Info Link 112, the System displays a Carrier Info Preferences Screen. FIG. 18 is a graphic representation of an exemplary Carrier Preferences Screen in an exemplary embodiment of the invention.

The Carrier Info Preferences Screen displays the default Carrier Preference settings established by the Administrator, and to the extent authorized by the Administrator, allows the User to edit the Carrier Preferences. The Carrier Info Preferences Screen depicts each Carrier, e.g., 128 (UPS), that has been authorized for use by the Administrator. A pull down menu button, e.g. 129 for UPS 128, if clicked, displays the Services for that Carrier that are authorized by the Administrator. To the extent authorized by the Administrator, the User can check Carriers, e.g., 130, and Services, e.g., 131*a*, that the User wants to use. The User can indicate Carrier preferences by clicking a preference button, e.g., 132 for FedEx. The Carrier Info Preferences Screen also provides the capability, to the extent authorized by the Administrator, for the User to request that the Rate Grid (also referred to herein as the Graphic Array) highlight an optimal choice, such as the Fastest Delivery 135, or the Cheapest Delivery 136.

If the User selects the Drop Off/Pickup Link 113 from, e.g., the Carrier Info Preferences Screen, the System displays a Drop Off/Pickup Preferences Screen. FIG. 19 is a graphic representation of an exemplary Drop Off/Pickup Preferences Screen in an exemplary embodiment of the invention.

As depicted in FIG. 19, the Drop Off/Pickup Preferences Screen displays the default Drop Off and Pickup locations set by the Administrator. To the extent authorized by the Administrator, the User can edit the Drop Off and Pickup locations. Each Carrier, e.g., 150 USPS, authorized for use by the Administrator, is displayed on the Drop Off/Pickup Preferences Screen. For each Carrier, the set location, e.g., 151 for USPS, is displayed. The User can display a list of alternative locations by clicking a pull down menu button, e.g., 152 for USPS. Only those locations authorized by the Administrator will be displayed.

If the User clicks the Package Options Link 122, the System displays a Package Options Preference Screen. FIG. 20 is a graphic representation of an exemplary Package Options Preferences Screen in an exemplary embodiment of the invention. The default Package Options authorized by the Administrator are displayed. To the extent authorized by the Administrator, the User can edit the settings for insurance protection 170, reference number assignment 171, verbal confirmation 172, e-mail notification 173, delivery confirmation 174, proof of delivery 175, adult signature required 176, call tag 177, merchandise description 178, certified mail 179, and return receipt 180. Help information is available for each option, e.g., 181 for Proof of Delivery.

If the User selects the Shipment Options Link 123, the System displays a Shipment Options Preference Screen. FIG. 21 is a graphic representation of an exemplary Shipment Options Preferences Screen in an exemplary embodiment of the invention. The default Shipment Options authorized by the Administrator are displayed. To the extent authorized by the Administrator, the User can edit the settings for Destination Address Type (Business 190, or Residence 191); shipment reference number 192; percent of shipping charges for labor or material fees 193, or a fixed amount 194; deliver deadline 195 and the delivery deadline date 196; guaranteed delivery 197; deliver without signature 198; set earliest delivery time 199 and the associated delivery time 200; documents only 201; non-dutiable 202; Freight Pickup number of flights of stairs 203, loading dock 204, and appointment required 205; Freight Delivery number of flights of stairs 206, loading dock 207, and appointment required 208. Help text is available, e.g., 209 for delivery deadline 195, for each option.

As with other preference options, an Applications Options Screen, and Payment Information Screen, display the settings and information authorized by the Administrator. To the extent authorized by the Administrator, the User can edit the settings and information provided by those screens. FIG. 22 is a graphic representation of an exemplary Applications Preferences Screen in an exemplary embodiment of the invention. The Applications Preferences Screen provides applications customization features such as: show application start pages 220—for the Ship It application 221; for the Price It application 222; for the Sell It application 223; and for the Preferences application 224; show advanced package options 225; show log off message 226, and Track It Options 227.

FIG. 23 is a graphic representation of an exemplary Payment Information Preferences Screen in an exemplary embodiment of the invention. If authorized by the Administrator, the User can edit payment type 230; credit card number 231; expiration date month 232; expiration date year 233; first name 234; last name 235; e-mail address 236; company name 237; street 238; city 239; state 240; zip code 241; and telephone number 242.

3. Security

In order to be able to implement management control over shipping activities, the Enterprise Desktop Client performs various security validations in order to be able to positively identify users to the system, provide access to portions of the system based on authentication, and apply shipping policies and procedures based on the user's privileges as set by the administrator.

Users are required to identify themselves to the System before gaining access. In one embodiment, identification consists of requiring the User to identify a username and password. In an alternative embodiment of the invention, the System additionally implements "sticky" identification, where user information is stored in a browser cookie. The Administrator controls whether "sticky" identification is allowed.

Positive user identification for a particular Desktop User will cause the System to apply shipping rules set for that particular User, and/or for the site and group that apply to the particular User, via the Administrative Client by the Administrator to be applied to the particular User's session with the Enterprise Desktop Client.

The Enterprise Desktop Client is configurable by the Administrator to limit the number of unsuccessful logon attempts to allow only a certain number (e.g., 3 times) of unsuccessful logon attempts before freezing an account (i.e. requiring the password to be reset).

Shipping transaction information and user credentials sent between end users and the System are encrypted.

To accomplish a secure login according to the security features of the System, Users are directed to a logon page to provide authentication when trying to initially access a protected area without identification. The logon page is brandable by the Administrator with the particular Enterprise's look and feel.

Figure 12:
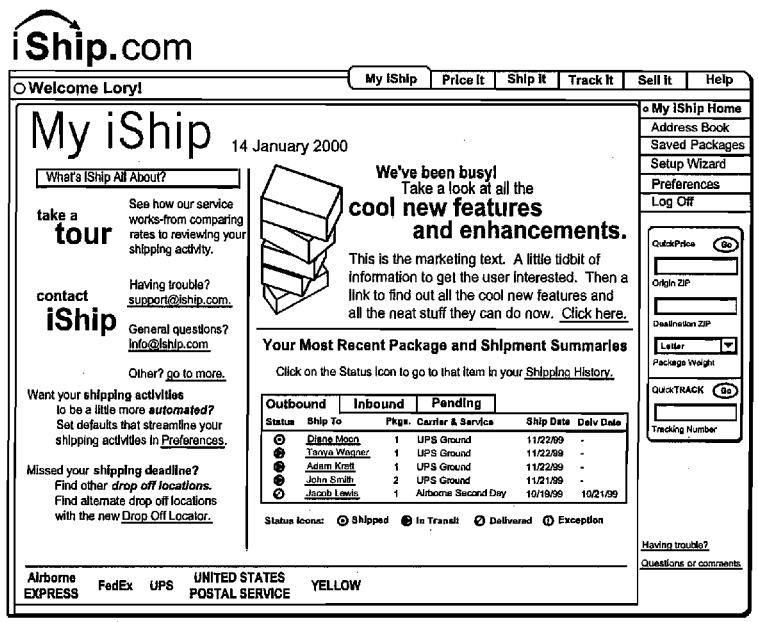

The System provides password recovery link options which are configurable by the Administrator. In the event that a User forgets the User's password, the System provides, according to the configuration allowed by the Administrator, password recovery links available from the logon page: one option provides the user a password reminder question, the other option generates an e-mail which sends the password to the user's e-mail address on file. The Administrator can allow both options, or can block one or both options. FIGS. 8 through 11 are graphic representations of exemplary Password Recovery Screens in an exemplary embodiment of the invention. FIG. 12 is a graphic representation of an exemplary home page for an exemplary embodiment of the invention once an Enterprise User has successfully Logged On.

Administrators are not able to view the password of individual users, but are able to reset a user's password (providing a new password via e-mail or over the phone) or generate an e-mail containing the user's existing password.

In one embodiment of the Enterprise Desktop Client, the System requires password aging. That is, passwords can be valid for a certain time duration. The System provides the Administrator with the ability to create and enforce password rules regarding such characteristics as the allowable age duration for each password, content, no-reuse policy, and the like.

Enterprise System support personnel are able to use the Administrator client to either: reset a user's password or generate an e-mail to the user containing their password. An Administrator can configure the password recovery methods displayed on the logon page, to show either the password reminder question, the request e-mail with password option, or a "Contact Support" message. The Administrator can also specify whether unlimited or limited unsuccessful login attempts are allowed.

4. On-Line Help.

The Enterprise Desktop Client provides both high-level and (to the extent granularity is available for each particular circumstance), context sensitive help for Enterprise Desktop Client Users. The on-line help section is customizable for individual enterprises, so that the on-line help system for the Enterprise Desktop Client application can also be used as on-line help to explain corporate shipping policies as set by the Administrator.

The System provides the Enterprise Desktop Client with an interface area devoted to on-line help for the application as a whole. For major areas of the Enterprise Desktop Client (shipping, tracking, preferences), a link to high-level summary help information for that area is provided. For individual sections on each page, context-sensitive help is provided for most sections.

In one embodiment, linking to carrier specific or carrier-hosted information is supported by the System.

Help information setup is accessible by any user that has access to the associated screens.

5. Modifiable Screens.

The System provides the capability to customize the appearance of screens in the Enterprise Desktop Client, on a global-basis. Screen appearance on a user-specific basis is controlled by user privileges.

The user interface for Screen customization provides customization for a variety of parameters, including, for example:
  Field descriptions may be modified (i.e. a field description of "Shipper's Reference Field 1" can be modified to read "Department ID" or "chargeback code", or other user-specified description.)
  Descriptive text appearing on the page can be setup for each input field (i.e. "Company X recommends insurance only for items worth over $1,000.")
  Additional required fields may be specified.
  Service options may be removed.
In one embodiment, the System limits such screen appearance change authority to be limited to be performed by the System's System Administrator.

Modifiable screens are one of the key methods by which an enterprise implements and explains its shipping policies to end Users.

6. Shipping Destination

The Enterprise Desktop Client provides "destination address services" that enable Users to quickly and correctly specify the address for a shipment recipient, such as, for example:
  Address validation and correction—street-level validation and correction is desired, but not required. City/ST/ZIP validation and correction is required.
  Types of Address Books and Address features include:
    Personal address book
    Shared company address book
    Distribution lists
    Add/edit/delete/clone entry
    Import/export addresses to/from text files
    Prompt to save new addresses to address book
    Prompt to save changes to existing addresses (or save new) Generally, address entries should contain
    Contact name
    Company name
    Address Line 1
    Address Line 2
    City, State/Province, Country
    Phone number
    E-mail address
    Carrier account number(s)
The System provides links to shipping history for a specified addressee for viewing shipments sent to the specified person or entity)

Figure 13:
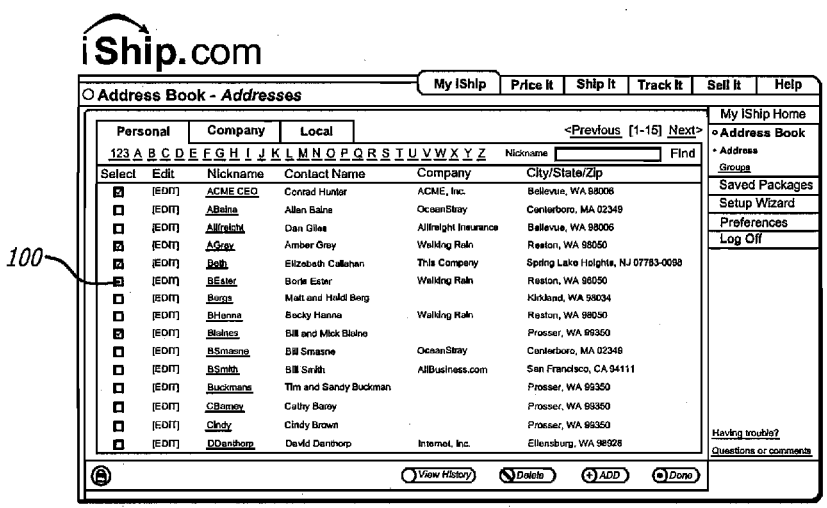
FIG. 13 is a graphic representation of an exemplary Address Book List View Screen in an exemplary embodiment of the invention.

FIG. 13 is a graphic representation of an exemplary Address Book List View Screen in an exemplary embodiment of the invention. As depicted in FIG. 13, the Address Book List View Screen provides a summary list of addresses in the User's Address Book. In one embodiment of the invention, a View History button is provided for each Address Book entry in both the Address Book List View and the Address Book Edit View Screens. If the User clicks the View History button, the System will display all packages shipped to and/or from (depending on the User's preference settings) the recipient with whom the View History button clicked is associated.

Figures 14, 15:
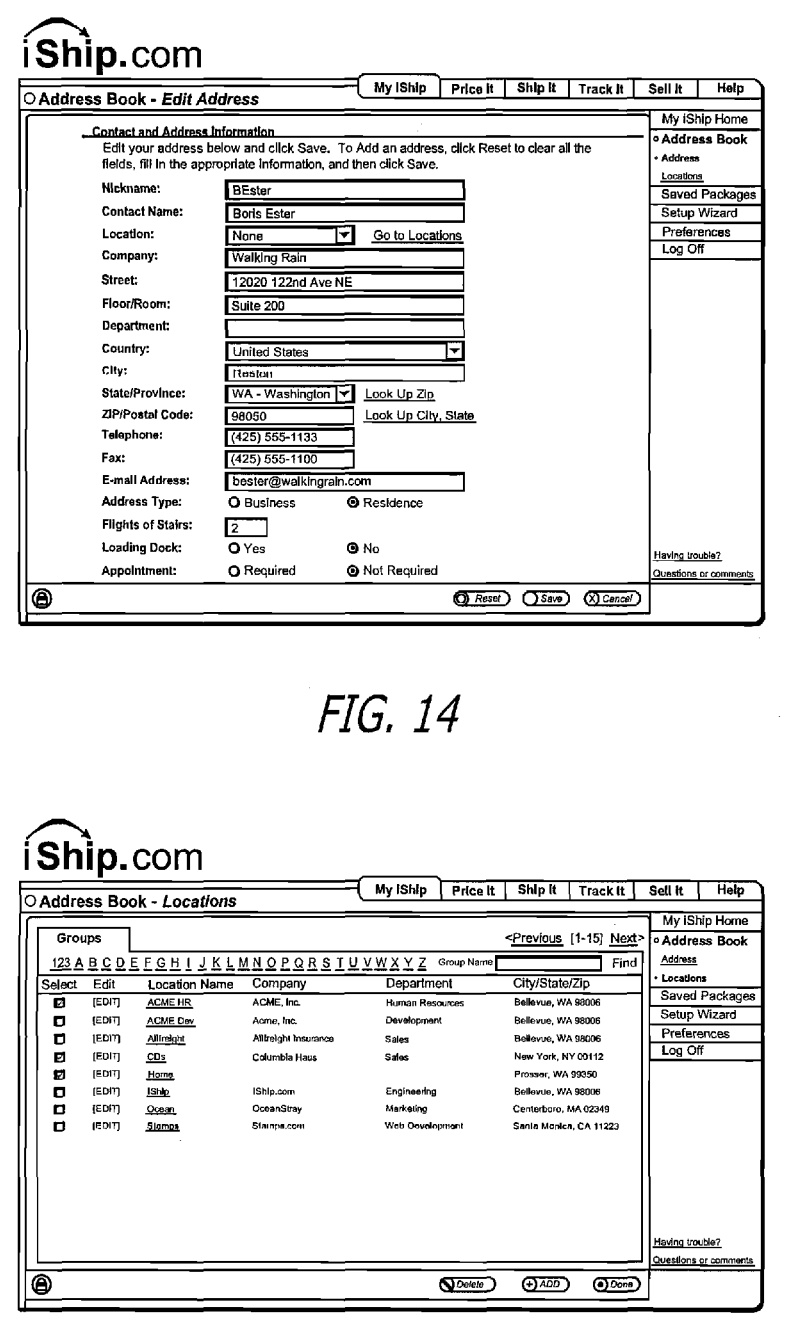

FIG. 14 is a graphic representation of an exemplary Address Book Edit View Screen in an exemplary embodiment of the invention. As depicted in FIG. 14, the System provides a User in an Address Book Edit View Screen with a detailed view of address information for a particular entry in the Address Book List View Screen if the User checks a detailed box, e.g., 100 in FIG. 13.

FIG. 15 is a graphic representation of an exemplary Locations List View Screen in an exemplary embodiment of the invention. As depicted in FIG. 15, the System provides the User with Locations for Groups defined in the Address Book.

For address corrections, the User interface warns the User that the address has been "fixed" or does not exist, and asks how to proceed. The User can proceed with an invalid address, subject to certain constraints (i.e. invalid street address OK, invalid ZIP code, not OK.)

The user interface warns the User that delivery to POBs is limited to the USPS, if a POB is specified as the address.

The System provides the user with a shortcut capability to select addresses from the address book, using such features as "nicknames."

Users can add/modify/delete entries in their Personal address book, but not in shared address books. Only Administrators can modify shared address books.

The Desktop Client provides each User with the ability to import and bulk load addresses into the User's personal address book.

7. Shipping Return Address and Origin.

Subject to Administrator settings, Desktop Users can set their return address in user preferences and can override the preset return address when desired. Administrators can assign Users to an Enterprise site, which can be separate (but often similar) from the User's individual return address. The Enterprise site (origin) will drive user interface aspects and options available to a User such as drop-off locations displayed, allowable carriers, the account number used, the cut-off times, etc.

The Enterprise Desktop Client user interface uses the User's return address information maintained in user preferences in a number of ways, including, for example:

The return address is auto-filled by the System with the address specified in the user's preferences. The return address may be overridden by the User.

The Administrator can define drop-off locations (including carrier service centers, drop boxes, and MBE centers), with associated cut-off times, for each site.

Available drop-off locations are displayed according to user privileges and the user's Enterprise site.

The User interface provides time- and site-sensitive alerts on cut-off times and drop-off locations based on Administrative settings. The Administrator client provides the capability to the Administrator to define Enterprise sites and drop-off locations (including off-site locations) available per site, as well as cut-off times for Enterprise sites and drop-off locations.

End of day reports account for packages dropped-off at an off-site location.

8. Shipment Rating.

Figures 24, 25:
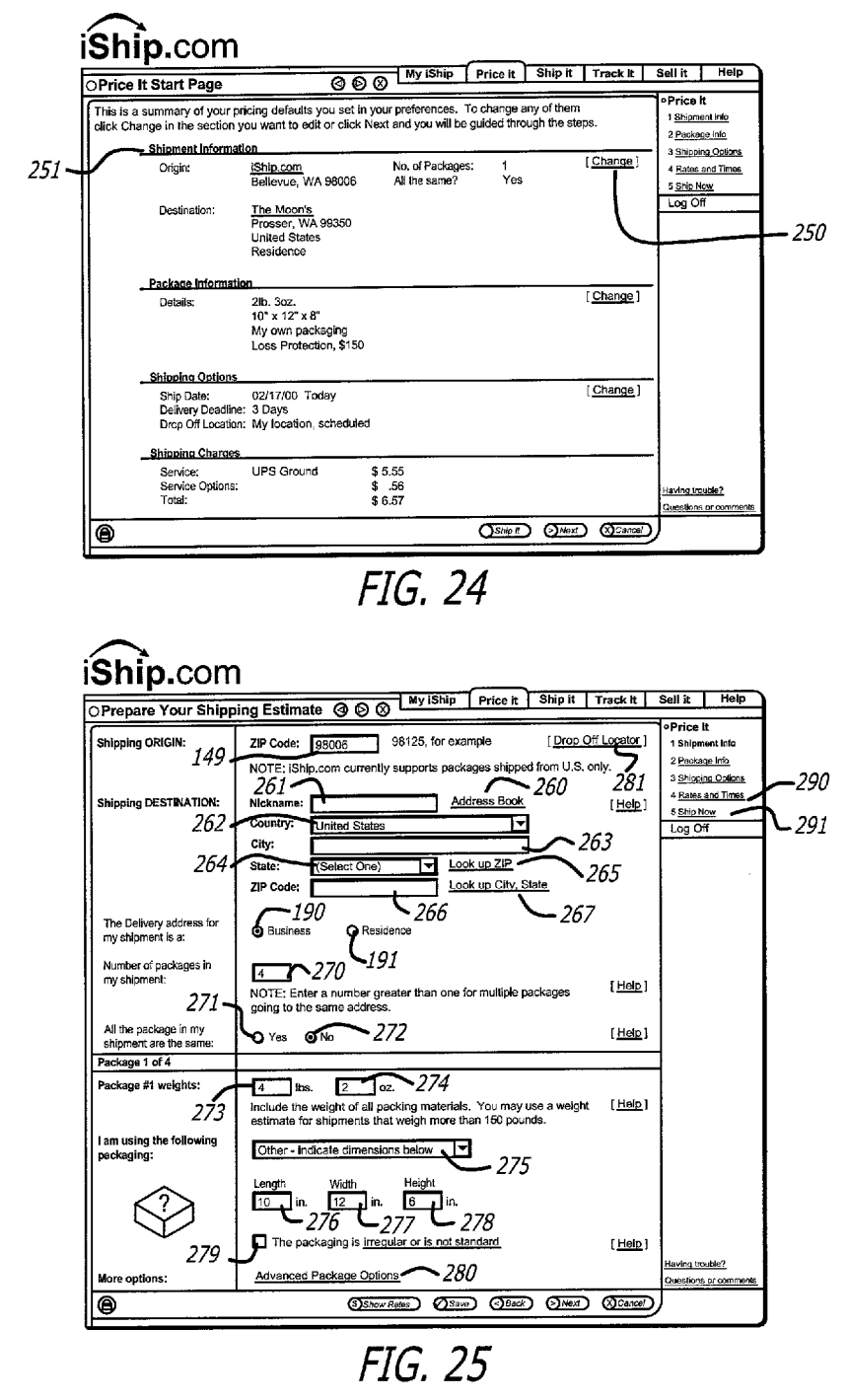

The System prompts Users to supply information necessary to price shipment of a package. FIG. 24 is a graphic representation of an exemplary Price It Start Page in an exemplary embodiment of the invention. As depicted in FIG. 24, a User's default preference settings are displayed. To change information, the User clicks on the Change button, e.g., 250, associated with the section of information, e.g., Shipment Information 251, that the User wants to change.

Clicking one of the Change buttons, e.g., 250, causes the System to display a detailed Price It Shipping Estimate Screen with which the System prompts the User to supply the changed information. FIG. 25 is a graphic representation of an exemplary Price It Shipping Estimate Screen in an exemplary embodiment of the invention. To the extent authorized to do so by the Administrator, the User edits the Shipping Estimate data fields: Origin zip code 149; drop off location (by clicking the drop off location link 281); destination address fields (nickname 261; country 262; city 263; state 264, and zip code 266) can be populated by clicking the Address Book link 260, locating the appropriate Address Book entry, and clicking on that entry; business 190 or residence 191; number of packages 270; all packages in shipment same 271 or not 272; package weight in pounds 273 and ounces 274; packing type 275; or the package dimensions in length 276, width 277 and height 278; whether the packaging is irregular or non-standard 279; and advance package options 280. Clicking the Drop-off Location link 281 causes the System to display a Drop Off Locator Screen as depicted in FIG. 26.

Figure 26:
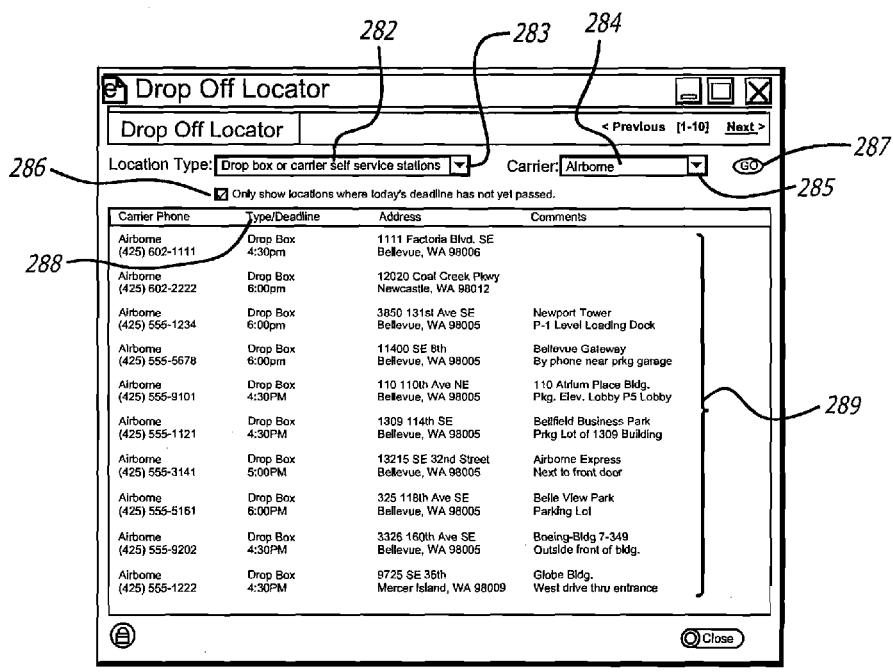
FIG. 26 is a graphic representation of an exemplary Drop Off Locator Screen in an exemplary embodiment of the invention.

FIG. 26 is a graphic representation of an exemplary Drop Off Locator Screen in an exemplary embodiment of the invention. The Drop Off Locator Screen provides a Location Type window 282 and a pull down menu button 283 with which the User can specify the Location type. The User is prompted to specify the Carrier 284, using a pull down menu button 285. The User can specify if the report should only show locations where the day's deadline has not yet passed 286. When the User has input the necessary locator information, the User clicks the Go button 287. The System locates all locations matching the User specified criteria and reports them 289. The User can sort the report by deadline time 288 by clicking the deadline time heading 288 on the onscreen report.

In one embodiment, the User enters only a recipient's e-mail address in a shipping request. The System uses the recipient's e-mail address, e.g., 293-1 as depicted in FIG. 27, as a database key to retrieve information about the recipient's shipping address and use that information to populate the shipping request delivery address information. FIG. 27 is a graphic representation of an exemplary Shipping Addresses Screen in an exemplary embodiment of the invention. Inputting the Recipient's e-mail address 293-1 causes the System to populate the Destination address information 293 if the information is already in the Address Book.

If the Destination address information for the specified Recipient is not already in the Address Book, the User must input the Destination Address information 293 and can indicate to the System to save the new address in the Address book 293-2.

The user can specify notification e-mail addresses 294 to which the System generates and sends an e-mail notifying that a package has been sent. The User can enter a message for the e-mail 295, a description of the package 296 and a reference number 298. If no message is specified, the System sends a standard message. The User can click the Browse button 297 to browse a library of item descriptions contained in the System databases.

FIG. 28 is a graphic representation of an exemplary Shipping Payment Screen in an exemplary embodiment of the invention that is displayed when a package is to be shipped. The System populates the data fields displayed in the Screen with default information according to the Administrator settings, User preferences, and to the extent as discussed below, Recipient preferences. The User can supply other payment information by completing the appropriate fields. The default payment type 299-1 is set by the System according to any defaults as mentioned above. The System provides a drop-down menu button 299-2 with which the User can select a different payment type. If the User changes the Payment type, the appropriate fields are displayed for User data input 299-3.

In one embodiment, the System provides recipients with the capability to set up recipient shipping preferences which are related to the recipient's e-mail address in the System databases. Recipient Preference Screens are similar to those described herein with regard to the User's Preference Screens, and are saved by the System in the System databases so that the Recipient's Preferences are accessible by the Recipient's e-mail address. In such an embodiment, when the User enters the Recipient's e-mail address, the System populates not only the shipping delivery address, but the Recipient's shipping preferences as well.

In one such embodiment, the Address Book entry for the Recipient contains the Recipient's e-mail address. The System provides in such an embodiment, a Quick Ship option, such as from the Address Book entry for the recipient. The User clicks the Quick Ship button associated with a particular recipient's entry in the Address Book and the System populates the shipping delivery address and the Recipient's shipping preferences.

i.) Shipment Rating for Returns Processing

In one exemplary embodiment of the invention, the System of the present invention is integrated with a Returns System such as disclosed in U.S. patent application Ser. No. 09/820, 292 the disclosure of which is incorporated for all purposes herein by reference as if fully stated here. In such an integrated Returns System/Enterprise System embodiment, a Recipient can arrange for the return to an Enterprise of an item previously shipped by the Enterprise to the Recipient. To do so, as will be described in more detail below, the Recipient of the previously shipped package accesses the Enterprise's Online Internet Web site, views the Enterprise's Recipient Order History for that Recipient, and clicks on a Return button associated with the particular package to be returned.

In such an integrated Returns System/Enterprise System embodiment, as described in more detail below, the Enterprise User and/or Administrator, sets up Returns Policy rules. The System populates all of the appropriate fields regarding the package to be returned with the information stored in the System databases by the original Enterprise User. The Integrated Returns/Enterprise System allows the Recipient, as further described below, to set up Recipient Shipping Preferences. When a Recipient requests return processing, the Returns/Enterprise System asks the Recipient a series of Returns Questions, and processes the return request in accordance with the Recipient's responses to the Returns Questions and in accordance with the Returns System processing settings as established by the Enterprise's User/Administrator. If the Recipient is paying for the return shipping, the Returns/Enterprise System allows the Recipient to choose the return shipping Carrier and Service from a Graphic Array comparison display of shipping charges for those Carriers authorized for Returns Processing by the Enterprise. Return processing populates the Inbound Tracking Log for the Enterprise User and notifies the User of the return.

FIG. 29 is a graphic representation of an exemplary Order History display for a particular Customer in a particular Enterprise's Online Internet-based website. In the exemplary case depicted in FIG. 29, the exemplary Order History display depicts an order history for an exemplary Customer of the Enterprise in the particular Enterprise's Online Internet store.

In the exemplary Enterprise's Online Store, as depicted in FIG. 29, the Enterprise displays the Enterprise's Logo 4380. The exemplary Enterprise's Online Store provides a main menu of options 4382, for example, "Welcome", "Online Merchandise", "Catalog Merchandise", "Place Orders", "Return Merchandise", etc. Further, in the exemplary Enterprise's Online Store, each Page provides a Submenu of options 4381 that provide functionality appropriate for the selected main menu option. In the illustrative FIGURES described below, the Consumer has entered the Enterprise's Online Store, and has entered, for example, the Return Merchandise page. With the Return Merchandise page, the Enterprise's Online Store provides appropriate Submenu selections 4381 that allow the Consumer to view the Consumer's Order History and access the Consumer Returns Subsystem to return merchandise.

In the exemplary Order History display depicted in FIG. 29, the particular Consumer's Shipped Orders 4400 are listed, e.g., 4401-1 through 4401-7. From the Order History as depicted in FIG. 29, the Consumer can select a particular order number, e.g., 4401-1, by, for example, clicking the cursor on the order number 4401-1.

To return an order, or an item from within a particular order, the Consumer selects a particular order number, e.g., 4401-1. Selecting a particular order number, e.g., 4401-1, causes the Enterprise's Online store system to display (4361 in FIG. 30a) an Order Summary as depicted in FIG. 31.

Figure 30A:
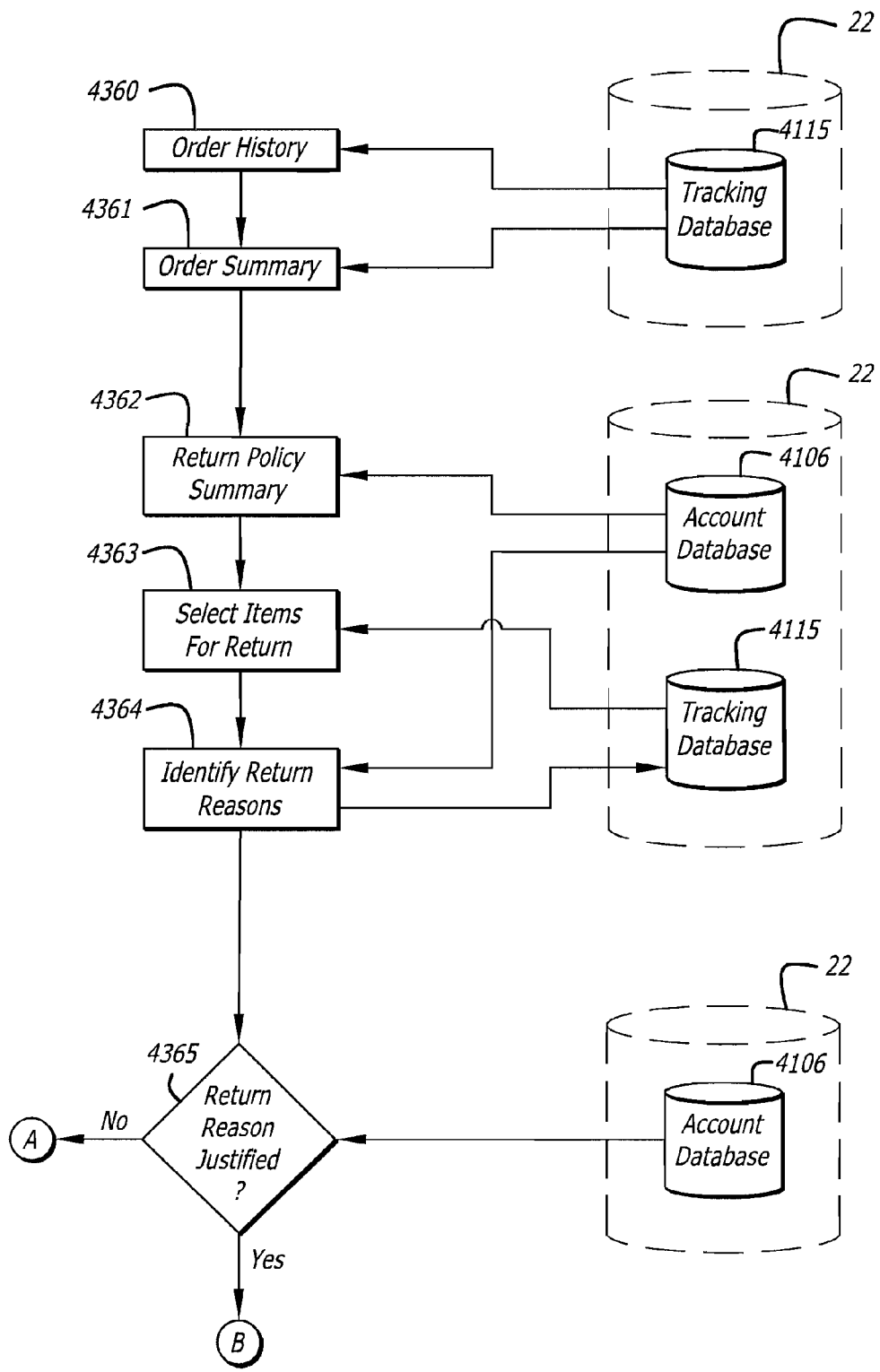
FIGS. 30a through 30c are logic flow diagrams depicting an exemplary high level logic flow for a Consumer's experience with an exemplary embodiment of the Returns System of the present invention from within a Merchant's Online store.
Figure 30B:
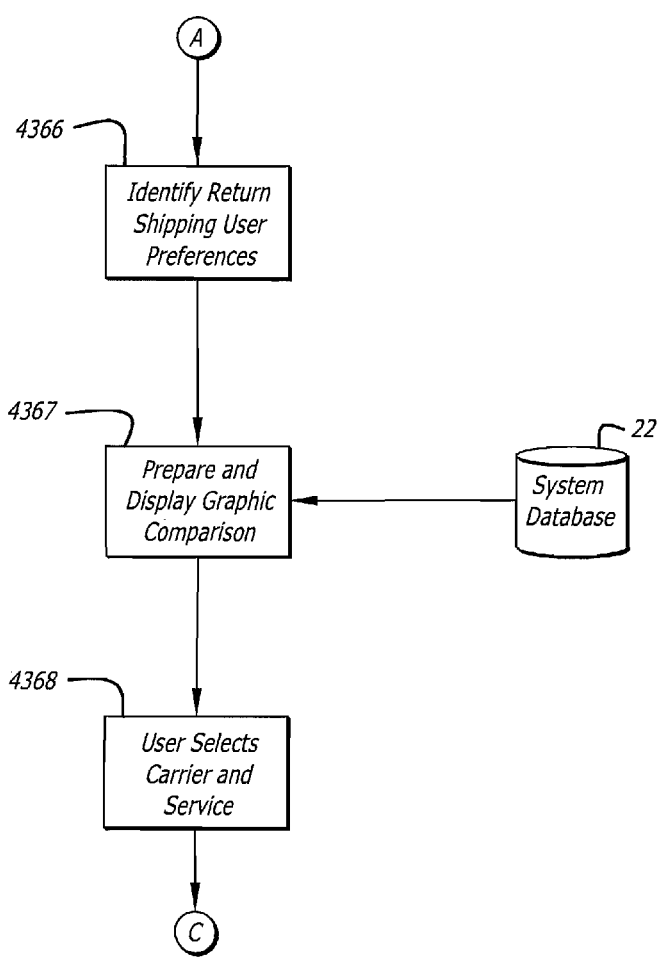
Figure 30C:
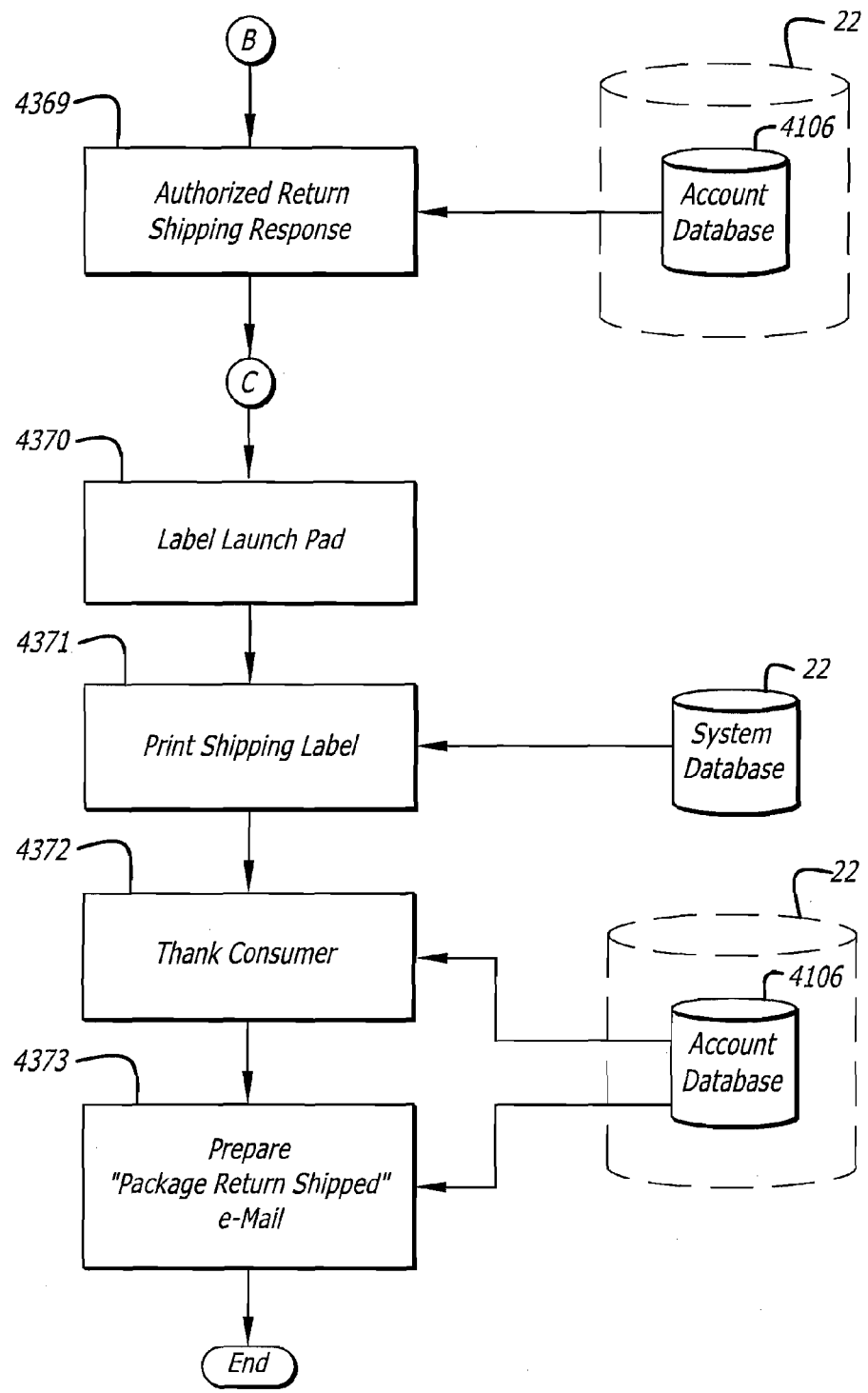

FIGS. 30a through 30c are logic flow diagrams depicting an exemplary high level logic flow for a Consumer's experience with an exemplary embodiment of the Returns System of the present invention from within a Merchant's Online store. FIG. 31 is a graphic representation of an exemplary Order Summary Screen for a particular Order Number for a particular Consumer from within a particular Enterprise's Online store in an exemplary embodiment of the invention.

The exemplary embodiment of the invention depicted in FIGS. 30a-30c shows that the Enterprise's Online store system accesses the Return System's Tracking Database 4115 (which is part of the Return System's databases 22 as depicted, e.g., in FIG. 3) to provide the Consumer's Order History and Order Summary information. In an alternative embodiment, the information necessary to populate the Consumer's Order History and Order Summary information is contained within the Enterprise's store's own databases.

As depicted in FIG. 31, a Return System icon, e.g., 4402, is displayed on the Order Summary Screen. To return a particular item or set of times, the Consumer must click on the Return System icon 4402. If the Consumer clicks on the Return System icon 4402, the System generates the display of a Returns Service Screen. FIG. 32 is a graphic representation depicting an exemplary Returns Service Screen provided by the Consumer Returns Subsystem in an exemplary Enterprise's Online store in an exemplary embodiment of the invention.

Figure 33:
FIG. 33 is a graphic representation of an exemplary Standard Policy Screen in an exemplary embodiment of the invention.

In a Returns Service Screen, such as the exemplary one depicted in FIG. 32, the Enterprise's Standard Policy Overview Statement 4420 (e.g., 4160 as depicted in FIG. 33) is displayed. To display the Enterprise's Standard Policy Overview Statement 4420, the System retrieves the Enterprise's Policy Overview statement 4362 from the Return System Account Database 4106 as depicted in FIGS. 30a-30c. Continuing with FIG. 32, a check box, e.g., 4421-1 through 4421-7, is displayed next to each ordered item, e.g., 4404-1 through 4404-7. To return a particular item or set of times, the Consumer must select the items to be returned 4363 as depicted in FIGS. 30a-30c. Continuing with FIG. 32, a Consumer that wants to return a particular item, e.g., 4404-7, checks the check box 4421-7 associated with that item (multiple boxes for multiple items can be checked) and then clicks the onscreen "Next Step >>" button 4422.

Figure 34:
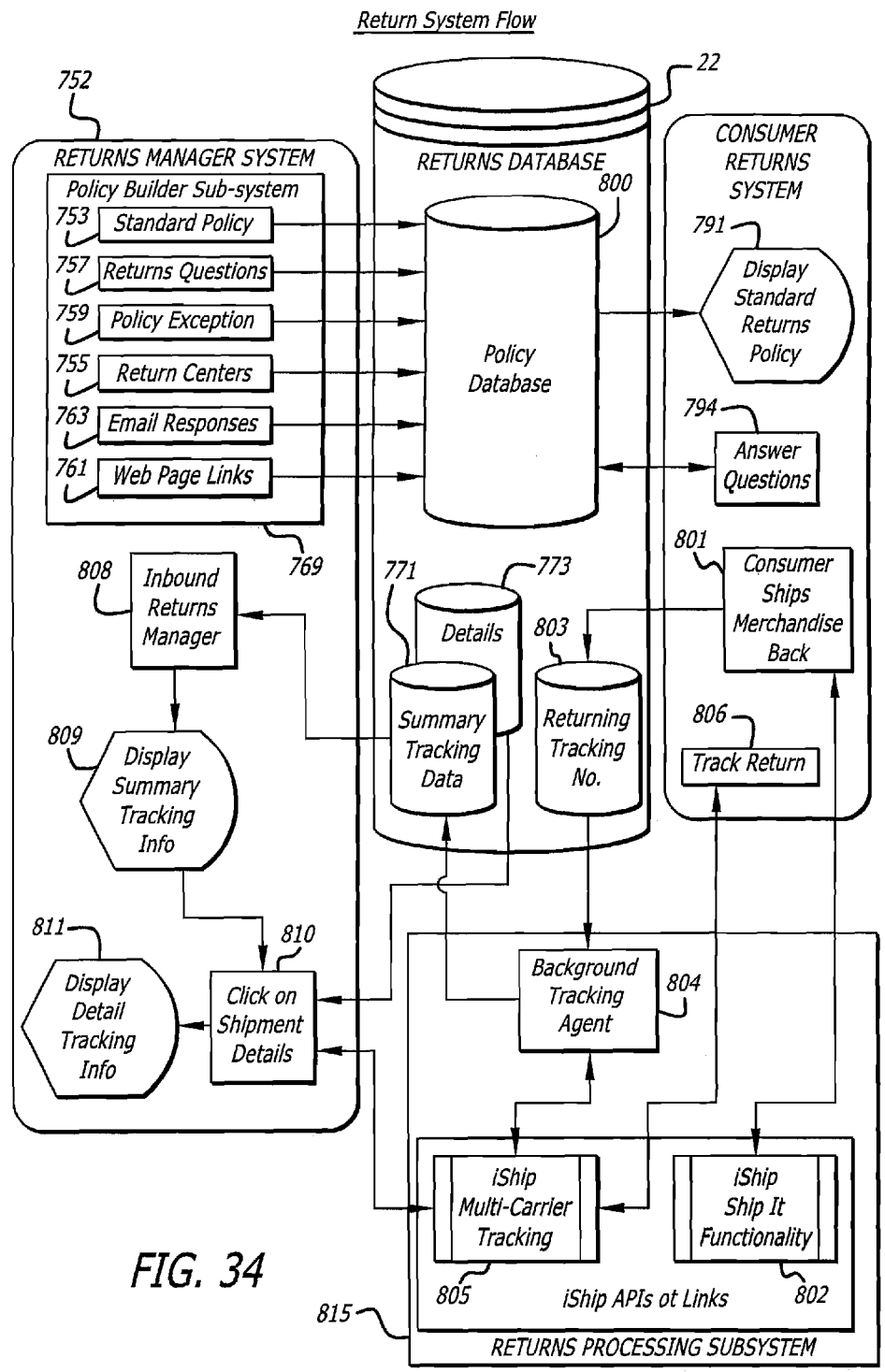
FIG. 34 is a high level data and logic flow diagram depicting an overview flow of the Returns System flow in an exemplary embodiment of the invention.
Figure 35A:
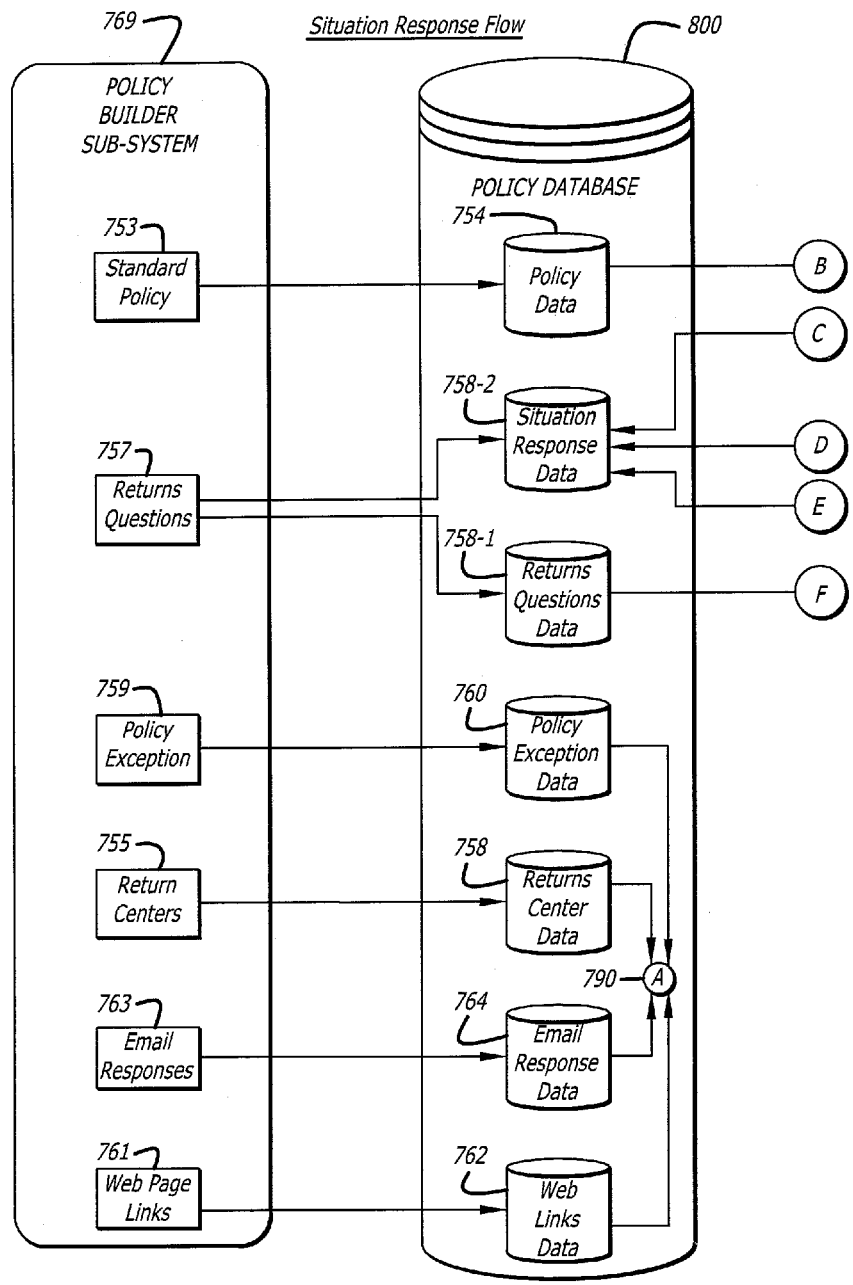
FIGS. 35A-35B are a high level data and logic relationship diagram depicting an exemplary Situation Response flow in an exemplary embodiment of the invention.
Figure 35B:
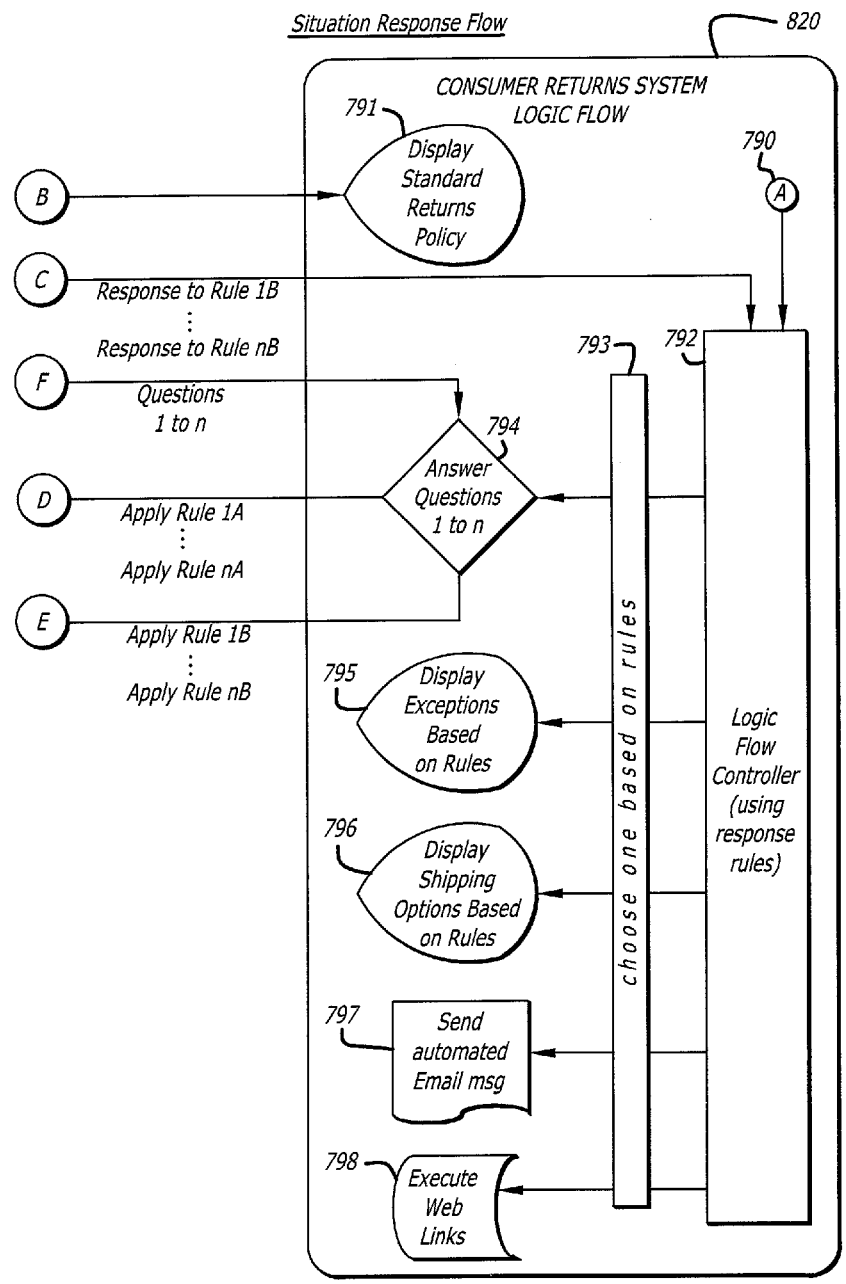

FIG. 34 is a high level data and logic flow diagram depicting an overview flow of the Returns System flow in an exemplary embodiment of the invention. As depicted in FIG. 34, the Enterprise establishes the Enterprise's returns policy in the Returns Policy Database 800 using the Returns Manager Subsystem 752. The Consumer Returns Subsystem displays the Enterprise's standard returns policy 791 and walks the Consumer through the appropriate return questions, applying the appropriate return rules, including exceptions 794 as that process is depicted in FIG. 35.

Continuing with FIG. 34, the Consumer then uses the System's shipping functionality 802 provided by the Returns Processing Subsystem 815 in the exemplary embodiment of the invention to return ship the merchandise 801. Returns shipping processing assigns the returned package a return tracking number 803. The Return Processing Subsystem provides a Background Tracking Agent 804 that periodically accesses the list of return tracking numbers and in an asynchronous manner uses the System's multi-carrier tracking function 805 to access the System's tracking servers, e.g., 21s-21z (as depicted in FIG. 3) and populates the return tracking databases 771, 773 (details). The System provides Consumer tracking of a return shipment 806 through a Consumer Returns Subsystem access to the Returns Processing Subsystem's Multi-Carrier tracking function 805. The Multi-Carrier Tracking function 805 is described further below.

Returning to FIG. 32, once the Consumer clicks the onscreen "Next Step >>" button 422, then as depicted in FIGS. 30a-30c, the Return System then prompts the Consumer, through the Consumer Returns Subsystem in the Enterprise's Online Store system, to answer the Enterprise's Return Questions and provide the requested Return Reasons 4364.

Figure 36:
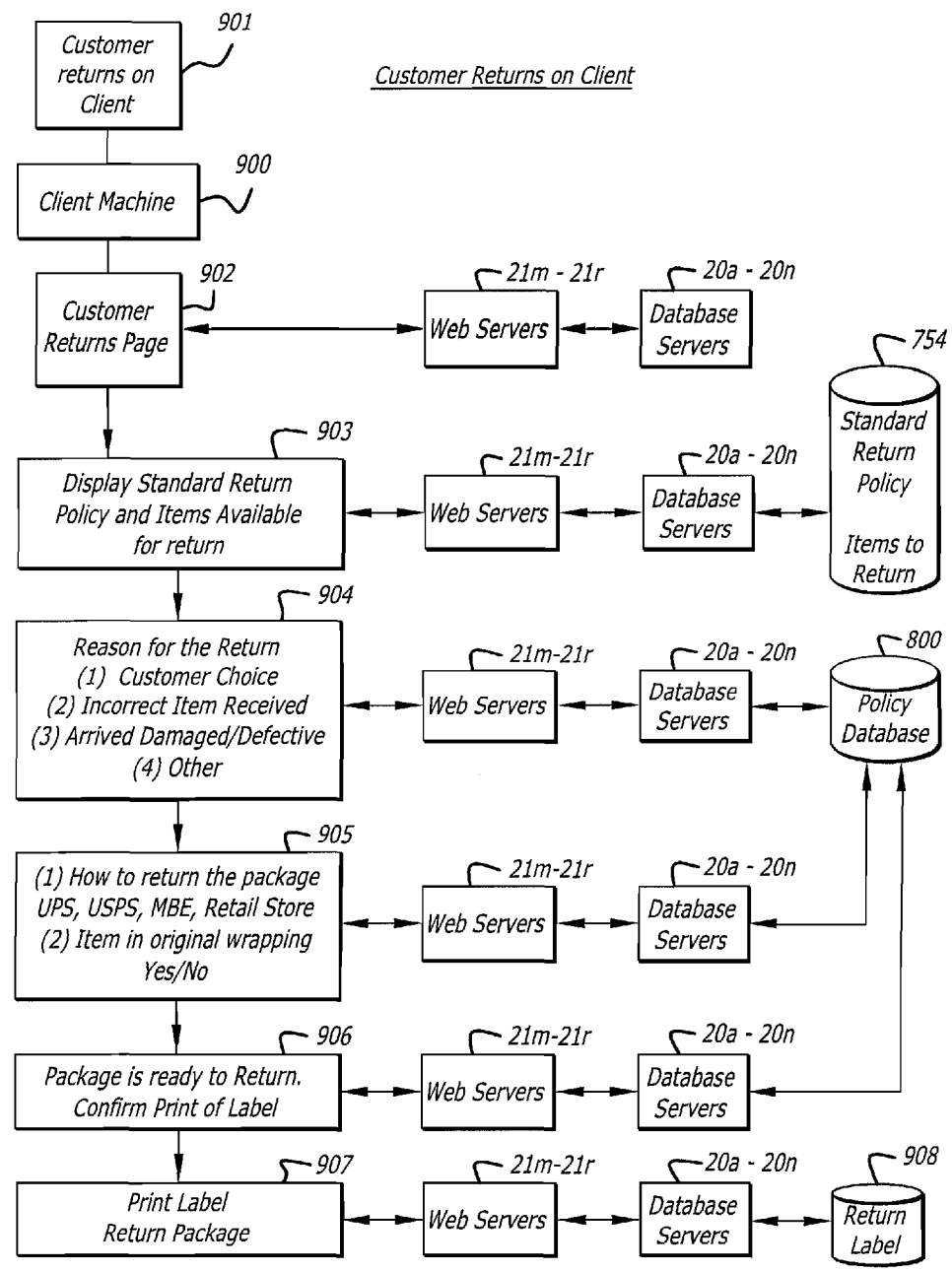
FIG. 36 is a high level interactivity diagram depicting an exemplary embodiment of the interactivity of the Customer Returns Subsystem between a Consumer's Client Machine, Customer Returns Page, various Customer Returns Subsystem functions, and the Return System servers in an exemplary embodiment of the invention.

FIG. 36 is a high level interactivity diagram depicting an exemplary embodiment of the interactivity of the Customer Returns Subsystem between a Consumer's Client Machine, Customer Returns Page, various Customer Returns Subsystem functions, and the Return System servers in an exemplary embodiment of the invention. As depicted in FIG. 36, a portion of the Consumer Returns Subsystem 901 operates on the Consumer's (also referred to here as the Customer) Client Machine 900. When the Consumer accesses the Enterprise's online store, the Enterprise's menu options allow the Consumer to access the Consumer Returns Page 902 from within the Enterprise's online store. From the Consumer Returns Page, the Consumer can access the Consumer Returns functions such as, for example: Display of the Enterprise's Standard Policy and display items available for return 903 from the Standard Policy data 754; prompt the Consumer for the reason for the return 904; prompt the Consumer for shipping information such as the carrier with which the package will be returned and the packaging of the item 905; finalize shipping of package 906; and print a shipping label 907 saving the shipping label information, such as the tracking number, in a Return Label database 908. As with the Returns Manager Subsystem, the Consumer Returns Subsystem uses the Return System's web servers 21m-21r to interact with the Consumer, and uses the Return System's Database servers 20a-20n to access the various databases in the Policy Database 800 that are needed to supply the information for the interactivity FIG. 37 is a graphic representation of an exemplary Returns Service Return Reason Screen in an exemplary embodiment of the invention. As depicted in FIG. 37, for the Order selected 4401-1, for the item 4404-7 selected to be returned 4421-7, the Enterprise's Question 4206 is asked, prompting the Consumer with acceptable answers 4216, 4207, 4212, and 4220 for selection 4427-1 through 4427-4 respectively. A Consumer Comments window 4425 is provided with up and down scroll buttons 4426-1 and 4426-2 in which the Consumer can specify a narrative description.

As depicted in FIGS. 30a-30c, the Return System compares the Consumer's Return Reason with the Enterprise's Return Policy 4365. According to the Enterprise's Return Policy, if the Consumer's Return Reason is "justified", then the Return System authorizes the return 4369 (and according to the Enterprise's Return Policy, pays for the Return Shipping), calculating a Refund Amount and allowing the Consumer to Launch a Label 4370, Print a Shipping Label 4371; the Return System thanks the Consumer 4372 and Prepares a Package Return Shipped e-mail 4373.

Returning to FIG. 37, a Refund Amount 4172 is calculated based upon the standard policy choices made by the Enterprise (Refund Amount 4172=Item Price 4173+Item Tax 4174, as depicted in FIG. 33). When the Consumer has completed the Return Reasons for the particular item, the Consumer clicks the onscreen "Next Step >>" button 4422.

FIG. 38 is a graphic representation of an exemplary Return Summary Screen in an exemplary embodiment of the invention. The Return Summary Screen depicted in FIG. 38 displays the Enterprise's Response 4213-1 appropriate for the Consumer's Return Reason 4427-3 depicted in FIG. 37 in response to the Enterprise's Return Question 4206 and possible Return Answers 4216, 4207, 4212 and 4220 depicted in FIG. 37. The Return Summary Screen depicted in FIG. 38 displays the item description of the item being returned 4404-7, the Reason for Return 4212, and the Consumer's comments 4425. The Return Summary Screen also displays the item price 4173 and the calculated Refund Amount 4172.

The Return Summary Screen prompts the Consumer to select one of the Enterprise's choices of Carriers 4187-1, 4188-1, 4190 and 4184. The Return Summary Screen also prompts the Consumer to indicate whether 4433 or not the 4434 the returned item is in its original packaging 4432. By pressing the onscreen "Next Step >>" button 4422, the Return System displays a Label Create Screen. Label Printing is described further below.

a.) Weighing the Package

Figure 39A:
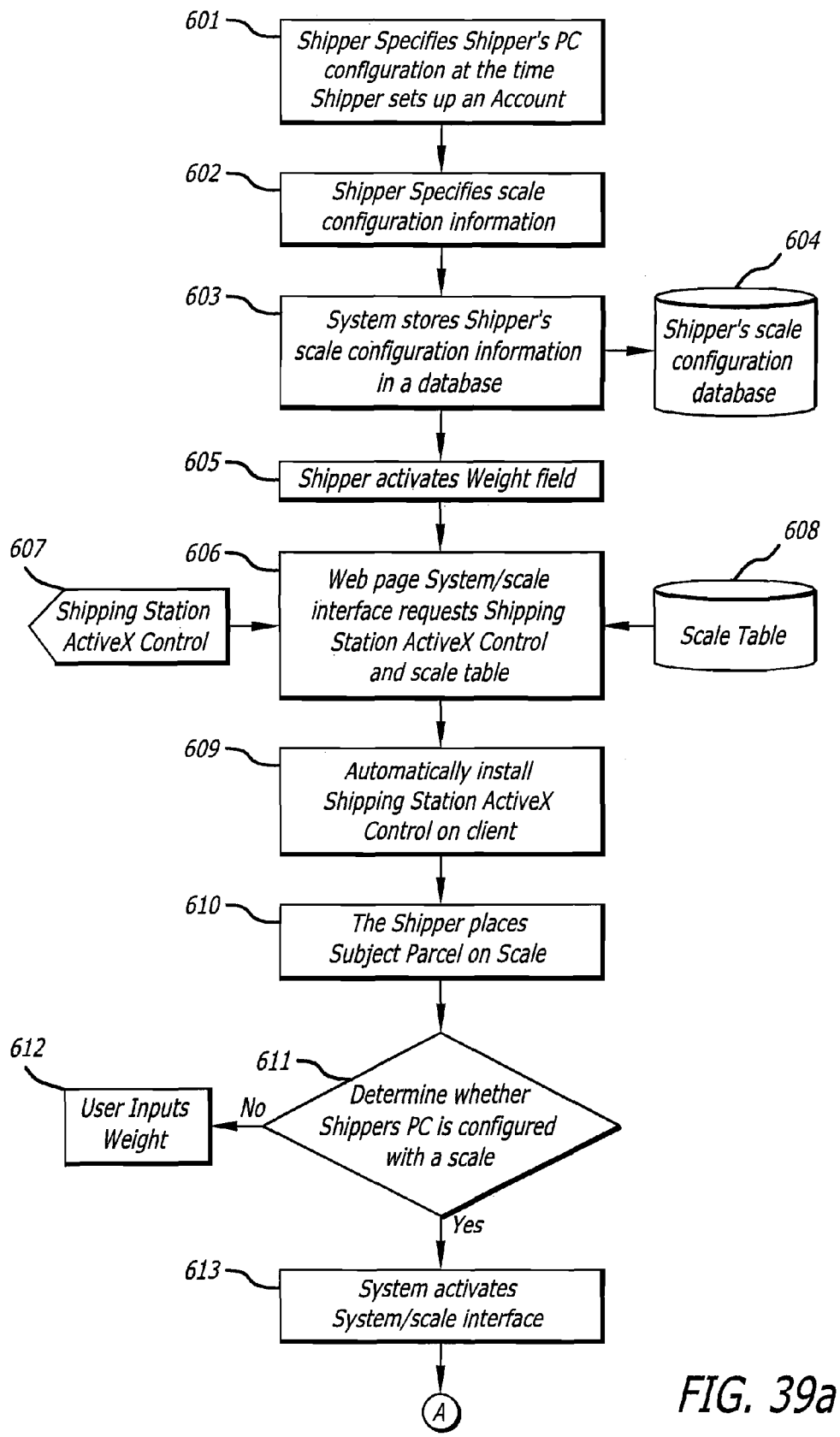
FIGS. 39a-39c are high level logic flow diagrams depicting control communications with client machine peripheral devices in an exemplary embodiment of the System in an Internet environment.
Figure 39B:
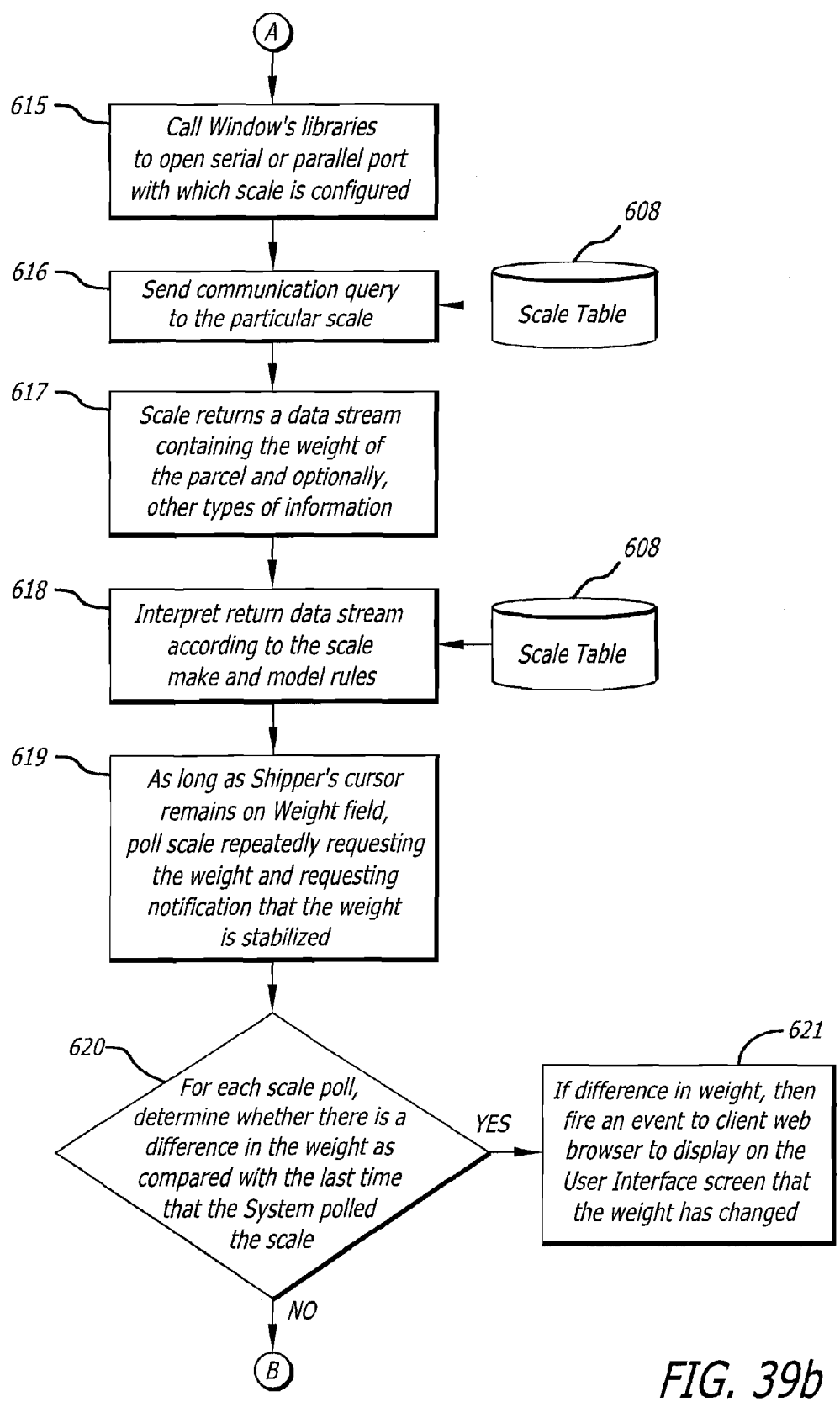
Figure 39C:
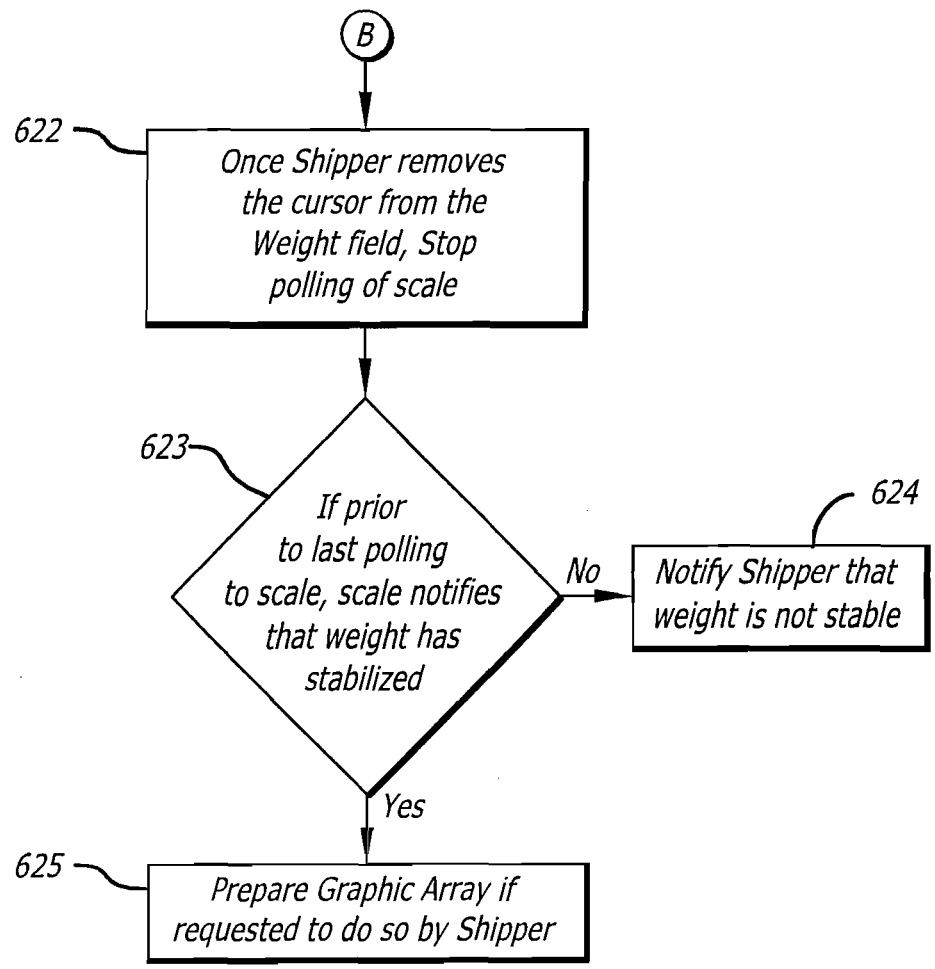

Depending on the Administrative settings for Shipping Rules and privileges available to the User, the Desktop User, or in the alternative, a Shipping Station, will need to supply the weight (e.g., 273-274, FIG. 25) of the parcel to be shipped. This can be done by weighing the package and entering the weight in a System data collection screen, or, in one embodiment of the invention, the Shipper's PC is configured with a scale and the System communicates with the Shipper's scale using the user's client web browser. FIGS. 39a through 39c depict an exemplary logic flow for communications between the System and a Shipper's PC and a scale configured with the Shipper's PC. In the exemplary embodiment, the Shipper establishes in the System certain information about the Shipper's PC configuration at the time the Shipper sets up an Account 601. If the Shipper's PC is configured with a scale, the Shipper specifies scale configuration information 602 such as: the make and model of scale, and the type of port (e.g., serial or parallel) with which the scale is configured with the PC. Further, the System provides storage and access 603 for the Shipper's scale configuration information in a database 604.

In the exemplary embodiment of the invention, the System supports various makes and models of scales. Each scale make and model has a set of features and requirements for which the System must be programmed in order for the System to communicate properly with each particular scale. The System provides an ActiveX control dedicated to communications with peripheral devices configured with client PCs ("Shipping Station ActiveX Control") 607. Contained within the Shipping Station ActiveX Control is a table (the "scale table") 608 containing entries for each supported scale make and model and provides logic to process the communication information for each scale make and model as appropriate. It should be understood by someone skilled in the art that the Shipping Station ActiveX Control facilitates communications with various devices on the client machine. The Shipping Station ActiveX Control 607 and the scale table 608 are requested 606 by the web page (the "System/scale interface") containing the Weight field 1051 at the time that the Shipper activates 605 the Weight field (e.g., 273-274, FIG. 25). Once the web page requests the Shipping Station ActiveX Control 607, the Shipping Station ActiveX Control 607 is automatically installed on the client 609. In the event that the Shipping Station ActiveX Control is updated to facilitate the support of additional scale makes and models, the Shipping Station ActiveX Control is automatically reinstalled on the particular client PC the next time that the Shipper activates the Shipping Station ActiveX Control.

The Shipper places the Subject Parcel on the scale 610. The Shipper activates the Shipping Station ActiveX Control by placing the cursor of the Shipper's PC on the Weight field (e.g., 273-274, FIG. 25). The System checks the Shipper's scale configuration information to determine 611 whether the Shipper's PC is configured with a scale. If so, the System activates the System/scale interface 613. Otherwise, the user may input the weight 612 in the weight fields 273-274 as depicted in e.g., FIG. 25.

In one embodiment of the System/scale interface aspect of the invention, the System uses ActiveX control language and the client's web browser, such as Internet Explorer browser. Using the Shipper's scale configuration information, the System calls Windows libraries 615 to open the serial or parallel port with which the scale is configured, as the case may be and as is specified in the Shipper's scale configuration information. Windows is an operating system used with most PCs.

The System uses the information for the particular scale make and model from the scale table 608 of scale makes and models to send a communication query to the particular scale 616. Typically, the communication query information required by a particular scale make and model is a particular set of characters. Each scale make and model recognizes a unique set of characters as a request for a weight. Accordingly, the appropriate set of characters that means a request for weight to a particular scale make and model is stored in the scale table for a particular scale make and model.

After a proper query, a scale will return a data stream containing the weight of the parcel 617. Depending on the scale make and model, other types of information may be contained in the return data stream. The System accesses the scale table 608 to interpret 618 the return data stream according to the scale make and model rules as stored in the scale table and as programmed in the Shipping Station ActiveX Control.

Other scale communication information is contained in the scale table for each scale make and model, including, for example: the character string that communicates a request as to whether or not the weight is stabilized; the default contents of the return data stream of the weight from a particular scale make and model; and the character string to request that the scale send the weight mode with the return data stream. Weight mode is the mode with which the scale measures weight (e.g., pounds, kilograms, etc.).

In one embodiment, as long as the Shipper's cursor remains on the Weight field (e.g., 273-274, FIG. 25), the System polls the scale repeatedly requesting the weight and requesting notification that the weight is stabilized 619. Each time the System polls the scale, the System tests to determine 620 whether or not there is a difference in the weight as compared with the last time that the System polled the scale. If the System determines a difference in weight, then the System uses the Shipping Station ActiveX Control to fire an event 621 to the client web browser to display on the User Interface screen that the weight has changed.

In one embodiment, once the Shipper removes the cursor from the Weight field (e.g., 273-274, FIG. 25), the System stops polling the scale 622. If prior to the last polling to the scale, the scale notifies the System that the weight has stabilized 623, the System will proceed with preparing the Graphic Array if requested to do so by the Shipper 625. Otherwise, if the System determines a difference in weight, the System notifies the Shipper that the weight is not stable 624.

b.) The Graphic Rate Comparison Array

Continuing with FIG. 25, once the User has entered shipping estimate information, the User can preview rates by clicking the Rates and Times link 290. Clicking the Rates and Times link 290 causes the System to display a Graphic Array, also referred to as a Rate Grid, that provides Users with a comparison view of the costs and delivery schedules for the carriers and services available at their Enterprise in an easy to use, Graphic Array summary format. The costs displayed are based on the custom rates entered for their Enterprise. The format enables the User to make an informed business decision on the tradeoff between cost and delivery time subject to shipment policies established by the Administrator.

In an exemplary embodiment of the invention, the System uses MTX.exe as a transaction server. MTX.exe is an executable program that is part of the Microsoft suite of Internet web solution products.

In the exemplary embodiment of the System, Web pages are grouped in organization units referred to as "virtual directories." For example, in the exemplary embodiment, all of the user interface Web pages that prompt a user to input registration data, and that provide interactive feedback to the registering user, would be grouped into a virtual directory. When a request for a particular Web page is received by a particular shipping Web server, the shipping Web server determines which virtual directory is needed. Depending on the virtual directory to be accessed, MTX.exe loads one of a plurality of COM objects, which are DLL's (Dynamic Link Libraries), for the System. One of the COM objects for the exemplary embodiment of the system is referred to as the Rating.DLL.

Each Enterprise user is enabled to process one or more Carriers from a plurality of Carriers supported by the system and authorized for use by an Administrator. In the exemplary embodiment of the invention, when a user, through the user's client PC, issues a rating request, the System passes a list of carrier identifiers for the carriers enabled for that user to the Rating.DLL operating on the shipping Web server to which the rating request is directed.

The Rating.DLL consists of various rating-related functions, one of which is referred to as "Get_Rate_Function". Get_Rate_Function receives as input the carrier IDs for the carriers enabled for the particular user, package information, shipping information, including origin and destination postal codes, and other information. Get_Rate_Function parses the received input information and tests the carrier ID to determine the name of one of a plurality of Carrier-specific shipment rating routines that is to be performed in order to rate shipments for the particular carrier ID. In the exemplary embodiment of the invention, the Carrier-specific shipment rating routines are SQL Stored Procedures that are executed by the appropriate SQL Database Server. Get_Rate_Function then causes the appropriate Carrier-specific shipment rating routine to be performed to rate the User-specified shipment according to the relevant Carrier's business rules.

Figure 40:
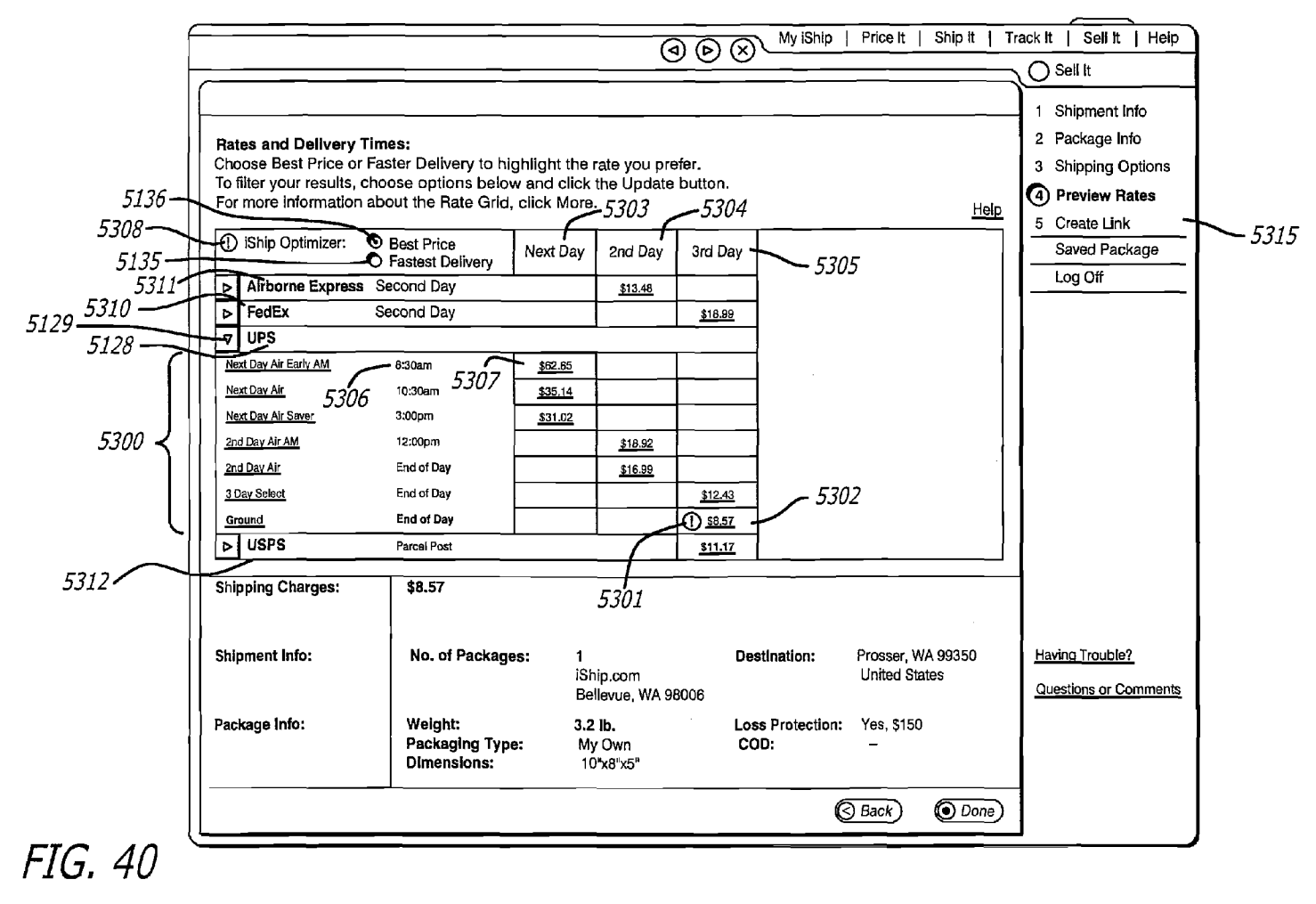

FIG. 40 is a graphic representation of an exemplary Preview Rates Screen (also referred to in some embodiments as a Rates and Times Screen) in an exemplary embodiment of the invention. The Graphic Array format is sortable by price (i.e., cheapest first), by delivery time (i.e., fastest is first), or preferred carrier, as governed by the Enterprise and User preferences. The Preview Rates Screen provides the User with the capability, if authorized by the Administrator, to optimize 5308 the Rates display according to the Best Price 5136, or the Fastest Delivery 5135.

The exemplary Preview Rates Screen depicted in FIG. 40 depicts an array of dates for delivery 5303-5305, Carriers, e.g., 5128 (UPS), and Services e.g., 5300 for UPS. If Carriers authorized by the Administrator and selected by the User provide Services authorized by the Administrator and selected by the User on more days than space exists on the Rate Grid, left and right scroll buttons (not shown) are provided.

The Services for a Carrier can be displayed by the User by clicking a scroll down button, e.g., 5129 for UPS. Each listed Service for the Carrier identifies the time for delivery, e.g, 5306. When the Preview Rates Screen is displayed, the Carrier for which the User has specified a preference (or for which the Administrator has specified a preference) is displayed in an expanded mode, such as is depicted in FIG. 40 for UPS so that all Services supported and authorized are displayed 5300; Carriers for which neither the User nor the Administrator have indicated preference are displayed in contracted mode, such as is the case for Fed Ex 5310, Airborne Express 5311 and USPS 5312.

In the embodiment depicted in FIG. 40, only the Carriers and Services authorized by the Administrator, and further reflecting the preferences of the User, are displayed. In one embodiment of the invention, a Show All button (not shown) is provided—clicking the Show All button causes the System to display all Carriers, Services, and Days of Delivery authorized by the Administrator, even if the User has previously limited the available Carriers, Services and Days of Delivery.

A price is displayed in an Array cell, e.g., 5307, 5302 for Carrier/Service supports the day of delivery 5303-5305. According to the User's Optimization Selection 5135-5136, an Optimizer icon 5301 is displayed in the Graphic Array cell entry that reflects the optimal Carrier/Service.

As is described below, each Carrier is represented in the Graphic Array/Rate Grid by a different color. In the embodiment of the Rate Grid depicted in FIG. 40, the optimally rated shipping entry for each Carrier is highlighted in the color for that Carrier; all other entries for that Carrier are in grey.

The presence or absence of Carriers in the Graphic Array display is driven by enterprise administrative policy (Next Day delivery may be prohibited by the Administrator for packages other than letters), and service choices the user has made (for example, by choosing a billing option that only certain carriers support).

The rates calculated and displayed in the Graphic Array are customizable. Some Enterprises may wish to see the iShip System transaction charge included in the rate quote. Some Enterprises may also wish to add their own markup to the carrier charges in order to cover the costs of the shipping department in general. Administrators use the Administrative Client to define user privileges that control what carriers and services appear in the rate display for a given shipment. They can also control the presence of the iShip transaction fee and any internal rate markup in rate grid charges.

Figure 41:
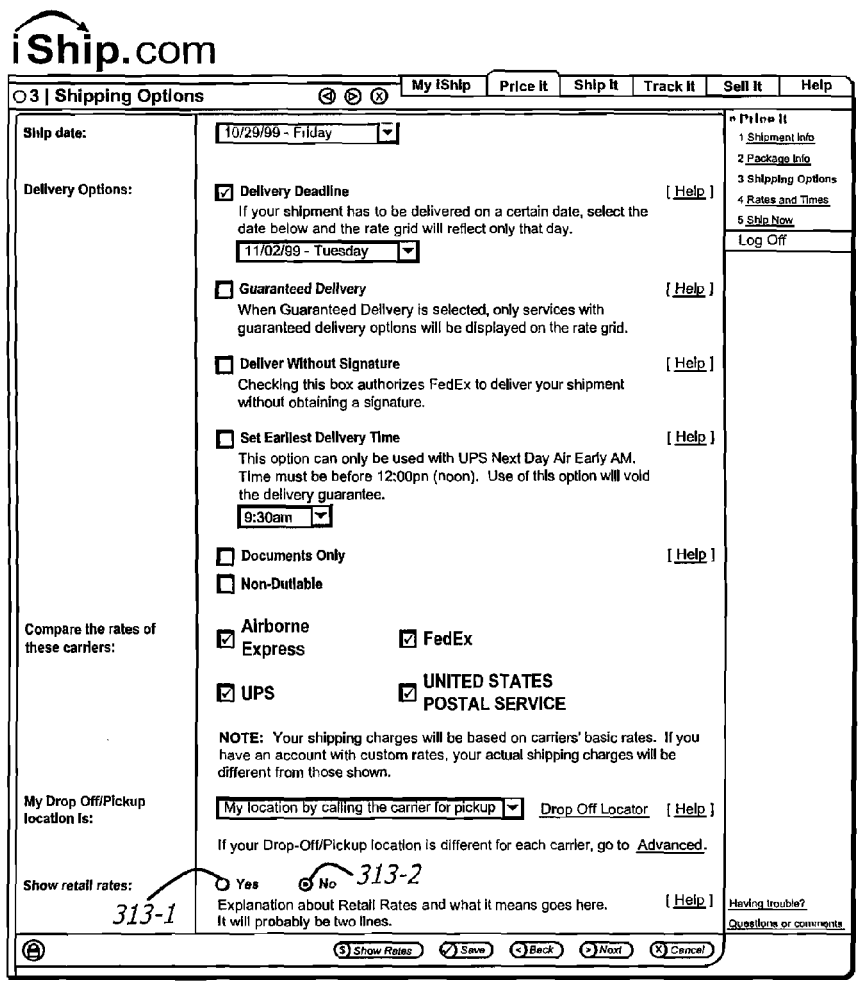
FIG. 41 is a graphic representation of an exemplary Shipping Options Screen in an exemplary embodiment of the invention.

In one embodiment of the invention, a Rating button is provided on the same screen on which the Graphic Array is displayed, with which the User can toggle the rates displayed in the Graphic Array back and forth between the Enterprise's actual shipping rates (including all discounts) and the rate that the Enterprise charges another person, e.g., the recipient, for shipping. In another embodiment, such as the one depicted in FIG. 41, the User selects the Show Retail Rates Yes 313-1 or No 313-2 button to indicate whether or not the Graphic Array displays Retail Rates or the Enterprise's rates at the time the User defines the Shipping options. FIG. 41 is a graphic representation of an exemplary Shipping Options Screen that is displayed when a package is to be shipped.

Unless prohibited by the Administrator, Users can generally access general rate information outside a shipping transaction, as well as rating applied to a particular shipping transaction.

c.) An Alternative Embodiment of the Graphic Array An alternative exemplary embodiment of a Graphic Array is depicted in FIG. 42. In the embodiment of the Graphic Array depicted in FIG. 42, the particular screen is titled the Rates and Times Screen.

As depicted in FIG. 42, the exemplary Graphic Array contains the following information and display elements: 1) valid delivery dates 1063 (1063-1 through 1063-3) across the top of the graphic display for the selected Ship Date; 2) sorted, valid delivery times 1064 (1064-1 through 1064-6) for all valid dates down the left side of the graphic display; and 3) color coded by Carrier, Carrier cell entries, e.g., 1065, for each available rate, by date and time.

In the exemplary embodiment depicted in FIG. 42 the Graphic Array comprises an array of intersecting rows and columns. Each column corresponds to a day and date of parcel delivery. In FIG. 42, the days and dates of delivery shown are "TUE 28 SEP 99" (1063-1), "WED 29 SEP 99" (1063-2) and "THU 30 SEP 99" (1063-3). As depicted in FIG. 42, space for other columns (1063-4 through 1063-7) are available for display; in the case of the example depicted in FIG. 42 however, no dates are displayed in those columns.

Each row of the Graphic Array corresponds to a time of delivery. In FIG. 42, the times of delivery are shown as "8:00 AM" (1064-1), "10:30 AM" (1064-2), "12:00 PM" (1064-3), "3:00 PM" (1064-4), "4:30 PM" (1064-5), and "5:00 PM" (1064-6).

At the intersection of each row (1064-1 through 1064-6) and column (1063-1 through 1063-7) of the Graphic Array is a "cell." In FIG. 42, cells will be referred to by the element 1071, and by the intersecting row (1 through 6) and column (1 through 7) the intersection of which forms the space for each cell (1071-1-1, 1071-1-2, . . . 1071-6-7). Some of the cells depicted in FIG. 42 are empty, e.g., 1071-5-1, 1071-6-1, 1071-6-3, 1071-6-4. Empty cells represent the circumstances that none of the Carriers supported by the System (the "supported Carriers") support delivery of the Subject Parcel for the time and date for which that cell represents the intersection.

Some cells depicted in FIG. 42 have one or more cell entries. In FIG. 42, each cell entry represents a particular Carrier. Each Carrier cell entry is color coded with a unique color, the unique color corresponding to a particular Carrier as is discussed in more detail below; each Carrier cell entry contains a graphic element, e.g., 1147*a*, and a monetary amount, e.g., 1147*b*, which represents the price for which the corresponding Carrier would deliver the subject parcel. For instance, cell 1071-1-1 contains a single Carrier cell entry 1148. Cell 1071-3-1 contains two Carrier cell entries 1065 and 1149.

A color-coding legend 1062 is displayed on the Screen to identify by a name (1140*b*, 1141*b*, 1142*b*, and 1143*b*) and a color-coding symbol (1140*a*, 1141*a*, 1142*a*, and 1143*a*), each of the supported Carriers that provide the service according to the particular Shipper's Parcel Specifications for the particular Subject Parcel.

For purposes of this application, unique colors are depicted with graphic symbols. For example, a right-diagonal hash mark symbol 1140*a* is used herein to represent the color red; a left-diagonal hash mark symbol 1141*a* is used herein to represent the color purple; a vertical hash mark symbol 1142*a* is used to represent the color amber; and a horizontal hash mark symbol 1143*a* is used to represent the color blue. The particular hash mark symbols used herein and the colors mentioned herein are exemplary and are not a limitation of the invention.

Each cell of the Graphic Array that is not empty contains one or more color-coded Carrier cell entries. For example, in FIG. 42, cell 1071-3-1 contains two Carrier cell entries, 1065 and 1149. Carrier cell entry 1065 is color-coded with the right-diagonal hash mark symbol (representing the color red) which, according to the color-coding legend 1062, corresponds 1140*a* with the Carrier identified as "Airborne" 1140*b*. Carrier cell entry 1149 is color coded with the horizontal hash mark symbol (representing the color purple) which, according to the color-coding legend 1062, corresponds 1143*a* with the Carrier identified as "USPS" 1143*b*.

Each Carrier cell entry, e.g., 1065, contains a graphic element, e.g., 1065*a*, which contains what is known as "ALT text". As depicted in FIG. 42, a Shipper viewing the Graphic Array online can place the PC's cursor on the graphic element, e.g., 1065*a* of a particular Carrier cell entry, e.g., 1065, to display a pop-up screen 1069 that displays the ALT text for that particular Carrier cell entry. In some embodiments, the ALT text will be displayed by merely placing the cursor over the graphic element for a particular Carrier cell entry and leaving the cursor in that position for a certain time interval. In alternative embodiments, the Shipper must click on the graphic element for a particular Carrier cell entry in order to display the ALT text. In the exemplary embodiment depicted in FIG. 42, the displayed ALT text, e.g., the text displayed in pop-up screen 1069, contains the full Carrier name (in the depicted case, "Airborne Express") and the full Carrier service name (in the depicted case, "Express Overnight Service") for the Carrier 1140*b* (in this case, Airborne) to which that Carrier cell entry corresponds.

As depicted in FIG. 42, the color for the Carrier identified as "Airborne" 1140*b* is depicted in the color coding legend 1062 with a right-diagonal cross-hatch symbol 1140*a*. Accordingly, each Carrier cell entry contained within the Graphic Array with the right-diagonal cross-hatch symbol, e.g., 1065, corresponds to a delivery of the Subject Parcel supported by the Carrier "Airborne." Appearing in each of the color-coded Carrier cell entries, e.g., 1065 is a graphic element, e.g., 1065*a*, and a monetary value, e.g., 1065*b*. The monetary value, e.g., 1065*b* corresponds to the price that the corresponding Carrier would charge to deliver the Subject Parcel according to the time 1064-3 and date 1063-1 specified according to the row and column of which the intersection (which, in the case described is cell 1071-3-1) contains the Carrier cell entry 1065. For example, as depicted in FIG. 42, the Carrier cell entry 1065, depicted with the right-diagonal cross-hatch symbol, contains the monetary amount "$9.00." Accordingly, the amount $9.00 is the price that the Carrier Airborne would charge to deliver the Subject Parcel at the identified time of 12:00 p.m. 1064-3 on the identified date of Tuesday, Sep. 28, 1999 1063-1.

Similarly, as depicted in FIG. 42, the color for the Carrier identified as "FedEx" 1141*b* is depicted in the color coding legend 1062 with a left-diagonal cross-hatch symbol 1141*a*. Accordingly, each Carrier cell entry contained within the Graphic Array with the left-diagonal cross-hatch symbol, e.g., 1147, corresponds to a delivery of the Subject Parcel supported by the Carrier "FedEx."

Further, as depicted in FIG. 42, the color for the Carrier identified as "UPS" is depicted in the color coding legend 1062 with a vertical cross-hatch symbol 1142. Accordingly, each Carrier cell entry contained within the Graphic Array with the vertical cross-hatch symbol, e.g., 1148, corresponds to a delivery of the Subject Parcel supported by the Carrier "UPS."

Similarly, as depicted in FIG. 42, the color for the Carrier identified as "USPS" is depicted in the color coding legend 1062 with a horizontal cross-hatch symbol 1143. Accordingly, each Carrier cell entry contained within the Graphic Array with the horizontal cross-hatch symbol, e.g., 1149, corresponds to a delivery of the Subject Parcel supported by the Carrier "UPS."

In the embodiment of the Graphic Array depicted in FIG. 42, the Graphic Array is dynamically dimensioned. For instance, only the dates and days (1063-1 through 1063-3) for which delivery that conforms to the particular Shipper's Parcel Specifications for the particular Subject Parcel are displayed across the top of the graphic. For example, for the date Tuesday, Sep. 28, 1999 (1063-1), at the time 5:00 p.m. (1064-6), no Carrier supports delivery of the Subject Parcel.

Further, as depicted in FIG. 42, only the times (1064-1 through 1064-6) during which at least one of the Carrier/Services identified as supporting the delivery are displayed along the viewer's left side of the Dynamically Dimensioned Multi-Carrier Graphic Array online display.

Still further, as depicted in FIG. 42, a Carrier cell entry, e.g., 1065, is displayed for each of, but only for each of, the Carriers/Services that support delivery for a particular day and time in the cell of the Graphic Array that represents delivery on a particular day and at a particular time. When the circumstances require, the System displays one or more Carrier cell entries in a single cell. For instance, cell 1071-3-1 contains two entries, 1065 and 1149; whereas cell 1071-1-1 contains only a single cell. Accordingly, as depicted in FIG. 42, the cell size expands vertically to accommodate multiple Carrier cell entries.

In the exemplary embodiment depicted in FIG. 42, the color-coding legend 1062 for each of the Carriers/Services represented in the Graphic Array is displayed with color-coding graphic elements (1140*a* through 1143*a*) and identification labels (1140*b* through 1143*b*) for each relevant Carrier/Service along the viewer's right side of the rating and timing graphic. Alternatively, instead of the printed name, the logo for the particular Carrier/Service can be displayed. As another alternative, the Carrier/Service logo can be displayed in color in the color-coding legend 1062.

The particular arrangement of the color legend 1062 depicted in FIG. 42 and the particular colors used in the color legend depicted therein are exemplary and are not a limitation of the invention. In an alternative embodiment, instead of using color, other visually distinctive methods are used to differentiate between different Carriers/Services. For instance, other visually distinctive methods of Carrier/Service differentiation include but are not limited to: three-dimensional texture effects, other three-dimensional effects, two-dimensional markings (for instance, dots, cross-hatching, and the like), lighting effects, graphic symbols (for instance, the logos of the Carriers/Services) and any combination of the aforementioned features with color.

In the embodiment of the Graphic Array depicted in FIG. 42, the exemplary Graphic Array is depicted as horizontally wide enough to accommodate seven delivery days (1063-1 through 1063-7) within a particular delivery timespan. The depiction in FIG. 42 of the Graphic Array as a fixed size accommodating up to seven delivery days is exemplary and is not a limitation of the invention. In alternative embodiments, the Graphic Array online display collapses or expands in total size to reflect the actual number of rows and columns that need to be present in order to display the Carrier cell entries for the Carriers/Services that support delivery of the Subject Parcel according to the Shipper's Parcel Specifications.

The arrangement as depicted in FIG. 42 of the parcel delivery days and dates (1063-1 through 1063-7) across the top and the parcel delivery times (1064-1 through 1064-6) along the left side of the Graphic Array is exemplary and is not a limitation of the invention. In one alternative embodiment, the parcel delivery days and dates are displayed across the bottom, and the parcel delivery times are displayed on the viewer's right side, of the Graphic Array. In other alternative embodiments, the parcel delivery days are arranged on one of the two sides of the Graphic Array and the parcel delivery times are arranged along the top or the bottom of the Graphic Array. In such an alternative embodiment, the cells of the Graphic Array are expandable horizontally to accommodate the appropriate number of relevant Carriers/Services.

As depicted in FIG. 42, the Shipper is asked to input the Expected Ship Date 1060. In the exemplary embodiment depicted, a drop down menu activation mechanism 1061 provides the Shipper the ability to activate a pull down menu (not shown) of seven entries beginning with the current date and includes the six days immediately following the current date. The format used is "M/D/YY-Day name". "Today" and "Tomorrow" are displayed appropriately. The number of entries provided by the selection mechanism, the format of the Expected Ship Date, and other features described herein are exemplary and are not a limitation of the invention.

In the exemplary embodiment depicted in FIG. 42, once the Shipper selects the Expected Ship Date, the System uses the Expected Ship date and the other information provided by the Shipper, such as in the screen depicted in FIGS. 25 and 41 described above, to access the Carrier Rules, apply the Carrier Rules, and prepare the Graphic Array containing the delivery prices and delivery times for the Subject Parcel according to the Shipper's Parcel Specifications. The System will then generate the signals necessary to display the Graphic Array and cause the Graphic Array to be displayed on the Shipper's PC.

Once the Graphic Array is displayed, the Shipper can change previously input information and the System will automatically regenerate the Graphic Array with the delivery rates and delivery times that have been updated to reflect the new information. For instance, if the Shipper selects a new shipping date, the System will regenerate the Graphic Array with the appropriate new rates and times. The logic for regenerating the Graphic Array is described in more detail below.

In the exemplary embodiment depicted in FIG. 42, a Ship Location Type drop down menu activator 1067 is located below the Graphic Array. The particular location of the Ship Location Type selection mechanism as described herein is exemplary and is not a limitation of the invention. If the Shipping Location class is a "ship center", a "Find Location" button 1068 is displayed next to the drop down menu. In order to open the Drop Off Locator in a pop-up window, the Shipper places the Shipper's PC cursor on the "Find Location" button 1068 and clicking the Shipper's user input device. The Origin Zip Code and Ship Location type values supplied by the Shipper are used as parameters for the Drop Off Locator to locate a list of possible Drop Off Location choices. The Shipper can select a Drop Off Location from the Drop Off Locator menu. The system dynamically responds to changes by the Shipper to Origin Zip Code and Ship Location type to present choices of Drop Off Location choices.

Figure 56:
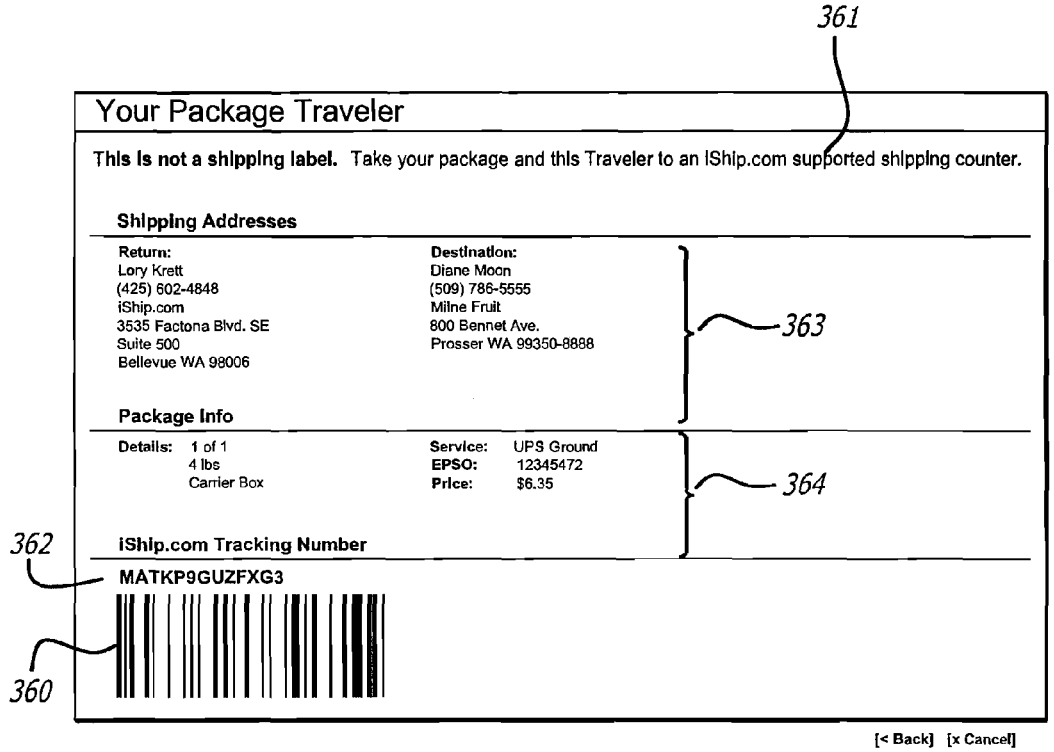
FIG. 56 is a graphic representation depicting an exemplary Traveler Label in an exemplary embodiment of the invention.

Navigational buttons appear at the bottom of the Rates and Times Screen depicted in FIG. 42. Clicking the "Back" button 1070 will return the Shipper to the previously displayed screen. Clicking the "Next" button 1054 will cause the next screen to be displayed but only if the Shipper has selected a particular Carrier cell entry. For example, if the Shipper clicks on a particular Carrier cell entry such as 1065, the System will allow the Shipper to then click on the "Next" button 1054 and proceed to, e.g., print a Traveler Label, as depicted in FIG. 56.

If a user returns to the Rates and Times Screen (FIG. 42) from any of the Specification Screens, e.g., FIGS. 25 and 41, any Specification changes will effect the displayed rates.

Using the subject parcel's Parcel Specifications, the System is programmed to access databases containing information about each supported Carrier. Each supported Carrier has a unique rating schedule, delivery and pickup rules and schedules, and certification requirements (the "Carrier Rules").

The System is further programmed to apply each supported Carrier's Rules to each Shipper's Parcel Specifications for the corresponding Subject Parcel. The System calculates the Shipping Charges based on zip-to-zip pricing where the Seller has provided the origin zip code and the Buyer has provided the destination zip code.

To develop the rates for display in the Graphic Array, the System rating component is instantiated in the server-side script such as described above. The rating component's rate information method is invoked with the rate parameters embedded in the URL. Based on Carriers' business rules, the rates and their service option charges for all Carriers/Services are calculated from each respective Carrier's zone data, service/delivery time data and rate data.

The System keeps the Carrier data up-to-date in the System database 22. The application does not use any carriers' Application Program Interface (API) functions to get the rate information. All of carrier rate data is stored in the System database 22 and all business rules to calculate the rates are implemented within the System.

Figure 43:
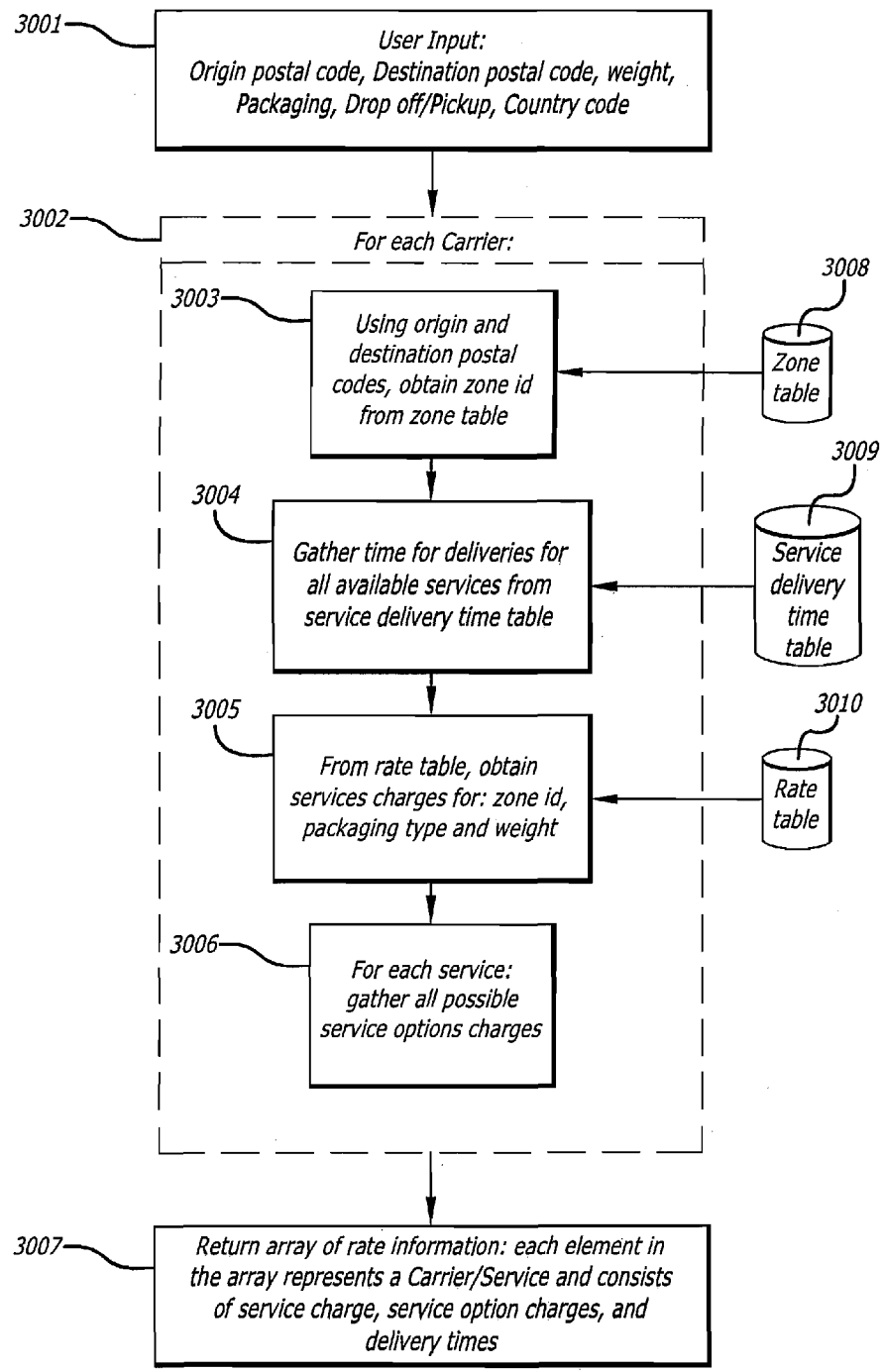
FIGS. 43, 44a through 44b, and 45 are high level data retrieval logic flow diagrams depicting the data and high level logic that the system uses to calculate a shipping rate.

FIGS. 43, 44a through 44b, and 45 are high level data retrieval and logic flow diagrams depicting the data and high level logic that the system uses to calculate a shipping rate. As depicted in FIG. 43, the following shipping information is used to calculate a shipping rate: Origin postal code, Destination postal code, Weight, Packaging, Drop off/Pickup, Country code 3001. For each Carrier 3002, the rating component of the System uses the origin and destination postal codes 3003. The rating component of the System obtains 3003 the zone id from the zone table 3008 and gathers 3004 the time for deliveries for all available services from the service delivery time table 3009. From the rate table 3010, the rating component obtains services charges for the zone ID, packaging type and weight 3005. For each service, the rating component gathers all possible service options charges 3006. After gathering necessary information, the rating component returns an array of rate information 3007. Each element in the array represents a Carrier/Service and consists of service charge, service option charges, and delivery times.

Figure 44A:
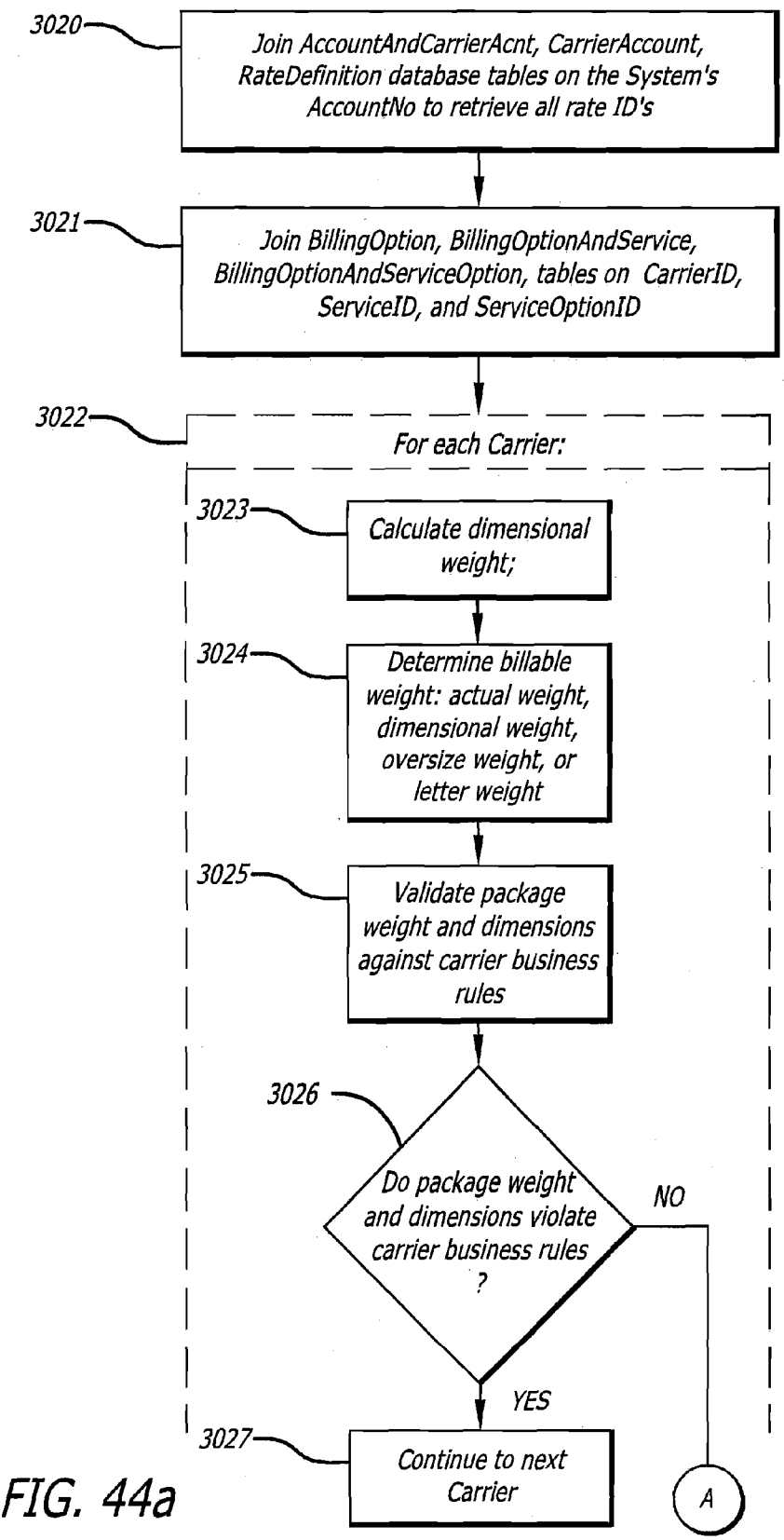
Figure 44B:
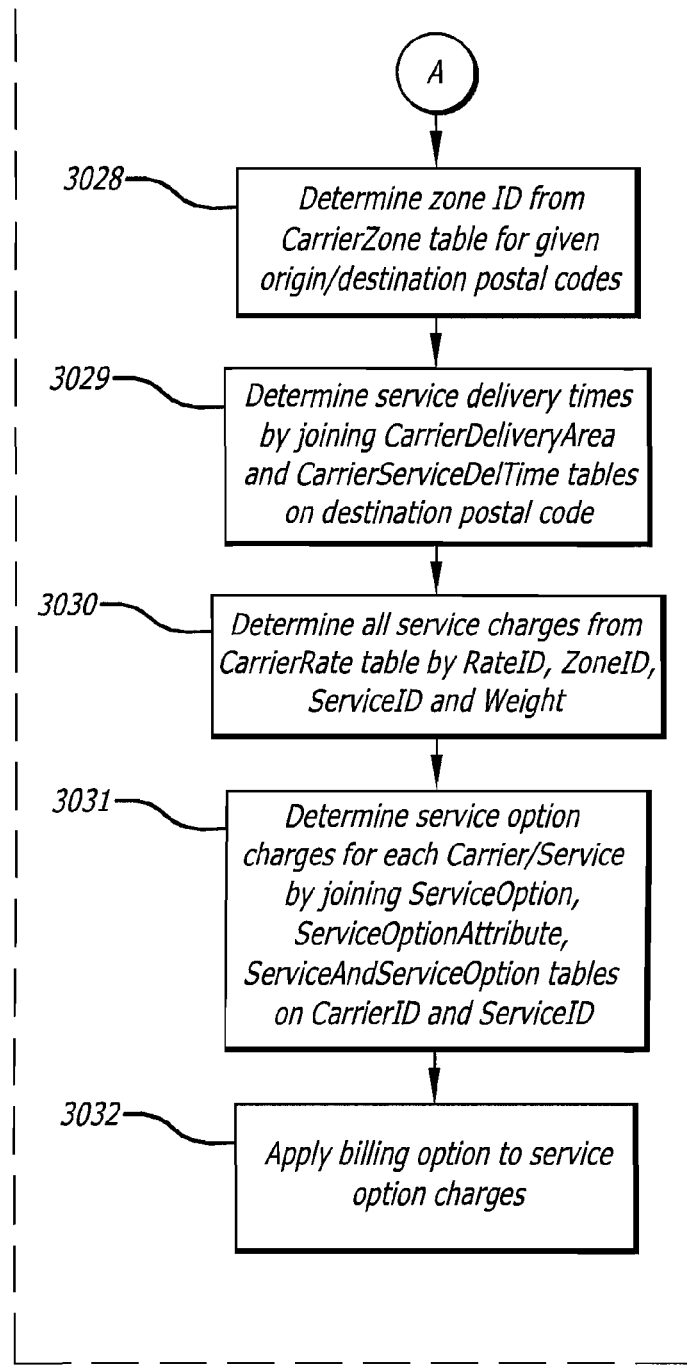

The System calculates the rates according to the following overview logic as depicted in FIGS. 44a-44b. The System retrieves all rate IDs (published, net, and retail) by joining the following database tables on the System's AccountNo: AccountAndCarrierAcnt; CarrierAccount; RateDefinition 3020.

The System then determines the billing rules for all of the Carrier/Service combinations and their service options by joining the following tables on CarrierID, ServiceID, and ServiceOptionID: BillingOption; BillingOptionAndService; BillingOptionAndServiceOption 3021.

For each carrier 3022, the System performs the following procedures: 1) determine if the particular carrier supports the given billing option based on step 2 3026. If not, continue with the next carrier 3027; 2) Apply carrier business rules, including: a) Calculate dimensional weight 3023; b) Determine billable weight 3024: actual weight, dimensional weight, oversize weight or letter weight; c) Validate package weight and dimensions 3025; (If the rate input violate carrier business rules 3026, continue to next carrier 3027); 3) Determine the zone ID from CarrierZone table for the given origin/ destination postal codes 3028; 4) Determine service delivery times 3029 (including Saturday/Sunday delivery times) by joining the following tables on destination postal code: a) CarrierDeliveryArea; b) CarrierServiceDelTime; 5) Determine all service charges from CarrierRate table by RateID, ZoneID, ServiceID and Weight 3030; 6) Determine the service option charges for each Carrier/Service 3031 by joining the following tables on CarrierID and ServiceID: ServiceOption; ServiceOptionAtttribute ServiceAndServiceOption; and 7) Apply billing option to service option charges 3032 (different service option charges could be billed to different parties for various billing options).

Figure 45:
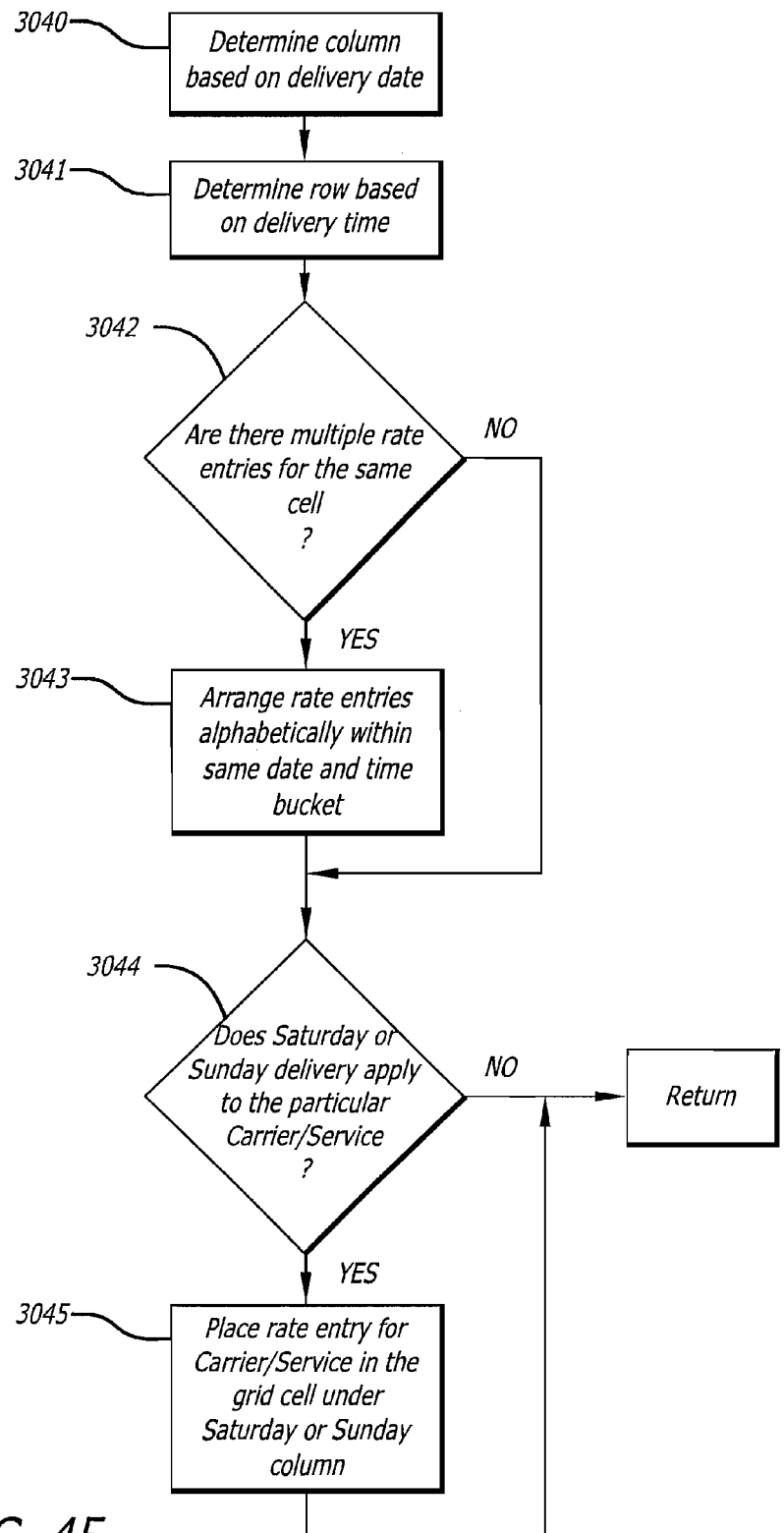
Figure 46A:
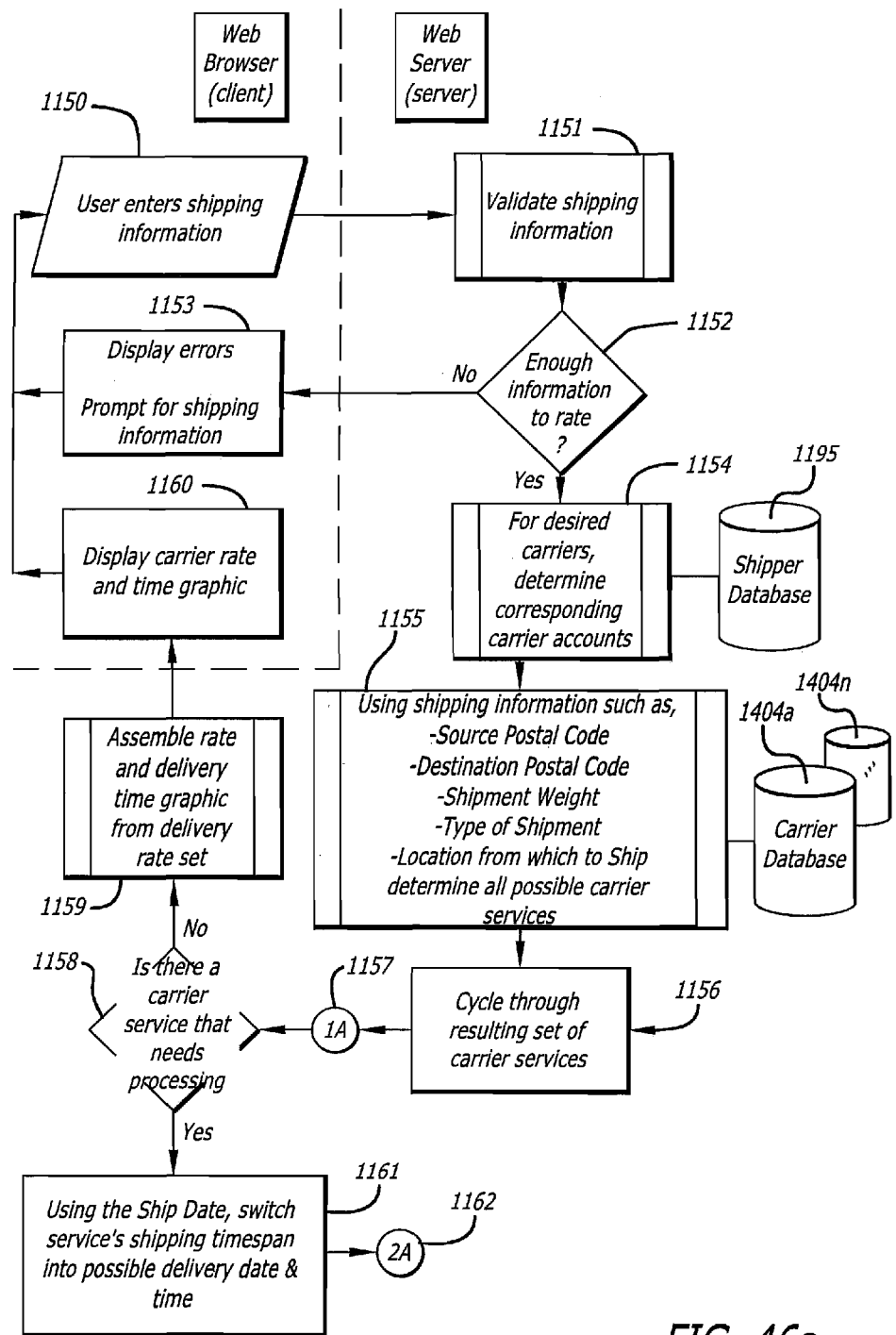
Figure 46B:
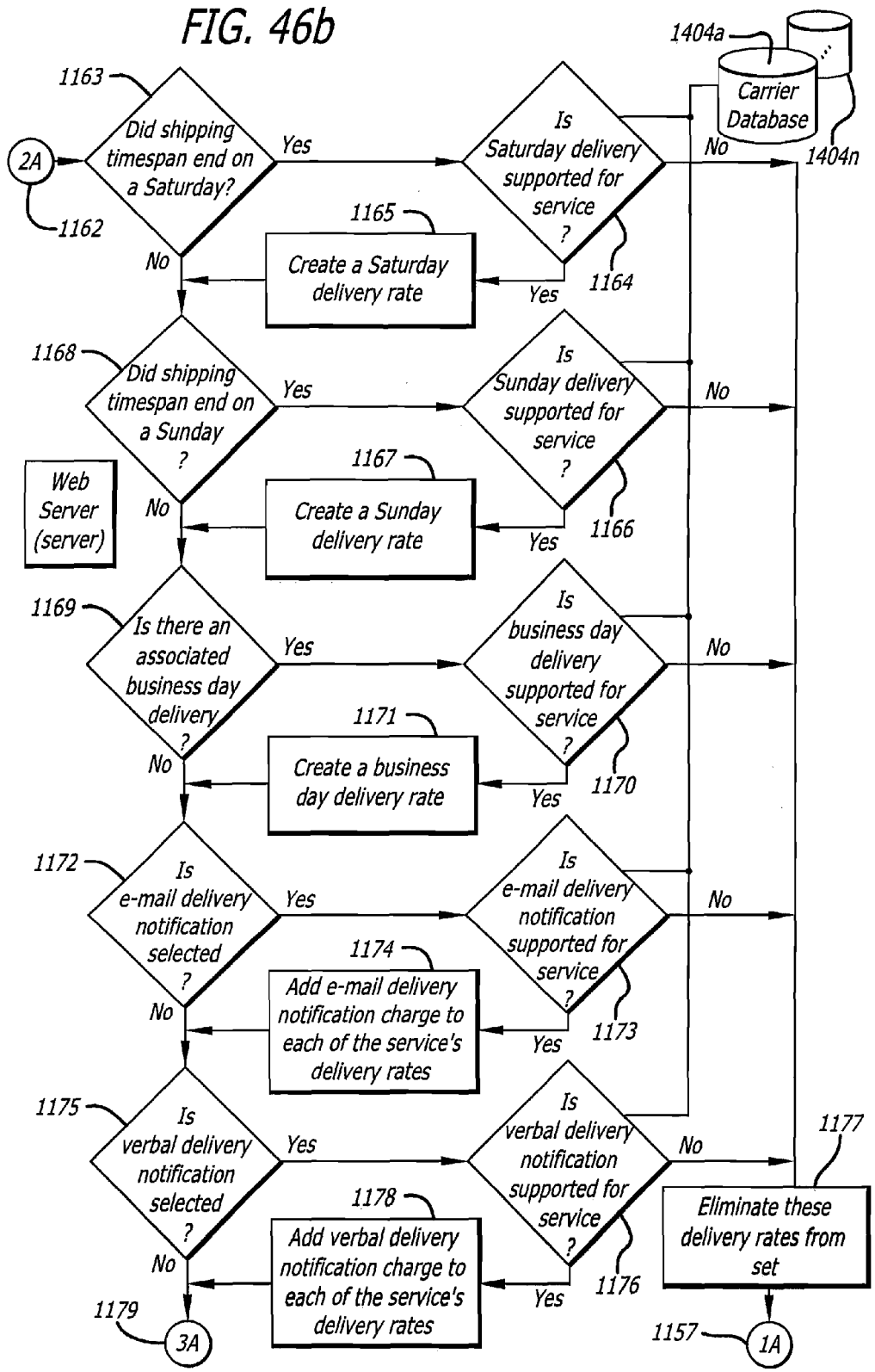

As depicted in FIG. 45, the expected delivery times for each Carrier/Service returned in the rate information determine the placement of the rate grid for the particular Carrier/Service cell: the delivery date determines the columns 3040 while the delivery time resolves the rows 3041. In the event that multiple rate entries collide 3042, the alphabetical order of the particular Carrier's name is further used to determine the Graphic Array entry order within the same date and time bucket 3043. The same Carrier/Service can be placed in a second time slot in the grid under Saturday or Sunday column 3045 if the Saturday or Sunday delivery is applicable to the particular Carrier/Service 3044.

d.) Generating the Graphic Array FIGS. 46*a* through 46*c* are simplified flow diagrams depicting the initial Timing and Rating procedure to generate a Graphic Array in an exemplary embodiment of the invention. In the embodiment of the invention depicted in FIGS. 46*a* through 46*c*, the functions of the Shipper entering shipping information 1150, displaying errors to the Shipper that insufficient shipping information has been provided and prompting the Shipper for additional information 1153, and displaying the Carrier/Service rate and time graphic 1160, are all processed by the Web Browser at the Client. In the embodiment depicted, all other functions and processes depicted in FIGS. 46*a* through 46*c* are performed by one or more of the System Servers.

It should be noted that the depicted separation of functions between the Web Browser at the Client on the one hand and the System Servers on the other hand represents an initial procedure to construct the Graphic Array in response to initial Shipper input of Shipper Parcel Specifications. As is explained in more detail below, after the initial construction of the Graphic Array, the System can distribute certain of the functions for supplemental regeneration of the Graphic Array to the Web Browser Client.

As depicted in FIG. 46*a*, the Shipper (User) enters shipping information (Shipper Parcel Specifications) 1150. The System validates the shipping information 1151.

In the embodiment depicted, at a minimum, the System requires Source Postal Code, Destination Postal Code, Parcel Weight, Type of Shipment, and the Shipping Location in order to determine a timing schedule and rates for each supported Carrier. If the Shipper has not provided at least these minimum specifications, then the System displays error messages 1153 prompting the Shipper to input further Shipper Parcel Specifications 1150.

If the Shipper has supplied the minimum required specifications, then the System accesses the Shipper Database 1195 to identify any user-specified Carrier designations and to determine the Carrier accounts for the appropriate Shipper 1154. Using the Shipper Parcel Specifications, the System then accesses the Carrier Databases (1404*a* through 1404*n*) and determines all possible Carrier/Services that support shipping of the subject parcel 1155.

It should be noted that in the Enterprise Shipping environment, an Administrator can restrict the identity of Carriers available to be used in the construction of the Graphic Array.

The System then examines each Carrier/Service in the set of supporting Carrier/Services 1156. The next step 1157 is a juncture for return of control from a number of points in the System logic and is performed for each Carrier/Service in the set of supporting Carrier/Services.

If the System has examined all possible supporting Carrier/Services 1158, the System assembles the Graphic Array from the delivery rate set 1159 and displays the Graphic Array to the user 1160. As was previously explained, the dimensions of the Graphic Array are dynamic. As long as there are further Carrier/Services that remain to be examined in the set of supporting Carrier Services, the System continues to perform the process described below. Using the Expected Shipping Date, the System switches the Carrier/Service's shipping timespan into possible delivery dates and times 1161.

Next 1162 as depicted in FIG. 46*b*, the System determines whether the shipping timespan ends on a Saturday 1163. If so, the System accesses the Carrier Database (1404*a* through 1404*n*) to determine whether the particular Carrier/Service supports Saturday Delivery 1164. If the particular Carrier/Service does not support Saturday Delivery, then the particular Carrier/Service is eliminated 1177 from the delivery rate set and the System proceeds with the next Carrier/Service in the delivery rate set 1157.

If the particular Carrier/Service supports Saturday Delivery, the System determines the appropriate Saturday delivery rate for the particular Carrier/Service 1165.

Next, the System determines whether the shipping timespan ends on a Sunday 1168. If the shipping timespan ends on a Sunday, the System accesses the Carrier Database (1404*a* through 1404*n*) to determine whether the particular Carrier/Service supports Sunday delivery 1166. If the particular Carrier/Service does not support Sunday delivery, then the particular Carrier/Service is eliminated from the delivery rate set 1177 and the System proceeds with the next Carrier/Service in the delivery rate set 1157.

If the particular Carrier/Service supports Sunday Delivery, the System determines the appropriate Sunday delivery rate for the particular Carrier/Service 1167.

The System then determines whether there is a business day delivery within the shipping timespan 1169. If so, the System accesses the Carrier Database (1404*a* through 1404*n*) to determine whether the particular Carrier/Service supports business day delivery 1170. If the particular Carrier/Service does not support business day delivery, then the particular Carrier/Service is eliminated from the delivery rate set 1177 and the System proceeds with the next Carrier/Service in the delivery rate set 1157.

If the particular Carrier/Service supports business day delivery, the System determines the appropriate business day delivery rate for the particular Carrier/Service 1171.

The System next determines whether the Shipper has requested E-Mail delivery notification 1172. If so, the System accesses the Carrier Database (1404*a* through 1404*n*) to determine whether the particular Carrier/Service supports E-Mail delivery notification 1173. If the particular Carrier/Service does not support E-Mail delivery notification, then the particular Carrier/Service is eliminated from the delivery rate set 1177 and the System proceeds with the next Carrier/Service in the delivery rate set 1157.

If the particular Carrier/Service supports E-Mail delivery notification, the System adds the appropriate charge for the E-Mail delivery notification service to each of the particular Carrier/Service's delivery rates 1174.

The System then determines whether the Shipper has requested verbal delivery notification 1175. If so, the System accesses the Carrier Database (1404*a* through 1404*n*) to determine whether the particular Carrier/Service supports verbal delivery notification 1176. If the particular Carrier/Service does not support verbal delivery notification, then the particular Carrier/Service is eliminated from the delivery rate set 1177 and the System proceeds with the next Carrier/Service in the delivery rate set 1157.

If the particular Carrier/Service supports verbal delivery notification, the System adds the appropriate charge for the verbal delivery notification service to each of the particular Carrier/Service's delivery rates 1178.

Next 1179 as depicted in FIG. 46*c*, the System determines whether the Shipper has requested that the Carrier/Service guarantee delivery time 1180. If so, the System accesses the Carrier Database (1404*a* through 1404*n*) to determine whether the particular Carrier/Service supports guaranteed delivery times 1181. If the particular Carrier/Service does not support guaranteed delivery times, then the particular Carrier/Service is eliminated from the delivery rate set 1177 and the System proceeds with the next Carrier/Service in the delivery rate set 1157.

If the particular Carrier/Service supports guaranteed delivery times, the System adds the appropriate charge for the guaranteed delivery times service to each of the particular Carrier/Service's delivery rates 1182.

The System then determines whether the Shipper has requested a "Call for Pickup" shipping location 1184. If so, the System accesses the Carrier Database (1404*a* through 1404*n*) to determine whether the particular Carrier/Service supports "Call for Pickup" services 1185. If the particular Carrier/Service does not support "Call for Pickup" services, then the particular Carrier/Service is eliminated from the delivery rate set 1177 and the System proceeds with the next Carrier/Service in the delivery rate set 1157.

If the particular Carrier/Service supports "Call for Pickup" services, the System adds the appropriate charge for the "Call for Pickup" service to each of the particular Carrier/Service's delivery rates 1186.

The System next determines whether the Shipper has requested a "Residential Delivery" 1187. If so, the System accesses the Carrier Database (1404*a* through 1404*n*) to determine whether the particular Carrier/Service supports "Residential Delivery" services 1188. If the particular Carrier/Service does not support "Residential Delivery" services, then the particular Carrier/Service is eliminated from the delivery rate set 1177 and the System proceeds with the next Carrier/Service in the delivery rate set 1157.

If the particular Carrier/Service supports "Residential Delivery" services, the System adds the appropriate charge for the "Residential Delivery" service to each of the particular Carrier/Service's delivery rates 1189.

The System then determines whether the Shipper has requested "Loss Protection" services 1190. If so, the System accesses the Carrier Database (1404*a* through 1404*n*) to determine whether the particular Carrier/Service supports "Loss Protection" services 1191. If the particular Carrier/Service does not support "Loss Protection" services, then the particular Carrier/Service is eliminated from the delivery rate set 1177 and the System proceeds with the next Carrier/Service in the delivery rate set 1157.

If the particular Carrier/Service supports "Loss Protection" services, the System calculates the appropriate charge for the "Loss Protection" service and adds the appropriate charge to each of the particular Carrier/Service's delivery rates 1193 before proceeding with the next Carrier/Service in the delivery rate set 1157.

In the exemplary embodiments of the invention described here, the System automatically and dynamically regenerates the display of the Graphic Array and certain portions of other screens when the Shipper makes online changes to Shipper input. To do this, the System generates executable code which it distributes with certain displayable frames to the Web Browser Client. This distribution of code for purposes of regenerating the Graphic Array differs from the initial generation of the Graphic Array as was described above. For example, in the embodiment of the invention depicted in FIGS. 46*a* through 46*c*, in the initial development of the Graphic Array, the System distributes the functions that initially generate the Graphic Array as follows: the Shipper entering shipping information 1150, displaying errors to the Shipper that insufficient shipping information has been provided and prompting the Shipper for additional information 1153, and displaying the Graphic Array 1160, are all processed by the Web Browser at the Client; all other functions and processes depicted in FIGS. 46*a* through 46*c* are performed by one or more of the System Servers 20*a*-21*z* as shown in FIG. 3.

Distribution to the Web Browser Client by the System of executable code that regenerates the Graphic Array provides the capability to dynamically reflect in the Graphic Array any changes that the Shipper may enter to the various Shipper Parcel Specifications; the Graphic Array immediately displays the new information without requiring the Shipper to request a recalculation, such as by clicking on a "Regenerate" button or the like.

To facilitate regeneration of the Graphic Array, the System generates executable code which it distributes with the frame, such as the frame that is displayed to the user for collecting the Parcel Specifications, to the Web Browser Client. A displayable frame is a set of information for display on the client display device. For example, in FIG. 42, in one embodiment of the invention, a first frame of the screen depicted in FIG. 42 comprises the Title "Rates & Times" 1109*a*, the instruction "Click on the price to select a delivery date, time and carrier." 1109*b*, the legend "Date you expect to ship your package:" 1109*c*, the input field for the Expected Shipping Date 1060, the legend "I'll ship the package from:" 1109*d* and the input field for the Shipping Location 1066; a second frame of the screen depicted in FIG. 42 comprises the Graphic Array.

As the System generates the display of each frame, the System generates executable code which it distributes with, e.g., the Rate & Times frame, to the Web Browser Client. Thereafter, the Web Browser Client uses the executable code to automatically regenerate the display of the Graphic Array each time the Shipper makes changes to the Shipper Parcel Specifications. In one embodiment of the dynamic regeneration aspect of the invention, the executable code distributed to the Web Browser Client uses JavaScript.

In some cases, the executable code sent to the Web Browser Client provides the information and the capability to regenerate the Graphic Array without any further communication with the Server. In other cases, the Web Client Browser must return control to the Server so that the Server can access data maintained by or accessible by the Server; the Server then regenerates the Graphic Array or otherwise provides the Web Browser Client with the information necessary to regenerate the Graphic Array.

In an exemplary embodiment of the automatic dynamic regeneration aspect of the invention, the executable code distributed to the Web Browser Client contains the logic to apply Carrier Rules to Shipper Parcel Specification changes. For instance, Shipper changes to certain Service Options, would be automatically processed by the Web Client Browser and the Web Client Browser would regenerate the Single Day Rate Graphic Array depicted therein to reflect the Shipper changes. In one such automatic dynamic regeneration embodiment, only those functions that do not require further access to the relevant Carrier's database are distributed to the Web Browser Client.

It should be noted that, according to the automatic dynamic regeneration aspect of the invention, if after the Shipper views the Graphic Array the Shipper enters changes to any of the factors with which the System calculates the rates and develops the Graphic Array, the System uses a similar logic flow to regenerate the Graphic Array as was explained above in relation to FIGS. 46a through 46c.

The dynamic regeneration capability is used to automatically regenerate response screens in many places throughout the System. For instance, if the Shipper changes Origin Zip Code 149 (FIG. 25) and/or Ship Location Type (as selected via 281, FIG. 25), the System will automatically regenerate a list of possible Drop Off Location choices.

e.) Creating a Link

Figure 47:
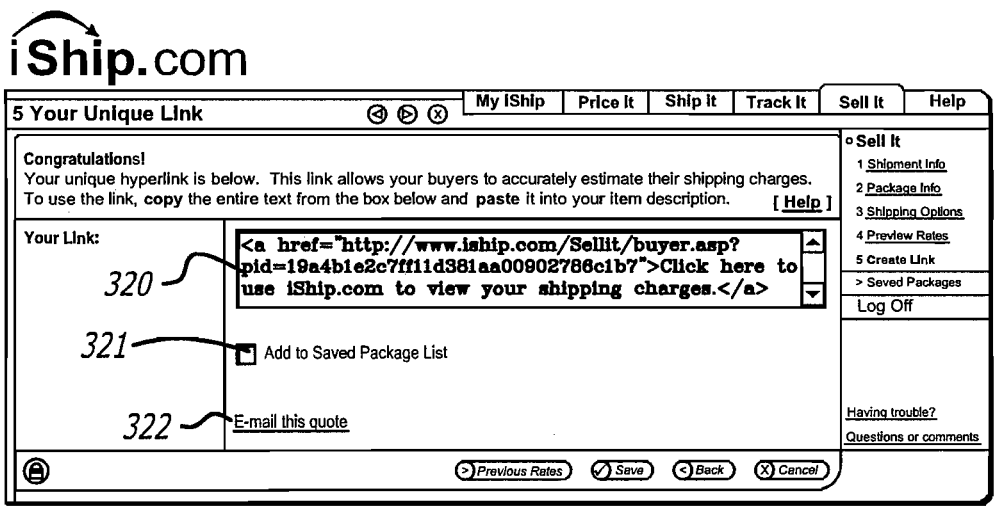
FIG. 47 is a graphic representation depicting an exemplary embodiment of the Create a Link Screen in an exemplary embodiment of the invention.

FIG. 47 depicts an exemplary embodiment of the Create a Link Screen in an exemplary embodiment of the invention. In the embodiment depicted in FIG. 47, the System collects the package specific information input by a User and then presents the screen as depicted in FIG. 23 to display the generated hyperlink 320. FIG. 50 depicts the text of an exemplary hypertext link such as is created by an exemplary embodiment of the "Create Link" feature in an exemplary embodiment of the invention.

In one embodiment, the System generates an HTML hyperlink by executing a JAVA script routine (in alternative embodiments, other scripts are used). The JAVA routine extracts the User-supplied package-specific information from the Create a Link HTML page (i.e., Weight, Irregular or Non-Standard Packaging, Loss Protection, Destination Zip code, Link Type and Link Text) and integrates the information with a URL (Universal Resource Locator) that points to the address at which a System web page exists, or a series of System web pages exist, that will display shipping cost comparisons for later use. In one embodiment, the URL information is hard coded in the web page. The hyperlink built by the System contains data as well as an address. In an alternative embodiment, the URL is dynamically generated.

In order to create the Link, the System places the appropriate HTML tags and text in a sequence that can be rendered by a web browser. An example of a hypertext link, like the one generated in FIG. 47, that the "Create Link" application creates is depicted in FIG. 50. Some of the text of the Link (a hyperlink) depicted in FIG. 50 is a template. However, several components are customized according to the Seller's and the specific item's information. For instance, the example hyperlink depicted in FIG. 50 contains a variable data item named "K" 2210-1 which is set equal to the account number 2210-2 ("A6V1XZ" in this case) of the User/Seller's account 2210. The example hyperlink depicted in FIG. 50 also contains a variable named "W" which is set equal to the weight in pounds of the package to be shipped (in this case "10") 2211; a variable named "V" set equal to the declared value for loss protection of the package (in this case "0") 2212; and a variable named "H" which is set equal to an indicator, which if set to "1", the package has irregular or non-standard packaging, if set to "0" (as in this case), the package is regular with standard packaging 2213.

After the System generates the HTML hyperlink, the User can e-mail the HTML hyperlink text 320 (FIG. 47) to someone by clicking on the e-mail this quote link 322 (FIG. 47).

When the person to whom the email is addressed (the "Recipient") receives the email with the HTML hyperlink text 320, the Recipient can click on the Link in the email and the Recipient's Web Browser will use the URL contained in the Link to locate the appropriate System Web page. The System will be presented with and receive as input the information in the hypertext link, including the variables and their respective contents as described above 2210-2213 in connection with FIG. 50.

With the input from the hypertext link 2210, the System accesses the System database 22 as depicted and retrieves the following types of information: 1) Package origin address; 2) Carriers and services that the Enterprise has authorized for use; 3) Custom and public carrier rates the Enterprise will use; 4) Additional handling charges that the Enterprise wants to impose; and 5) Payment methods the Enterprise will allow the Recipient to use.

Using the information as provided by the hyperlink User/Seller's Link and the information obtained as a result of the above-described database access, the System, at the address provided by the URL, is programmed to display the shipping estimate previewed by the User/Seller.

FIG. 51 is a graphic representation depicting an alternative embodiment of a hyperlink generated by the System in an exemplary embodiment of the invention. Instead of the hyperlink explicitly containing an Enterprise's account number 2210 and package specific information, e.g., 2211-2213, as depicted in FIG. 50, the hyperlink depicted in FIG. 51 provides a Package Identifier ("PID") 2220. A PID hides Enterprise account information and package specific information from the Recipient by replacing the explicit embedded information with a single string of facially meaningless characters. In an embodiment of the System that generates a PID for each Link, every time a User creates a URL with a PID, the System creates a new and unique PID. Without access to the System database, there is no information in a PID from which to determine a User's or Enterprise's information.

The System stores the PID 2220 in a PID table in the System database 22 and stores the Enterprise's account and package specific information, e.g., 2210-2213 with the PID.

In another embodiment, the details associated with the Enterprise's account, such as the Enterprise's various shipping preferences, are stored in detail with the PID 2220. Storing detailed information with a PID 2220 provides for additional flexibility in that new Enterprise information can be associated with the new PID while not influencing a previously generated PID and its associated set of information.

Once generated, the hyperlink 320 can be copied and pasted by the Desktop User into another system, such as into a catalog of item descriptions. For example, as depicted in FIG. 47, the hyperlink can be saved in a Saved Packages List 321. Adding a package to a Saved Packages List provides the User with information with which to populate information about packages with identical parameters sent repetitively to the same customer. In one embodiment, the Saved Packages List is accessible through the Address Book entry for the relevant customer/address book entry.

Figure 48:
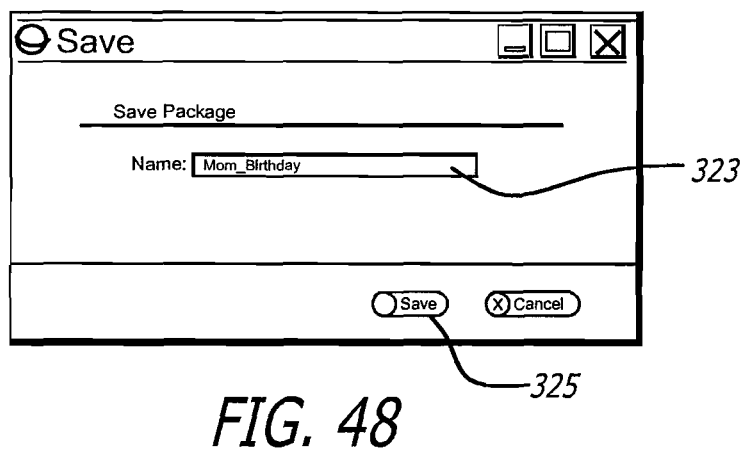
FIG. 48 is a graphic representation depicting an exemplary embodiment of the Name a Save Package Screen in an exemplary embodiment of the invention.
Figure 49:
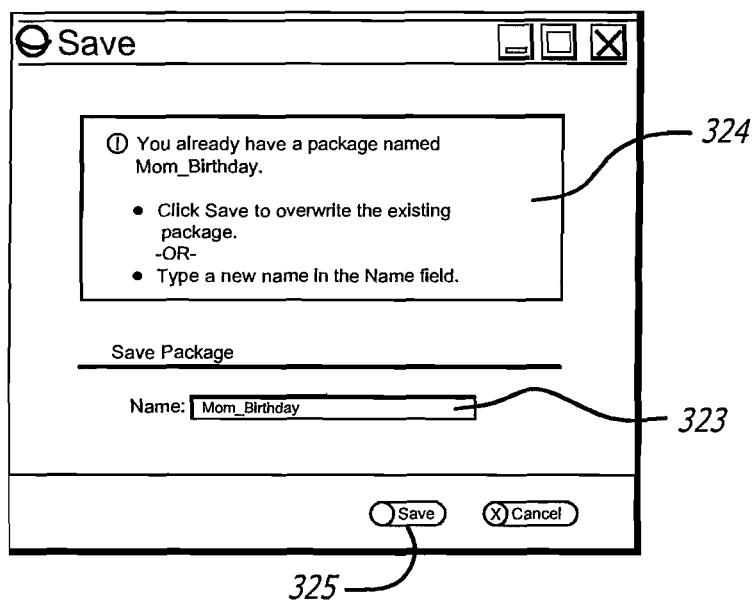
FIG. 49 is a graphic representation depicting an exemplary embodiment of the Name a Save Package Error Screen in an exemplary embodiment of the invention.

In one embodiment of the invention, the User can name a saved package. FIG. 48 is a graphic representation depicting an exemplary embodiment of the Name a Save Package Screen in an exemplary embodiment of the invention. When the User clicks the Add to Saved Packages List button 321 (FIG. 47), the System displays a pop-up Name a Save Package Screen such as the one depicted in FIG. 48. The User inputs the Package Name 323 and clicks the Save button 325. If the Name of the Package has previously been saved in the System, the System displays an error message 324 in a Name a Save Package Error Screen such as the one depicted in FIG. 49. FIG. 49 is a graphic representation depicting an exemplary embodiment of the Name a Save Package Error Screen in an exemplary embodiment of the invention. The User will then be able to select items from a Saved Packages List which will pre-populate all fields with the data specified by the User to populate the selected Saved Package.

9. Payment Methods.

The System provides the User with choices of payment methods for paying for the shipping transaction. Payment methods include, for example:

Bill Sender ("Bill Department")
Bill Recipient
Bill 3rd Party
Bill Credit Card (Yellow Freight only)

The System Enterprise Desktop Client captures supplementary billing information supported by the carriers, on both a package- and shipment-level basis, such as:

Shipper's Reference 1
Shipper's Reference 2

The user interface, subject to shipping rules set by the Administrator, assist the user with completing payment methods, where possible, such as, for example, in the following ways:

For the Bill Sender option, the appropriate account number for the user is automatically assigned by the System.

For the Bill Recipient option, the account number is auto-filled by the System from address book if available.

The User Interface collects addresses if required for the payment method. Some Enterprises may set privileges allowing Users to ship personal packages on corporate rates, and get reimbursed via credit card.

Communications between the User's browser and the System are encrypted to protect carrier account numbers and credit card numbers.

10. Service Availability.

The System provides each Enterprise with access to the full spectrum of carriers and services supported by the System.

Certain service types drive additional user interface requirements, such as freight requiring different dialogs to complete the shipping transaction.

The Administrative Client provides a clean way for customers to expose new carriers and services as they become available. New carriers and services default to "off" (not displayed) until turned on by the Administrator.

11. Label Printing.

Label printing type is configurable as a shipping rule by the Administrator. The Administrator can delegate shipping label printing authority by type of package and by other criteria. For example, the administrator can enable User printing of:

Actual carrier shipping labels for letters
Traveler label for packages

Users, subject to the Shipping rules imposed by the administrator, can laser print carrier shipping labels after consummating a shipping transaction for all carriers with whom the User has label printing permission. For shipping circumstances in which a User is not allowed to print an actual shipping label, Users can print "traveler" labels, which help identify pre-processed packages for mailroom personnel to complete.

The administrator can define the traveler label format to be used. The traveler label includes a bar code that, when scanned, enables quick retrieval of the shipment record from the System by mailroom personnel using the Ship Station client.

Both shipping labels and traveler labels include user instructions on what to do with the package once the label has been printed.

Shipping Stations must be equipped and configured with a bar code scanner to read traveler label bar codes in order to enable the quickest retrieval of shipment data from the System.

a.) Generating a System Tracking Number

Figure 52:
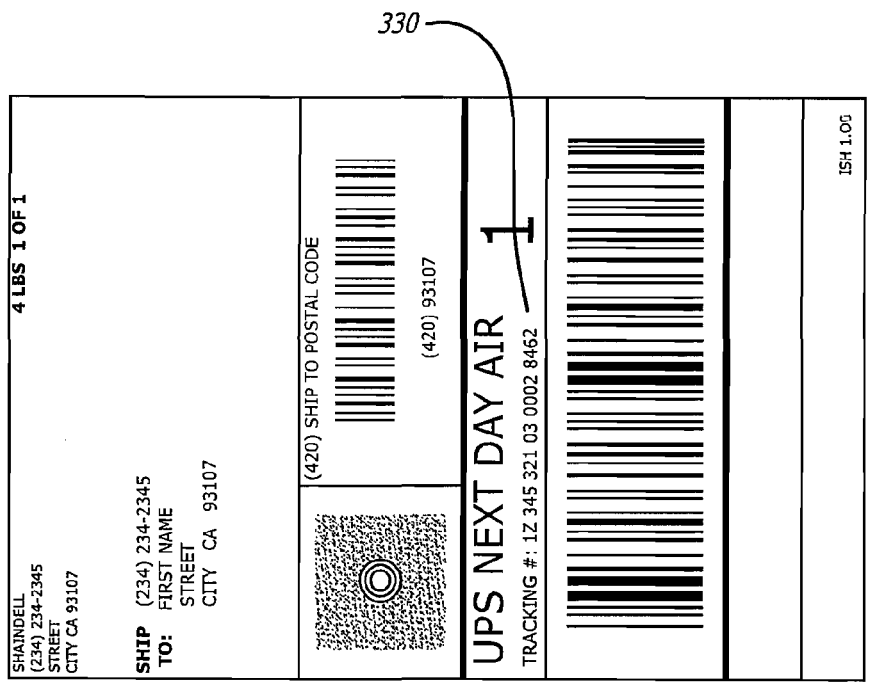
FIG. 52 is a graphic representation of an exemplary Shipping Label Display Screen in an exemplary embodiment of the invention.

If the User creates a Shipping Label such as is depicted in FIG. 52, the System prepares a Carrier shipping tracking number 330 and an internal System tracking number for the item package.

A System tracking number is a unique number generated internally by the System to identify a particular package shipped using the System. The Shipper inputs the Shipper's Parcel Specifications for the Subject Parcel. Using each Shipper's Parcel Specifications, the System is programmed to access databases containing information about each supported Carrier. Each supported Carrier has a unique rating schedule, delivery and pickup rules and schedules, and certification requirements (the "Carrier Rules"). The System is further programmed to apply each supported Carrier's Rules to each Shipper's Parcel Specifications for the corresponding Subject Parcel.

As a result of the Consumer creating a shipping label, the System assigns the package a System package tracking number and adds a record containing all of the pertinent information about the package to the System database 22. Following are exemplary Shipping tracking numbers: MAGGY841VRY50; MAGGY84B496RF; MAGGY84X0FJ45.

In one embodiment, the System Tracking Number is based on a Base-33 number system. The characters available are: Zero (0) through nine (9) and A through Z excluding "I" (i), "L" (1), and "O" (o). Each letter represents a value, as depicted in the table below:

A = 10
B = 11
C = 12
D = 13
E = 14
F = 15
G = 16
H = 17
J = 18
K = 19
M = 20
N = 21
P = 22
Q = 23
R = 24
S = 25
T = 26
U = 27
V = 28
W = 29
X = 30
Y = 31
Z = 32

Each System Tracking Number is 13 alphanumeric characters. Position 1 is the letter 'M'. Positions 2-7 are a System Account number. Positions 8-12 are a five-digit ID. Position 13 is a Check Digit.

To calculate the Check Digit, the System performs the following steps: 1) Consecutively multiply the numeric value of each of positions 2-7; 2) Consecutively multiply the numeric value of each of positions 8-12; 3) Add both results; 4) Divide by 31; 5) Convert the remainder value to a Base-33 number. The converted value is the Check Digit.

b.) Printing a Shipping Label

As mentioned above, in some embodiments, the Shipper can use the System to locally print on the Shipper's printer device a bar-coded shipping label according the Selected Carrier's certification standards. In some embodiments, the bar-coded shipping label, including two dimensional bar code labels, and other types of shipping labels, can be printed on either a thermal label printer or on a laser printer. The Shipper specifies the type of printer to the system during initial setup procedures. Thereafter, the System uses, as appropriate, the thermal printer or laser printer module to prepare the label image for printing on the Shipper's printer.

Figure 53:
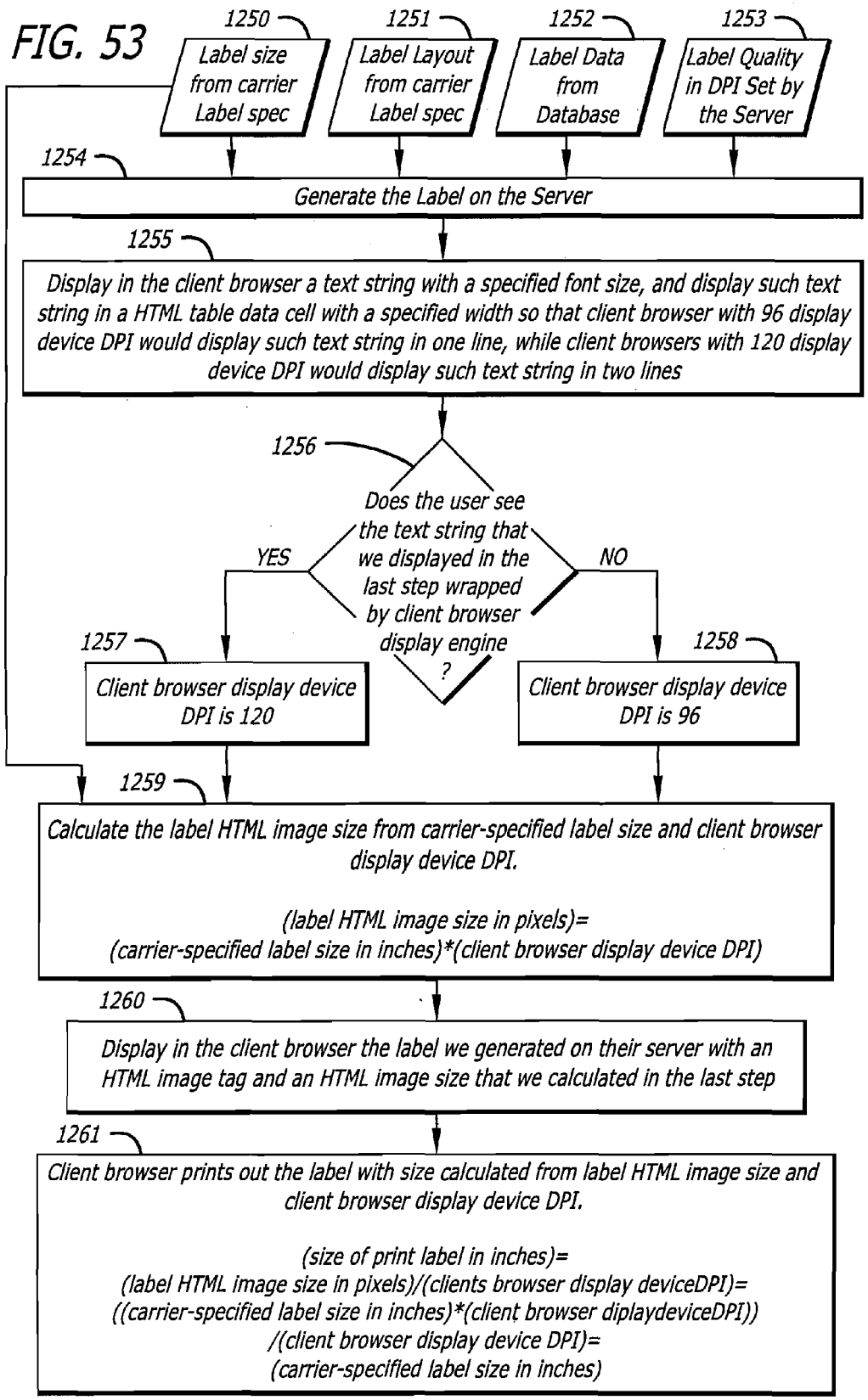
FIG. 53 is a high level flow diagram depicting an exemplary embodiment of Label Printing in an exemplary embodiment of the System in an Internet environment.

FIG. 53 depicts a flow diagram of one exemplary embodiment of the aspect of the invention that provides printing of bar-coded shipping labels on printer devices which are compatible with the User's client system on which a web browser is running, such as an HP-compatible laser printer. As depicted in FIG. 53, one of the System Servers, for instance, the Shipping Server, e.g. 21s in FIG. 3, gets the Label Size from the Carrier Label Specification 1250, the Label Layout from the Carrier Label Specification 1251, Label Data from the Shipper Database 1252, and the Label Quality in Dots Per Inch ("DPI") as set by the Server 1253, and uses this information to Generate the Label 1254.

The Server then creates, and causes the display on the client browser's display device of, a text string with a specified font face and in a specified font size in an HTML table data cell with a specified width 1255. If the client browser is using a ninety-six (96) display device DPI, the display device will display said text string in the HTML table data cell in a single line. If on the other hand, the client browser is using a one hundred twenty (120) display device DPI, the display device will display said text string in the HTML table data cell in two lines.

In creating the display of the text string, the Server also sends a message to the Shipper asking the Shipper to answer the following question: do you see the text string displayed on your screen as a single line or as wrapped text in multiple lines? The Server receives the Shipper's response and determines from the response whether the Shipper's display device has displayed the text as a single line or as wrapped text in multiple lines 1256. If the text is displayed as a single line, then the client browser 1257 display device DPI is 120. Otherwise, the client browser 258 display device DPI is 96.

Next, the Server calculates the shipping label HTML image size in pixels 1259 by multiplying the Carrier-specified label size from the Carrier Label Specification times the client browser display device DPI as determined by the previous step.

Next, the System displays the generated label image in the client browser 1260 with an HTML image tag and an HTML image size in pixels as calculated in the prior step. The client browser calculates the size of the label to be printed in inches by dividing the label HTML image size in pixels as calculated in a prior step by the client browser display device DPI 1261; the client browser then prints out the label with the size calculated 1261.

Figure 54:
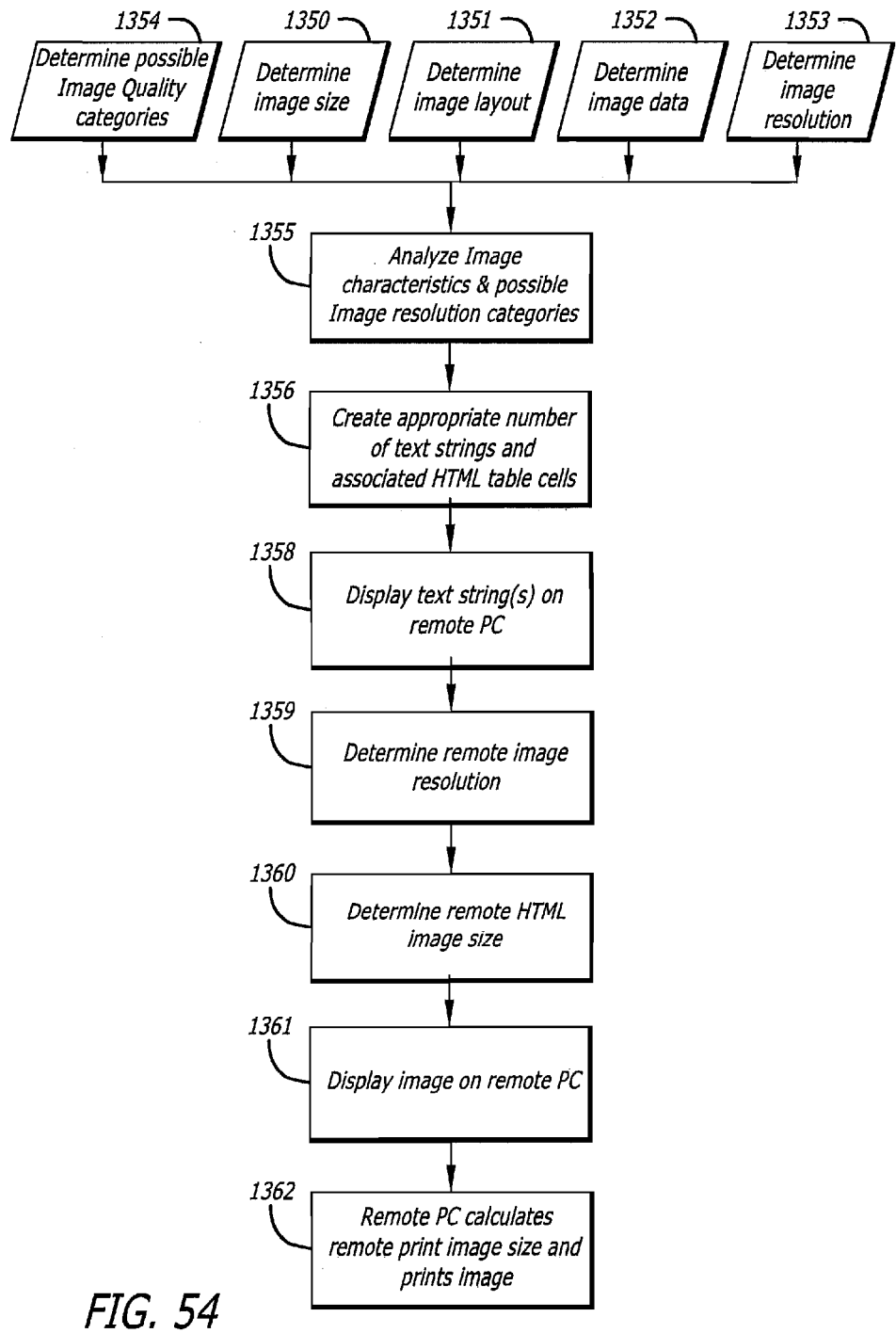
FIG. 54 is a high level flow diagram depicting an exemplary embodiment of Image Printing in an exemplary embodiment of the System in an Internet environment.

FIG. 54 depicts a flow diagram of an exemplary embodiment of the aspect of the invention that provides printing of dimensionally accurate images, such as dimensionally sensitive symbologies including two-dimensional bar codes and other two-dimensional machine-readable symbologies. This aspect of the invention provides the printing of such dimensionally accurate images on various types of printer devices including among others HP-compatible laser printers. The printer devices can be configured with remote computers, such as PC's, that will receive signals to print the dimensionally accurate image over a communications network such as the Internet. Each PC having a client browser or executing like software, and each PC being configured with a pre-established Image Resolution that applies to the display device and the printer device configured with the PC.

As depicted in FIG. 54, the System determines the Image Size 1350, the Image Layout 1351, any relevant Image Data 1352, and the Image Resolution in Dots Per Inch ("DPI") or in any other measure of Image Resolution 1353. The System uses this information to generate the Image 1354.

Alternatively, the Image has previously been created; the System determines from the Image, the Image Size 1350, the Image Layout 1351, any relevant Image Data 1352, and the Image Resolution in DPI or in any other measure of Image Resolution 1353 (collectively referred to hereinafter as the "Image Characteristics").

The System determines the possible Image Resolution Categories and associated values of client PC's 1354. Image Resolution Categories and associated values include information such as the number of text strings, and the length of and characteristics (font face, font size, and HTML table cell width) of each of the identified number of, text strings that must be used to determine the Image Resolution of client display devices 1356.

An HTML table cell width is fixed in that the physical width of the display of the HTML table cell does not change depending upon the resolution of the client device; a text string comprised of characters having a particular font and font size has a scalable width, depending upon the resolution of the client device resolution. Use of an HTML table cell to measure the resolution of client devices is not a limitation of the invention. In an alternative embodiment, a graphic element other than an HTML table cell, having a fixed width, is used to measure the resolution of client devices.

The possible Image Resolution Categories and values are stored in the memory of the System or in a database table and updated on some basis. In an alternative embodiment, the possible Image Resolution Categories and values are input into the System.

The System then analyzes the Image Characteristics, and the possible Image Resolution categories and/or values 1355, and creates the appropriate number of text strings and associated HTML table cells 1356. Each text string is created to have a specified font face, a specified font size, and an associated HTML table cell with a specified width. The computer then causes the display of the text strings in the associated HTML table cells on the remote client PC's display device 1358.

In creating the display of the text string, the System also sends a message to the recipient PC asking the user to answer the following question: is the first text string displayed on your screen as a single line or as wrapped text in multiple lines? The System receives the remote user's response and determines from the response whether the remote user's PC's display device has displayed each of the text strings as a single line or as wrapped text in multiple lines (e.g., 1256-1258, FIG. 53). The System then sets the PC's Remote Image Resolution for printing the Image 1359 according to the results of the user's PC's display of the text strings. Next, the System calculates the Remote HTML Image Size in pixels 1360 by multiplying the Image Size times the PC's Remote Image Resolution as determined by the previous step. Next, the System displays the generated image on the display device of the remote PC 1361 with an HTML image tag and the Remote HTML Image Size in pixels as calculated in the prior step.

The client browser of the remote PC calculates the size of the Image to be printed ("Remote Print Image Size") in inches by dividing the Remote HTML Image Size in pixels by the Remote Image Resolution 1362; the client browser then prints out the Image with the Remote Print Image Size 1362.

In one embodiment of the invention, instead of printing a shipping label at the Shipper's printer, a Package Number is displayed online on a Package Number Screen with notification that the label will be printed at a shipping location previously designated by the Shipper.

c.) Printing a Traveler Label

In one exemplary embodiment of the invention, the Desktop User is either not authorized by the Administrator to print Shipping Labels, or is limited by the Administrator to printing Shipping Labels for only certain types of packages, e.g., Letters. In such an embodiment, the Administrator enables a Shipping Station for the Desktop User. In some cases, a particular Desktop User may decide to not finalize shipping and delegate the actual shipping to some other user within the Enterprise. For example, if the Desktop User is not certain of the weight of a package, the Desktop User, even if that user has shipping label printing privileges, may decide to print a traveler label, attach the traveler label to the package, and forward the package to a Shipping Station User to complete shipping.

Figure 55:
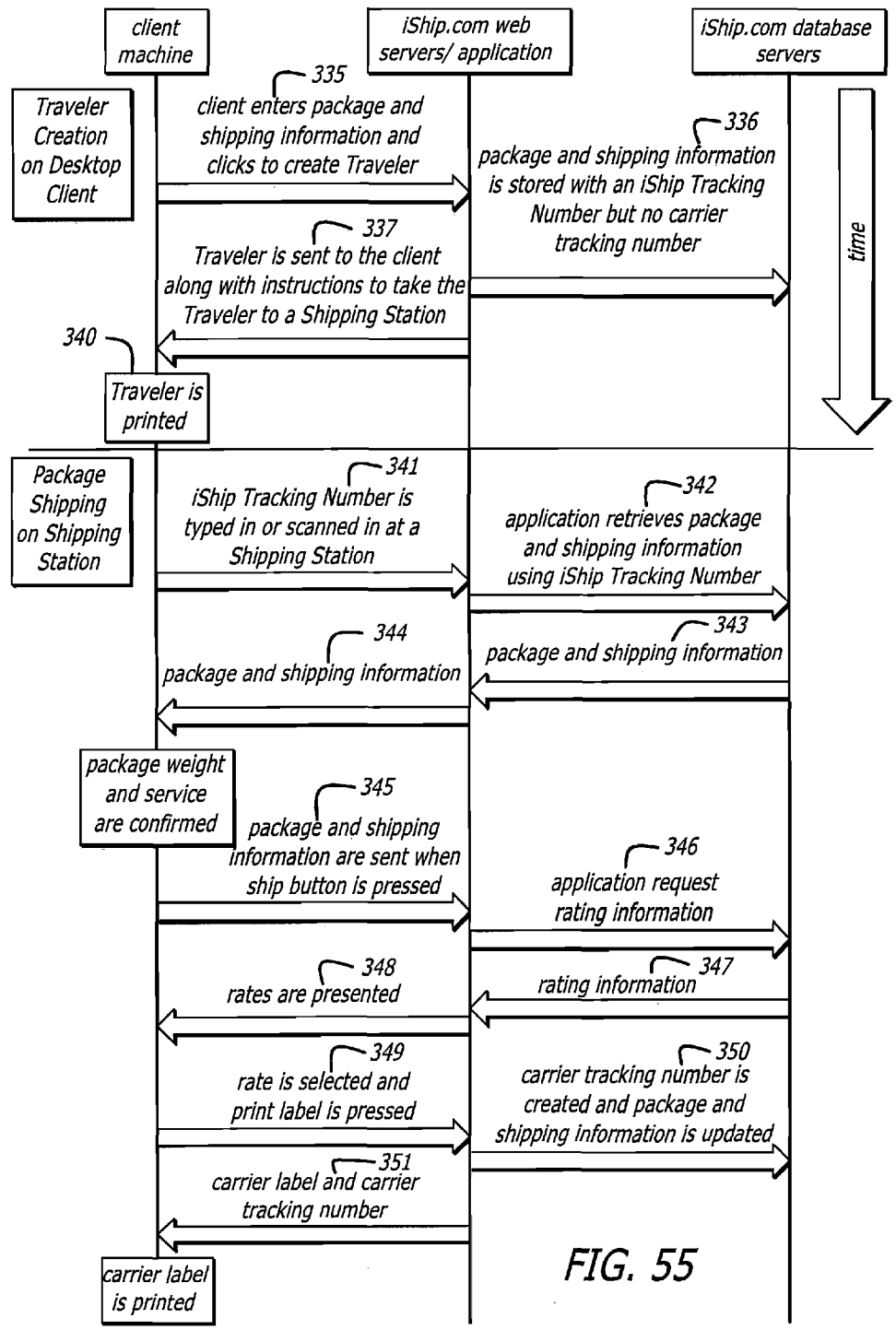
FIG. 55 is a high level System interactivity data and logic flow diagram depicting an exemplary embodiment of the process by which the System completes the information necessary to ship a package in an exemplary embodiment of the System using traveler labels delivered to a Shipping Station.

FIG. 55 is a high level System interactivity data and logic flow diagram depicting an exemplary embodiment of the process by which the System completes the information necessary to ship a package in an exemplary embodiment of the System using traveler labels delivered to a Shipping Station. The User enters package and shipping information 335 which is stored in the System databases 336. The User requests printing of a traveler label, which the System prints on a printer local to the User 340. The User delivers the package together with the traveler label to the Shipping Station. The Shipping Station then scans in the Traveler Label 341 in order to retrieve the package and shipping information from the System's databases 342-344 to populate the shipping information necessary to rate the shipment and finalize the shipping process and complete a shipping label 345-351. This application is used, for example, where Desktop Users have no way of weighing each package.

FIG. 56 is a graphic representation depicting an exemplary Traveler Label in an exemplary embodiment of the invention. As depicted in FIG. 56, a Traveler Label reports Shipping Addresses 363, Package Information Details 364, and an instruction to take the package to the appropriate shipping counter 361. Further, the Traveler Label provides a System Tracking Number 362 and a bar code label 360. When the User delivers the package together with the traveler label as depicted in FIG. 56 to the appropriate Shipping Station, personnel at the Shipping Station scans the bar code 360 in the Traveler Label in order to retrieve the package and shipping information, e.g. 363 and 364, from the System's databases. As was described above in relation to 345-351 depicted in FIG. 55, the System uses the retrieved package and shipping information, e.g., 363 and 364, to populate the shipping information necessary to rate the shipment and finalize the shipping process and complete a shipping label.

Figures 57, 58:
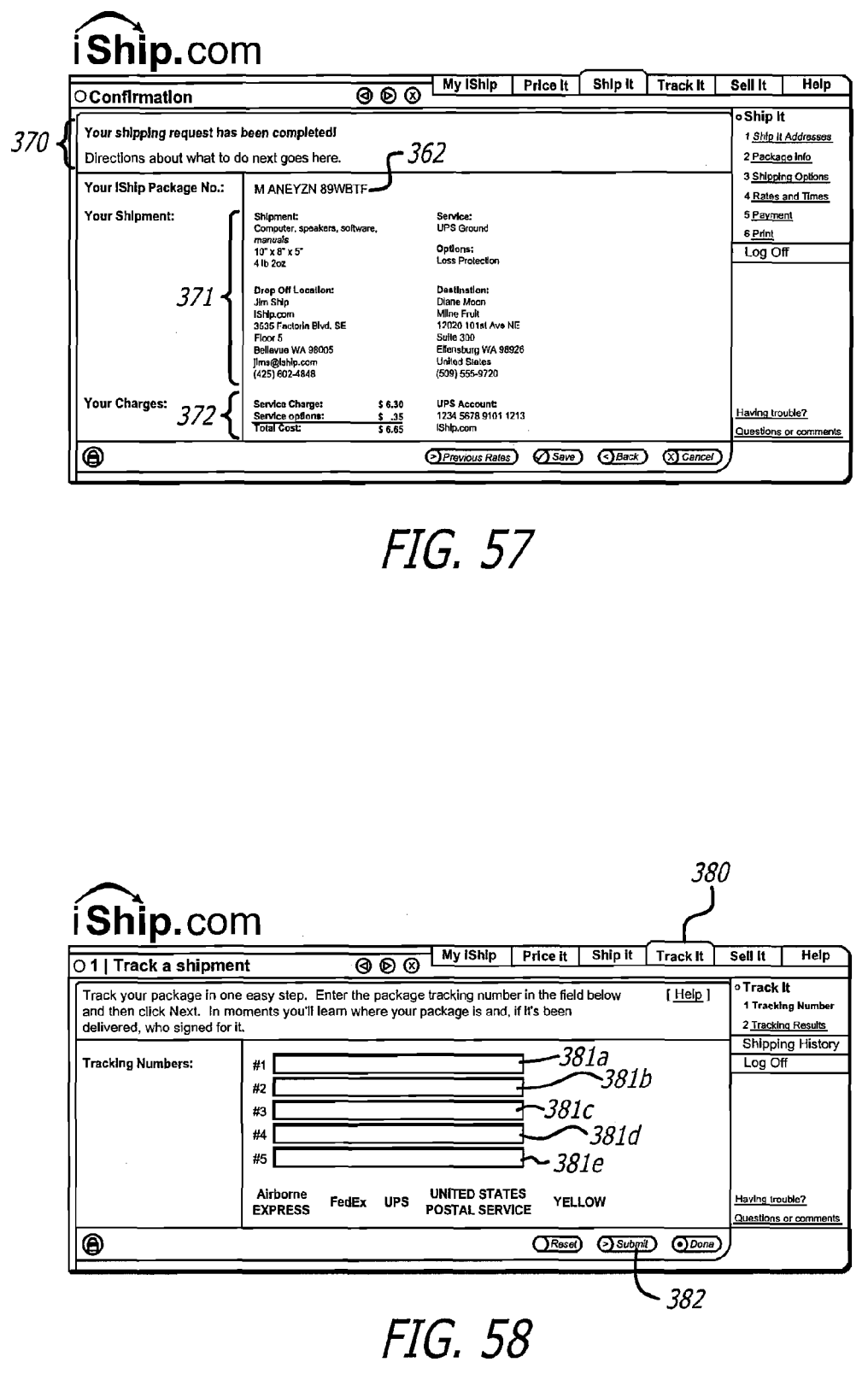

FIG. 57 is a graphic representation depicting an exemplary Shipping Request Confirmation Screen in an exemplary embodiment of the invention. As depicted in FIG. 57, the Shipping Request Confirmation Screen displays a message indicating a successful shipping request and providing directions for next steps 370. The Shipping Request Confirmation Screen further displays Shipping information details, e.g., 371 and a summary of shipping charges and service options, e.g., 372. In one embodiment, the Shipping Confirmation Screen provides Request Carrier Pickup and Cancel Carrier Pickup onscreen buttons with which the user can electronically request or cancel Carrier pickup of the package being shipped.

12. Special Shipment Processing.

The System Enterprise Desktop Client provides Users with various "special shipment processing" options including, for example:

- Multi-part shipments (defined shipments only)
- Identical shipment to multiple recipients ("copy package data" will be sufficient)
- Future (post-dated) shipments
- Pending shipments (shipments saved "in-process" before label printing)
- Pre-processed shipments ("traveler" label printed, but not carrier label)
- Batch label printing
- Identical shipment to distribution list (with skip recipient)
- Different shipments to distribution list (with skip recipient)
- Batch label printing for multi-part shipments
- Batch label printing for individual pending shipments
- Cancel shipment (delete pending shipment or cancel shipment with printed label)

The special shipment processing options described above drive several user interface features, such as the ability to enter the number of packages in a shipment, enter the effective shipping date for shipment, etc.

In one embodiment, as an alternative to batch label printing capabilities, the System provides methods of easing multiple label printing, such as a "next label" button on the label printing window.

In one embodiment of the invention, use of the Cancel shipment function causes the System to generate a User notification as to whether or not the enterprise will be billed. The System provides the Administrator with the capability to define what shipment types will have full label printing capabilities vs. traveler label capabilities. The Shipping Station will complete processing of special shipment types, such as multi-piece shipments, pre-processed by the Enterprise Desktop Client.

13. Shipping Rules.

The System Enterprise Desktop Client unobtrusively applies shipping rules to user shipping activities. A list of exemplary shipping rules follows:

- Enterprise site can dictate
  - Availability of carriers in rate grid
  - Availability of carrier services in rate grid
  - Carrier rates used in rate grid
  - Availability of carrier pick-up option
- Destination-based shipping rules (such as defined carrier for particular lane) are deferred
- An Administrator can set a particular Group's privileges to dictate:
  - Availability of carriers in rate grid
  - Availability of carrier services in rate grid
  - Carrier rates used in rate grid
  - Availability of service option fields (i.e. insurance, Saturday delivery, etc.)
  - Availability of carrier pick-up option—Deferred until availability of carrier pick-up
  - Availability of payment options
- Type of shipment can dictate type of label printed, for example:
  - if the package to be shipped is a Letter: the User is authorized to print a Carrier label
  - if the package to be shipped is a Box: the User is authorized to print a Traveler label
- Carrier services can be turned on/off by carrier, such as:
  - Premium delivery options (i.e. FedEx First Overnight)
  - Insurance
  - COD
  - Saturday delivery The list of shipping rules described above is illustrative and not a limitation of the invention.

Shipping rules do not drive any visible User Interface changes to the User. However, shipping rules effect how the User Interface is generated behind the scenes, so that shipping rules are transparently applied to the User during the shipping transaction. Screens and behaviors may vary as between Users based on the privileges of each user.

Shipping rules are applied to each User based on their authenticated identity and based on the privileges assigned to the group to which they belong or to the individual User.

14. Notifications.

The System Enterprise Desktop Client initiates notifications to the parties participating in each shipping transaction, including, for example:

- Notify recipient (plus up to two others) of shipment initiation, with tracking number and link to Track It. The sender shall be able to add text to a notification.
- Notify sender (plus up to two others) of delivery (Shipment confirmation.) The Administrator shall be able to define the template e-mail for this message.
- Notify sender and recipient (plus up to two others) of carrier shipment pick-up. The Administrator shall be able to define the template e-mail for this message. (In one embodiment, the performance of EOD (End-of-Day processing) triggers "notify recipient" e-mails assuming that EOD for all carriers is performed after the carrier actually picks up the package, thereby eliminating the need for this third notification type.)

The System generates e-mails with summary information about the event, and with links to the System for detailed event information. Web links embedded in e-mail notifications take users to publicly accessible areas of the System.

The System provides Administrators with the capability to broadcast e-mail notifications to their userbase and to provide status messages to their users via the Enterprise Desktop Client main page. The Administrative client allows the administrator to define simple e-mail templates for the notification messages. The Administrative Client also allows the administrator to define the "from" return e-mail address for e-mails generated by the System.

15. End of Day Processing

The System will allow end Users with the proper privileges to perform the end-of-day functions for their site via the System Enterprise Desktop Client. The End of Day capability, if available for a User given their privileges, appear as a separate functional area of the Enterprise Desktop Client Links to this area appear on both the Enterprise Desktop Client main page and in the shipping log if the User has sufficient privileges and still needs to perform end of day processing. Not all carriers require an explicit EOD.

Depending on the Enterprise, End-Of-Day Processing via the Desktop will likely be run for small offices and branch offices that do not have a mailroom or shipping dock, staffed by personnel who can regularly perform EOD. Depending on the Enterprise, Shipping Station personnel will typically perform EOD processing in larger enterprises.

The System provides the Administrator to allow End-Of-Day Processing to be accessible by a User if the User's group has privileges to perform that function. The Administrator can configure the users (actually which group) can perform the End-Of-Day Processing function.

16. Shipping Log.

The System provides a shipping log. The shipping log is the central point of information for a User's past, current and future shipping history. It is also the central location for Users to obtain tracking information for both inbound and outbound shipments. It provides facilities to view and manage the User's historical and ongoing shipping activities, as well as to obtain shipment tracking information. The shipping log provides various types of information, including, for example:

- Provide summary tracking information
- Display shipment status (delivered, in-transit, label printed, pending, future)
- Display shipment type: inbound/outbound
- Edit shipments for pending shipments or shipments with labels (either carrier or traveler) printed but not manifested
- Repeat shipment to speed processing of commonly performed shipments
- Delete shipments for pending shipments, shipments with labels printed (cancel shipment), or historical shipments (actually, hide shipment)
- Search shipping history (by recipient, by carrier, by service type, by date, by status)
- Sort shipping history (by recipient, by carrier, by service type, by date, by status)
- The user can control the page size of the shipping log, up to a maximum of 100.
- The User Interface uses tabs in order to display different shipment statuses (i.e. pending or historical) and to improve database performance.

Higher-level shipping history and reporting is available to the Enterprise through the Administrative Client.

The shipping log displayable to individual Users is for their personal shipping history. Individual Users without the proper privileges do not have access to aggregate-level shipping history. Higher-level shipping history can be limited by the administrator to be accessible via the Administrator Client.

A Shipping Station can display status for shipments that have a traveler label printed but no carrier label and which are related to that Shipping Station.

17. Inbound Package Tracking.

The System provides the capability to track inbound packages sent by other System users. In an Internet embodiment of the invention, this is the case whether the Shipping System User is a non-Enterprise Recipient or is an Enterprise User in the same or different Enterprise as the Receiving System User. Shipping requests submitted to the System provide, among other things, the Recipient's e-mail address. The System recognizes the Recipient as a System User by checking the e-mail address of every Recipient. If the Recipient is a System User, the System adds the Shipping Request to the Recipient's Inbound Tracking Log and notifies the Recipient the next time the Recipient logs on to the System.

The System provides Users with the capability to view the status of inbound packages separately from outbound packages. Inbound packages sent by other System Users should appear in the shipping log automatically.

18. Other Tracking Capabilities

The shipping log user interface enables tracking reporting, including, for example:

Outbound packages:
- Shipped packages automatically move to the log for tracking
- A separate tracking window is available for entering tracking numbers generated outside of the system
- View high-level tracking status (default), or
- View detailed tracking status.

The System provides complete tracking and reporting capabilities for packages shipped through it, and for packages for which a Carrier tracking number is known as described below.

FIG. 58 is a graphic representation of an exemplary Track It application 380 Track a Shipment Screen in an exemplary embodiment of the invention. As depicted in FIG. 58, the User enters one or more Tracking Numbers in the Tracking Number fields, e.g., 381*a*-381*e* and clicks the Submit button 382 to track one or more packages.

In one embodiment, the Track It application navigation bar provides Track a Package, Track All Packages, Track Pending Packages, Track Shipped Packages, Track Inbound Packages and Perform End of Day options. If the User has the authority to ship packages on behalf of another user, the Track It Navigation Bar also provides a View History option with which the User can specify the Shipped For User's ID in which case the Track All Packages, Track Pending Packages, Track Shipped Packages, and Track Inbound Packages options will display packages shipped for the specified User.

Figures 59, 60:
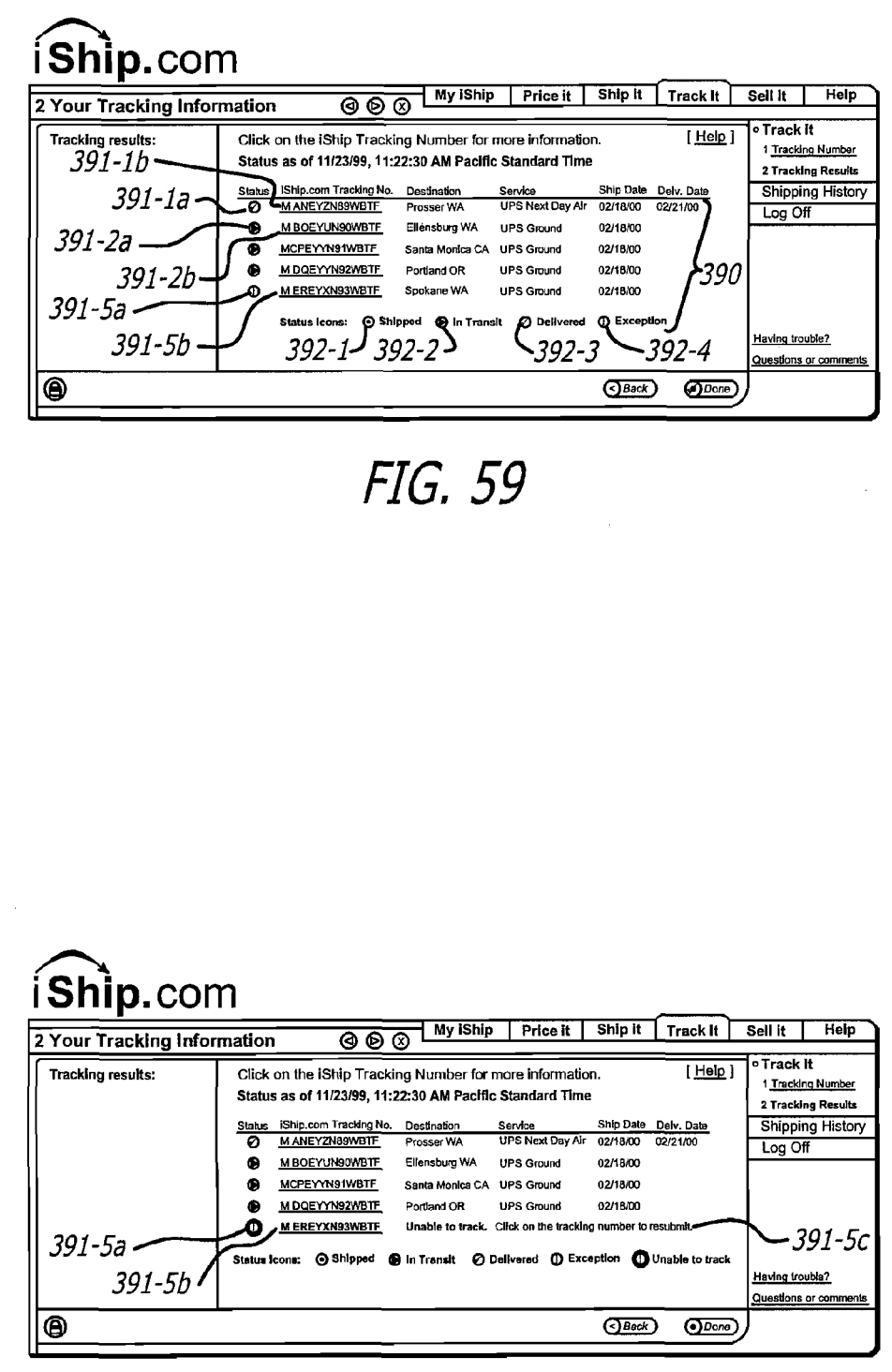

FIG. 59 is a graphic representation of an exemplary Tracking Results Screen in an exemplary embodiment of the invention. The Tracking Results Screen depicts summary report entries for multiple packages 390. Each summary report entry reports, among other things, a status logo, e.g., 391-1*a*, 391-2*a*, depicting the status of the reported item, and the System Tracking Number for the item, e.g., 391-1*b*, 391-2*b*. Status logos are used to indicate, e.g., Shipped 392-1, In Transit 392-2, Delivered 392-3, and Exception 392-4. FIG. 60 depicts a package reporting an exception status 391-5*a* through 391-5*c*.

Figure 61:
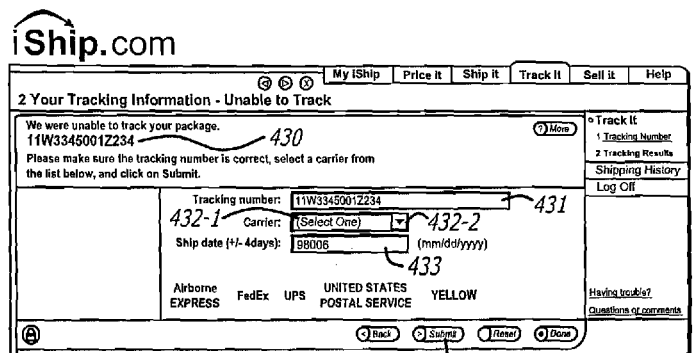
FIG. 61 is a graphic representation of an exemplary Unable to Track Screen in an exemplary embodiment of the invention.

FIG. 61 is a graphic representation of an exemplary Unable to Track Screen in an exemplary embodiment of the invention. As depicted in FIG. 61, a tracking number entered by the User for tracking that is not recognized by the System or any of the Carriers is reported. The System reports the User input tracking number 430, provides the User with a Tracking Number window 431, asks the User to specify the Carrier 432-1 using a Carrier drop down menu button 432-2 and to specify the ship date 433. The User clicks the Submit button 434 to submit the tracking request.

Figure 62:
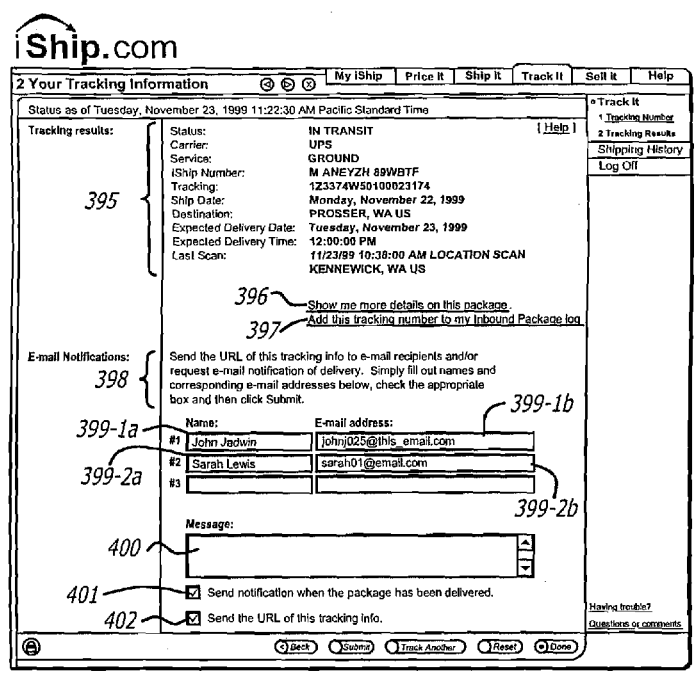
FIG. 62 is a graphic representation depicting an exemplary Tracking Information Screen in an exemplary embodiment of the invention.

FIG. 62 is a graphic representation depicting an exemplary Tracking Information Screen in an exemplary embodiment of the invention. As depicted in FIG. 62, the Tracking Information Screen displays detailed information about the shipment status 395. The Tracking Information Screen provides a link with which the User can request further details about the package 396. The Tracking Information Screen also provides a link 397 allows the User to add the Tracking Number to the User's Inbound Tracking Log. The Tracking Information Screen depicted in FIG. 62 further provides the User with instructions 398 for sending the URL of the tracking information to various e-mail recipients, e.g., 399-1*a*-399-1*b*, and 399-2*a*-399-2*b*, with a message 400. The User can choose to send the URL of the tracking information 402 and/or to send notification when the package is delivered 401. In one embodiment, the Tracking Information Screen provides a Repeat Shipment button. Clicking the Repeat Shipment button will take the User to a Ship It screen and cause the system to pre-populate the shipment and package data fields with the information from the previously shipped package.

Figure 63:
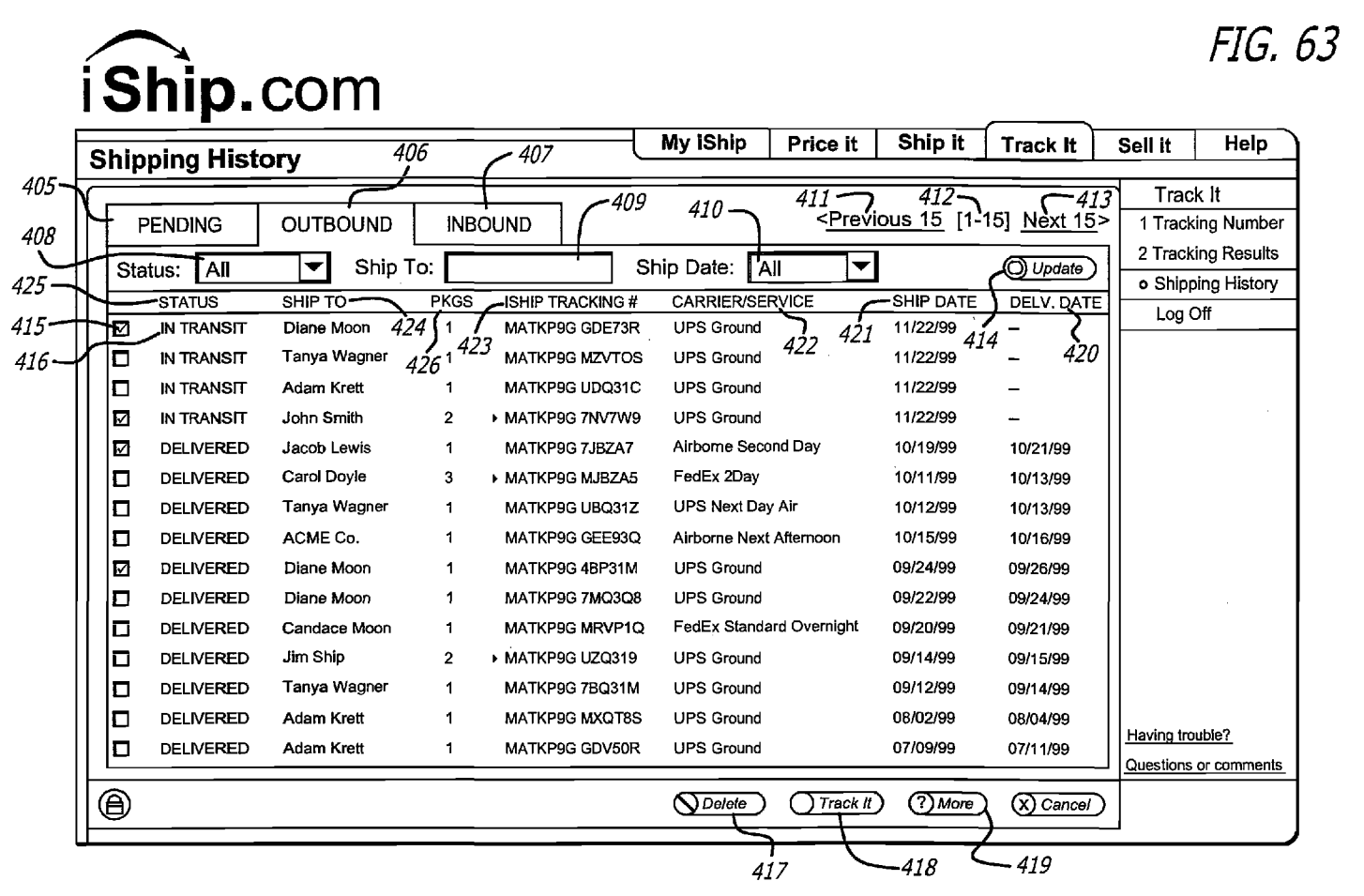

FIG. 63 is a graphic representation of an exemplary Shipping History Screen in an exemplary embodiment of the invention. In the exemplary Shipping History Screen depicted in FIG. 63, the System provides the User with Track It Navigation options to view Pending 405, Outbound 406 or Inbound 407 packages. The User can specify the Status 408, and/or Ship To Name 409, or Ship Date 410. Clicking the Update button 414 will cause the System to display the History Summary report entries that meet the User's specified reporting criteria.

Each history entry report Status 425, Ship To Name 424, number of packages 426, System Tracking Number 423, Carrier/Service 422, Ship Date 421, and Delivery Date 420. The User can click on any of Status 425, Ship To Name 424, System Tracking Number 423, Carrier/Service 422, Ship Date 421, or Delivery Date 420 to sort the contents of the screen display according to the option clicked.

Each Shipping History entry, e.g., 416, provides an associated tracking checkbox, e.g., 415. To get detailed tracking information for one or more items reported, the User clicks the tracking checkbox for each of the items to be tracked and then clicks the Track It button 418. The User can view the Previous items 411, the currently displayed items 412, or the next items 413 in the Shipping History List.

Users may perform "batch tracking," i.e. select more than one shipment and track on those shipments. This will improve system performance when the user has up to 100 "trackable" shipments in their log. Users will also be able to track "all."

Referring to FIG. 3, when a Shipper/User ships a package using the System, one or more of the System's Servers, e.g., 21*s*-21*z* create a new System tracking number. When a new System tracking number is created, one of the System's Database Servers, e.g., 20*a*-20*n*, adds a new package record with the newly created System tracking number to a Package Table 28.

The Package Table 28 resides in the System database 22 and contains package records for System processed packages. An exemplary embodiment of the Package Table contains the following information: 1) Package Tracking State ID; 2) Package Shipping State ID; 3) Actual Delivery Time; 4) Delivered To information; 5) Shipping Date; 6) Carrier Tracking Number; 7) System Tracking Number; 8) Carrier ID; 9) Actual Package Weight; 10) Service Description; and 11) Package OID. The content of these fields are described further below.

The Package Tracking State ID specifies the tracking state of the package. In an exemplary embodiment of the invention, there are four different tracking states: 1) Null (New Packages or Shipped Packages); 2) Manifested (at the end of each day, package information is moved to the Package History Table for tracking purposes); 3) In Transit (The Carrier has picked up packages); 4) Delivered (Packages have been delivered to the shipping destination).

The Package Shipping State ID specifies the shipping state of a package. In an exemplary embodiment of the invention, there are two different shipping states: 1) Shipped (New Packages or Shipped Packages); 2) Manifested (at the end of each day, package information is moved to the Package History Table for tracking purposes).

The Actual Delivery Time specifies the Date/Time that the package was actually delivered. The Delivered To information identifies the person or place to which the package was delivered (e.g., left with receptionist, receptionist front desk, or guard). The Ship Date specifies the date on which the Carrier picked up the package. The Carrier Tracking Number identifies the Carrier-specific package tracking number. The System Tracking Number specifies the unique Package tracking number internally generated by the System (each System tracking number corresponds to exactly one Carrier-specific tracking number). The Carrier ID specifies an identification code for the particular Carrier. The Actual Package Weight specifies the actual weight of the package as opposed to the billed weight. The Service Description describes the type of services used to ship the package e.g., Overnight, 3 Day Ground, Second Day Air, etc. The Package OID contains a Globally Unique Identifier ("GUID") for each package.

When the System creates a new package record, the record remains in the Package Table 28 during an initial period of time, for example, the first day during which the record is created, so that the Shipper/User can modify information about the package or void the package record as appropriate. In an exemplary embodiment of invention, the System performs certain processing on a periodic basis, such as at the end of each business day. This type of processing is referred to herein as "End Of Day" processing. In an exemplary embodiment of the invention, during "End of Day" processing, the System removes all new package records from the Package Table 28 and moves the records to a Package History Table 29 which also resides on the System Database 22. In an exemplary embodiment, Package History Table 29 records contain the same data fields as described above regarding Package Table 28 records.

Figure 64:
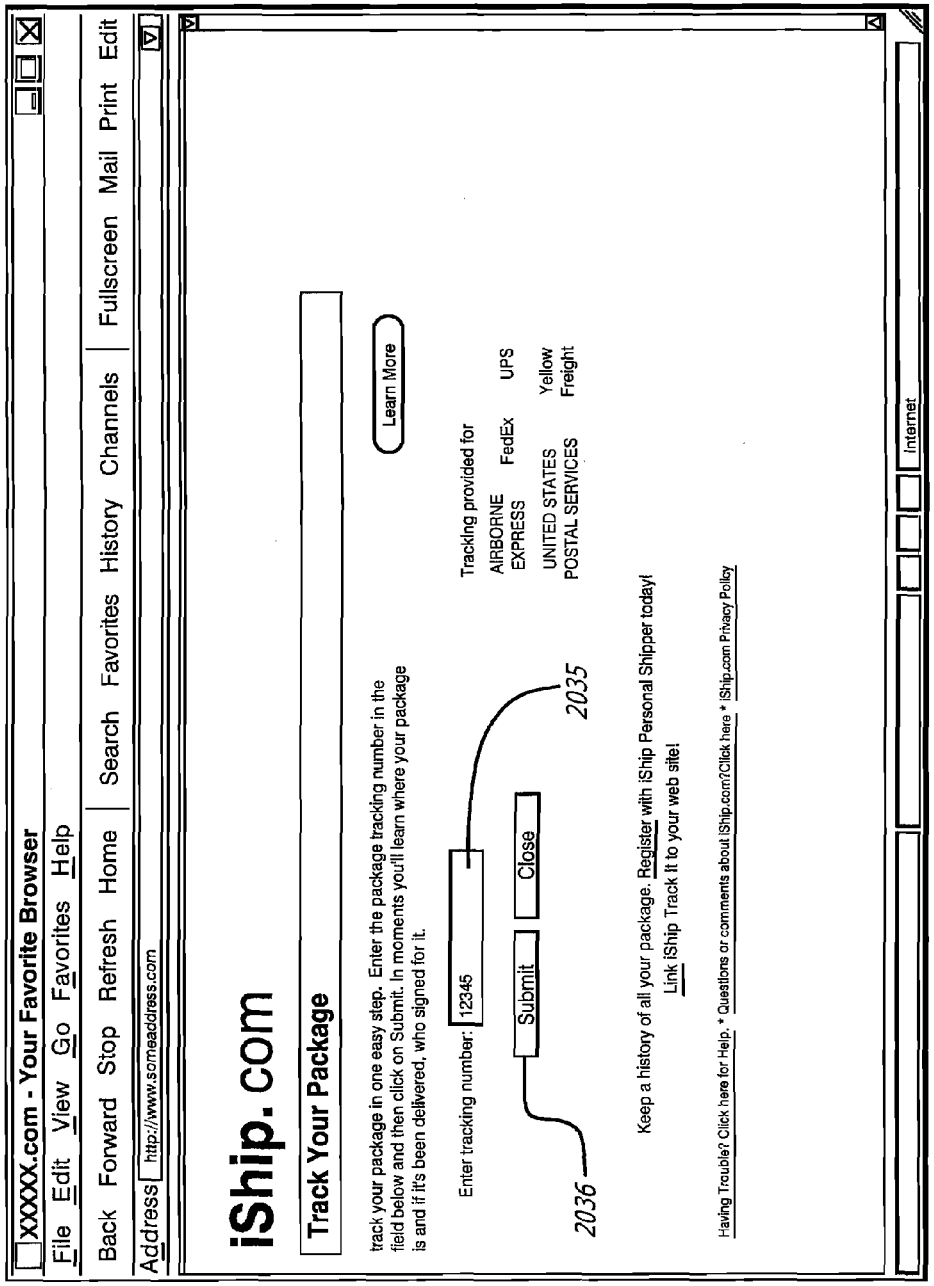
FIG. 64 is a graphic representation of a Shipper online user input screen that is displayed on the Shipper's display screen in an exemplary embodiment of the invention.

FIG. 64 is a graphic representation of a Shipper online user input screen that is displayed on the Shipper's display screen 10 (FIG. 2). If a Shipper/User wants to track a particular package, the Shipper/User enters the tracking number that identifies the particular parcel package of interest in the "Enter tracking number" field 2035. It should be understood by someone with ordinary skill in the art that the User may be someone other than the Shipper. For instance, the User may be a Recipient who wishes to track a package being sent to the user. Once the User has entered a tracking number, the User submits a request to track the particular package identified by clicking on the Submit button 2036.

Figure 65:
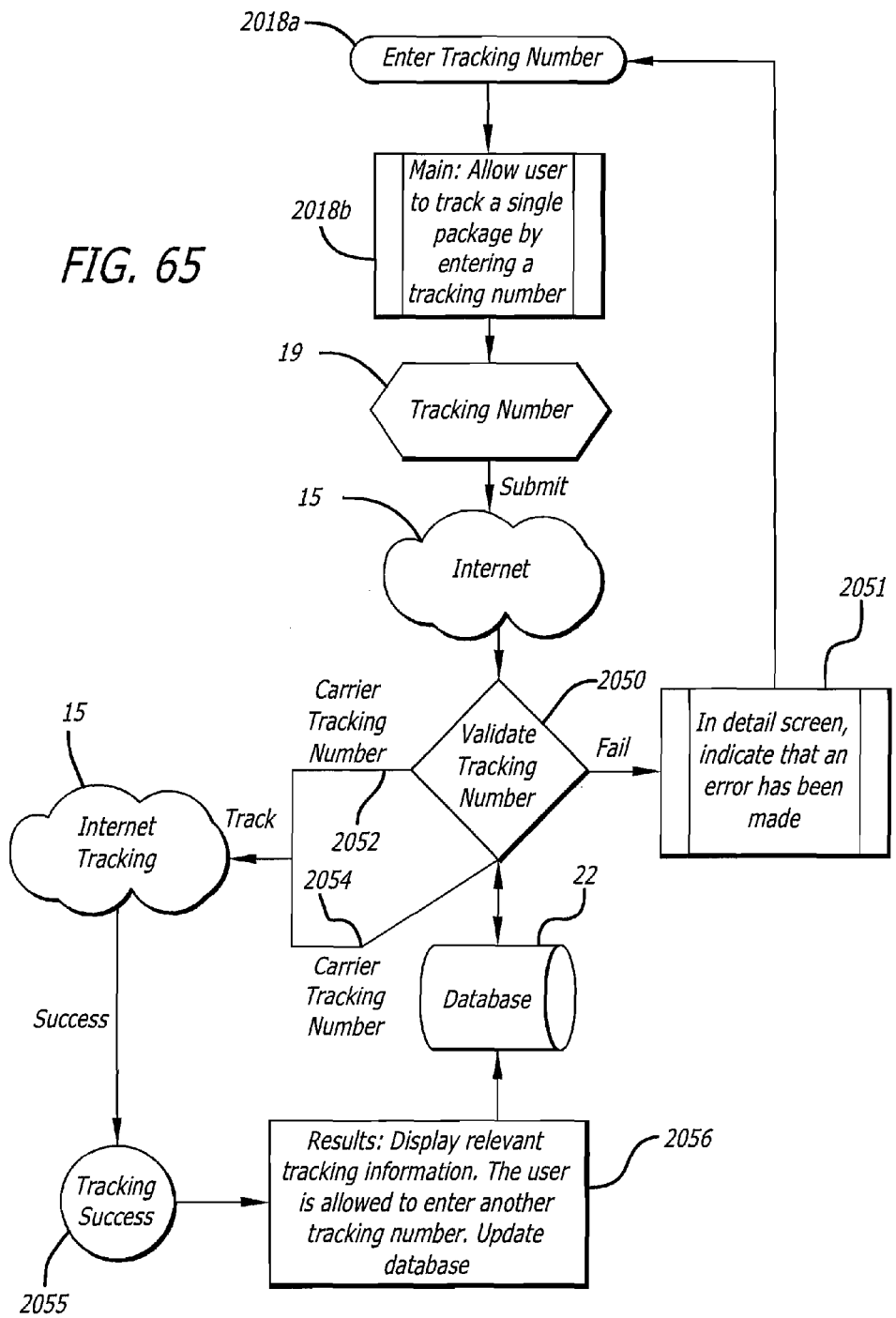
FIG. 65 is a logic flow diagram that depicts the high level logic for tracking the status of a particular package in an exemplary embodiment of the invention.

FIG. 65 is a logic flow diagram that depicts the high level logic for tracking the status of a particular package. The User enters 2018a and 2018b a tracking number 19 in the tracking number field 2035 (as was shown in FIG. 64). The System first validates 2050 the tracking number 19. The System performs the validation process by attempting to access the record on the System database 22 that is associated with the tracking number 19. To do this, the System requests that a System database server, e.g., 20a (as depicted in FIG. 3) locate and retrieve the package record that is associated with the tracking number 19. The System database server, e.g., 20a, uses the entered tracking number 19 to search the System database 22 to locate and retrieve the specified package record. In one embodiment, the System database server, e.g., 20a, is programmed to perform database accesses using Sequel 7.0.

Through the validation process, the System determines whether the tracking number 19 is a System tracking number or a Carrier tracking number. Below are examples of Carrier tracking numbers.

UPS—1Z8595610344113190
Airborne—3918984344
FedEx—811152682326
USPS—EJ585489546US
Yellow Freight—2100003475

If a user enters a Carrier tracking number as the tracking number 19, then depending upon the status of the package, or the number of times that the package was tracked, there may be no information in the System database 22 for the Carrier tracking number. In such a case, the System then uses algorithms provided by each Carrier to determine the Carrier identification.

If the System determines that there is information about the package on the System database 22, then the System analyzes the Package Shipping State. If the Package Shipping State of the retrieved record is "Manifested" or "In Transit" and the Package Tracking State is not "Delivered", then the System prepares to track the package using the appropriate Carrier system. If the Package Shipping State of the retrieved record is "Delivered", or other final status, then the System reports the status of the package to the user.

If the tracking number 19 is a valid System tracking number, then the System extracts the Carrier's tracking number and Carrier's ID from the package record retrieved from the System database 22 before issuing a request 2054. Otherwise, if the tracking number 19 is a Carrier tracking number, then the System extracts the Carrier's ID from the package record before issuing a request 2052 to the Carrier's Internet system. The System uses the Carrier's ID to retrieve from the System database 22 the Internet URL for the Carrier's Internet web site. The URL information is configurable.

Returning for a moment to FIG. 3, using the Carrier's Internet URL, the System then makes an HTTP connection to the Carrier's web server, e.g., 23-2 through 27-2, using the URL information for the particular Carrier's web server. Depending upon the Carrier, the System's 1 request and report interface with the Carrier's web server is programmed in HyperText Markup Language ("HTML"), Extensible Markup Language ("XML"), or both HTML and XML. FIG. 66 depicts an exemplary XML formatted request for submitting a tracking request to a Carrier. FIG. 67 depicts an exemplary successful tracking response, also in XML format, returned by the Carrier.

Then, as depicted in FIG. 65, the System transmits the Carrier's tracking number over the HTTP connection (2052 or 2054). The System instructs the Carrier's web server as to what information is requested based on the connection made using the URL.

If the Carrier's web server successfully responds 2055 to the System's 1 tracking request, the System disconnects from the Carrier's web server and parses the response data. Some Carriers' response data contains unnecessary text information. The System strips out all of the unnecessary text in order to parse the relevant information.

If the System database 22 does not have any previous record of the package, such as would be the case if the package had not been shipped using the System shipping application, then the System does not store any data about the package in the Package Table or the Package History Table.

Otherwise, the System then updates the System database 22 and reports the information to the Shipper/User 2056. If the package is reported as delivered, the System populates the Package History Table 29 in the System database. As was previously mentioned, in an exemplary embodiment, Package History Table 29 records contain the same data fields as described above regarding Package Table 28 records.

If the Carrier's Internet web server returns an unsuccessful report, the System reports the failure to the User. If the Carrier's system successfully returns tracking information, then the System displays the package's current status.

In an alternative embodiment, if the tracking number 19 is a Carrier tracking number, the Server will validate that the Carrier tracking number is a valid tracking number. If the Carrier tracking number is not a valid number, the Server will return an invalid tracking number error. If the Carrier tracking number is a valid number, the Server will not attempt to match the number to a manifested package; the Server will track the package using the particular Carrier's Internet tracking routine; and will return the tracking response to the Web Client of the requesting Shipper/User.

In an alternative embodiment, if the tracking number 19 is a System tracking number, then the System validates the System tracking number to ensure that it is a valid System tracking number. If the System tracking number is not a valid tracking number, the Server will return an invalid tracking number error. If the System tracking number is a valid tracking number the Server queries the System database 22 to find the Carrier tracking number which corresponds to the System tracking number. If no package record is found for the System tracking number, then the Server will return an error to the Web Client of the requesting Shipper. The error message will indicate that no package record was found; it will request the user to verify that the tracking number was from a package which had been dropped off notify the user that a package be tracked on the same day it shipped. If the package record is found and the actual ship date is the same as the current date, the Server will return an error to the Web Client of the requesting Shipper indicating that the user/Shipper cannot track the package on the same day it is shipped.

In this alternative embodiment, once the Server has identified the Carrier tracking number, the Server will track the package using the Carrier's Internet tracking routine. If the tracking response from the Carrier's Internet tracking routing indicates an error, the Server will make another attempt to track the package through the Carrier's Internet tracking routine. If the second tracking request results in an error, the Server will notify the Web Client of the requesting Shipper that the Carrier is unable to track the package, and will log a tracking request error containing the Error Log number, the System tracking number, the Carrier tracking number, the time and date the tracking request occurred, the error response reported by the Carrier, and the Account Name of the user/Shipper making the tracking request, if that information is available.

If, on the other hand, the Carrier returns a valid tracking response, the Server will update the package status in the Server Database with the tracking response and will return the detailed package information to the Web Client of the requesting user/Shipper from the System Database as described below.

If the user supplied a Carrier tracking number, the Web Client will display the basic tracking information provided by the particular Carrier's Internet tracking function. In one embodiment of the invention, when the user provides a Carrier tracking number to track a package, the user/Shipper's Web Client requires the user/Shipper to identify the Carrier.

If the user/Shipper provides a System tracking number, then if the user/Shipper is logged on to the account, or otherwise enters valid logon information, that information must correspond to he Account which shipped the package. In that case, the user/Shipper's Web Client will display the following information: System tracking number; recipient address; drop off location; Carrier and service; Carrier tracking number if available; actual ship date if available; delivery address if available; delivery location if available; delivery date if available; delivery time if available; signed for by information if available; package rate; package weight; package dimensions; packaging; customer reference information; all scan activity.

If on the other hand, the user/Shipper is not logged on to the account, fails to enter valid logon information, or is logged on to an Account which does not correspond to the Account which shipped the package, the user/Shipper's Web Client will display the following information: System tracking number; recipient contact name; recipient company name; Carrier and service; Carrier tracking number if available; actual ship date if available; delivery address if available; delivery location if available; delivery date if available; delivery time if available; signed for by information if available; package weight; customer reference information; all scan activity.

19. PriceIt for Enterprise.

The System provides enterprises with the ability to rate shipments outside of the context of a shipping transaction. This rating tool is used to estimate shipping charges to external customers, or to rate shipments that are not yet in the System for actual shipping. The PriceIt tool displays the customer's custom rates.

The user interface is the same as the rate interface provided in the Shipping tool. PriceIt rules are applied to the carriers and services that appear. The System provides the Administrator with the capability to define rules for the PriceIt tool separately from the shipping tool. For example, users who are getting shipping charge estimates for customers may not actually have access to the service they are quoting rates on. Accordingly, the System calculates, for each carrier authorized by an administrator of an enterprise for use by a particular user within the enterprise, enterprise shipping rates and custom customer shipping rates in response to a rating request by the particular user for shipping a particular package. The System also provides the Administrator with the ability to hide the PriceIt tool altogether.

20. Customer System Integration.

In one embodiment, the System is integrated with such enterprise systems as:
  Authentication databases
  Corporate directories/address books
  Internal receiving and tracking systems (RIPIT, A2B)
  Internal product databases
  Accounting systems for chargebacks 21. International Shipping.

In one embodiment, the System handles international destination shipping, including:
  International carriers, such as DHL, FedEx, and UPS
  International document shipments
  International parcel shipments, including document preparation
  Shipper's Export Declaration
  Commercial Invoice
  Export compliance system integration 22. Request Carrier Pick-Up In one embodiment, the System provides the capability to electronically request a pickup from Carriers. This option is a configurable option that the Administrator can enable/disable on an enterprise site-specific basis.

Illustrative Embodiments

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. A method for generating by a computer an electronic representation of an intermediate processing label adapted for enabling generation of a shipping label for shipping a package, said method comprising:
  generating by a computer, a package-specific, machine-encoded package identifier that corresponds to data received from a user regarding the package;
  storing by a computer, said data regarding the package on a computer-accessible storage medium accessible according to said package-specific, machine-encoded package identifier, said data comprising:

an indication of package information,
destination information,
origin information, and
shipping parameters;
generating by a computer, an electronic representation of said intermediate processing label, said electronic representation of said intermediate processing label comprising:
an electronic representation of said indication of package information,
an electronic representation of said destination information,
an electronic representation of said origin information,
an electronic representation of said shipping parameters, and
an electronic representation of said package-specific, machine-encoded package identifier that corresponds to said data regarding the package.

2. The method of claim 1, said method further comprising:
receiving by a computer, an input of a scan of said package-specific, machine-encoded package identifier; and
using by a computer, said package-specific, machine-encoded package identifier:
accessing said computer-accessible storage medium; and
retrieving said data regarding said package corresponding to said package-specific, machine-encoded package identifier.

3. The method of claim 2, said method further comprising:
receiving by a computer, additional information regarding said package corresponding to said package-specific, machine-encoded package identifier; and
using said additional information and said data regarding said package, generating by a computer, a carrier-specific shipping label with carrier-specific shipping indicia for shipping said package from an origin associated with said origin information to a destination associated with said destination information.

4. A method for generating by a computer an electronic representation of an intermediate processing label for a package, said method comprising:
generating by a computer, a package-specific, machine-encoded package identifier that corresponds to data received from a user regarding the package;
storing by a computer, said data regarding the package on a computer-accessible storage medium accessible according to said package-specific, machine-encoded package identifier, said data comprising:
an indication of package information,
destination information,
origin information,
shipping parameters, and
information required to enable generation of shipping carrier shipping indicia;
generating by a computer, an electronic representation of said intermediate processing label, said electronic representation of said intermediate processing label comprising an electronic representation of said machine-readable package identifier that corresponds to said data regarding the package, said data comprising information selected from a group consisting of:
said indication of said package information,
said destination information,
said origin information,
said shipping parameters, and
said information required to enable generation of shipping carrier shipping indicia.

5. The electronic representation of an intermediate processing label of claim 4, said electronic representation further comprising:
an electronic representation of said indication of package information.

6. The electronic representation of an intermediate processing label of claim 4, said electronic representation further comprising:
an electronic representation of said destination information.

7. The electronic representation of an intermediate processing label of claim 4, said electronic representation further comprising:
an electronic representation of said origin information.

8. The electronic representation of an intermediate processing label of claim 4, said electronic representation further comprising:
an electronic representation of said shipping parameters.

9. The electronic representation of an intermediate processing label of claim 4, said electronic representation further comprising:
an electronic representation of said indication of package information;
an electronic representation of said destination information;
an electronic representation of said origin information; and
an electronic representation of said shipping parameters.

10. A method for generating by a computer an electronic representation of an intermediate processing label adapted for enabling generation of a shipping label for shipping a package, said method comprising:
generating by a computer, a package-specific, machine-encoded package identifier that corresponds to data received from a user regarding the package, said data comprising:
an indication of package information,
destination information, and
origin information;
storing by a computer, said data regarding the package on a computer-accessible storage medium accessible according to said package-specific, machine-encoded package identifier;
generating by a computer, an electronic representation of said intermediate processing label, said electronic representation of said intermediate processing label comprising:
an electronic representation of said indication of package information,
an electronic representation of said destination information,
an electronic representation of said origin information, and
an electronic representation of said package-specific, machine-readable package identifier that corresponds to said data regarding the package.

\* \* \* \* \*